Nov. 3, 1970 W. E. BRAY ET AL 3,538,439
METHOD FOR MEASURING THE AMPLITUDE OF ANY POINT ON
REPETITIVE CYCLES OF A HIGH FREQUENCY WAVEFORM
Filed Dec. 7, 1965 28 Sheets-Sheet 1
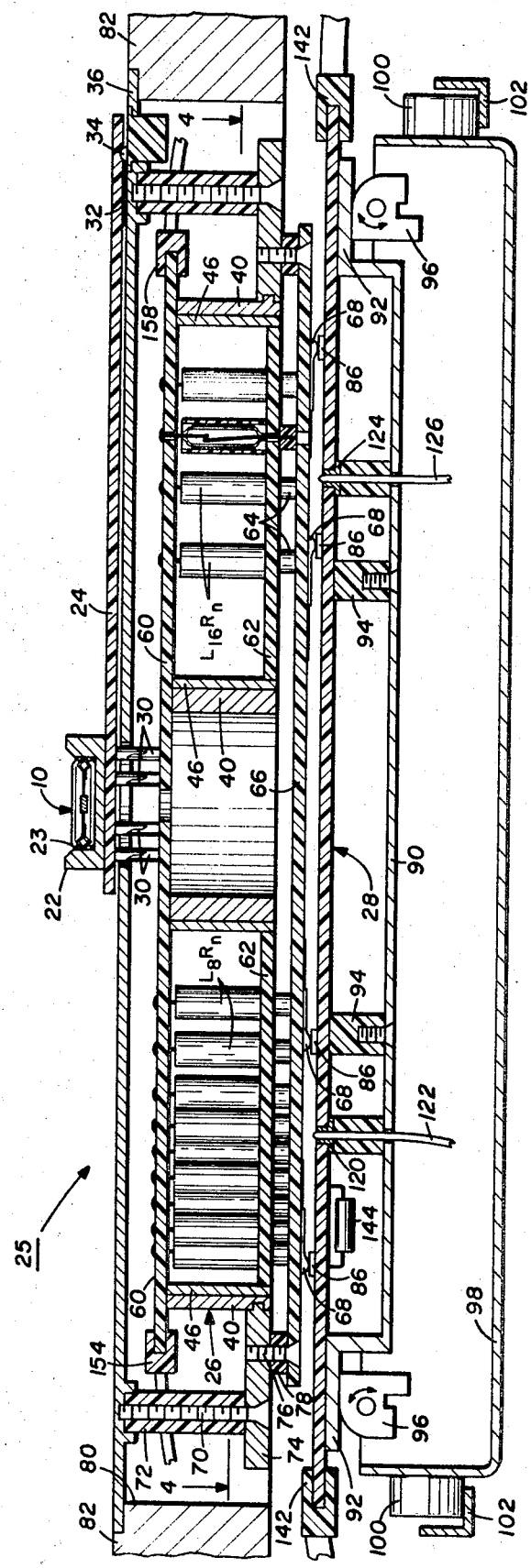
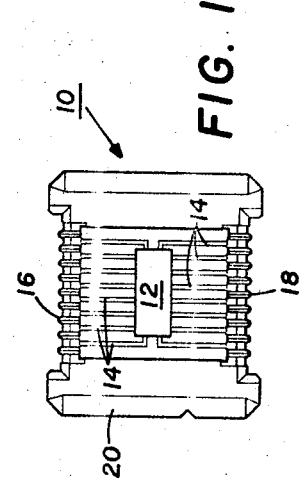
INVENTORS:
WILLIAM E. BRAY
LESLIE L. JASPER
E. Mickey Hubbard
ATTORNEY

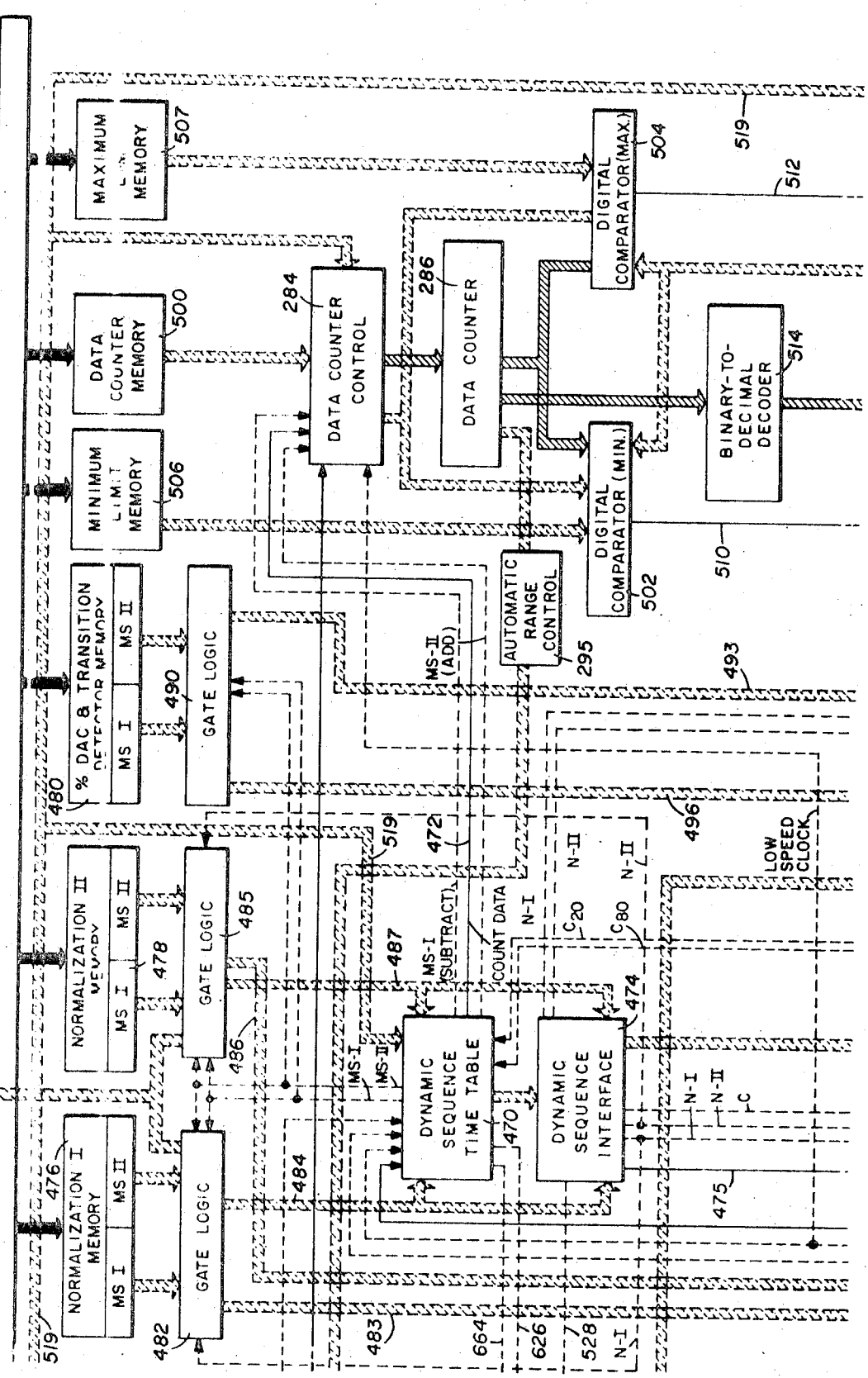

FIG. 5d

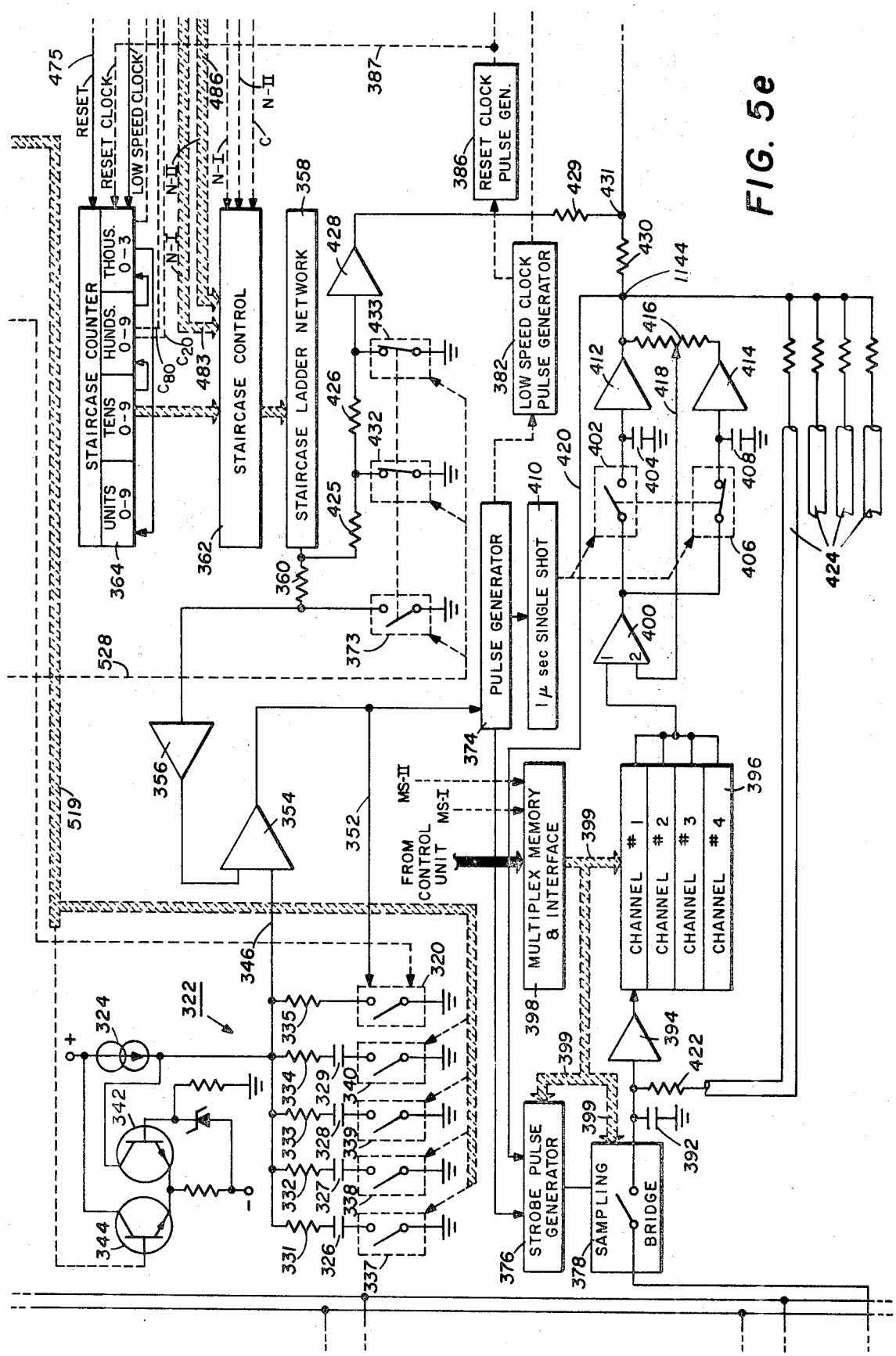

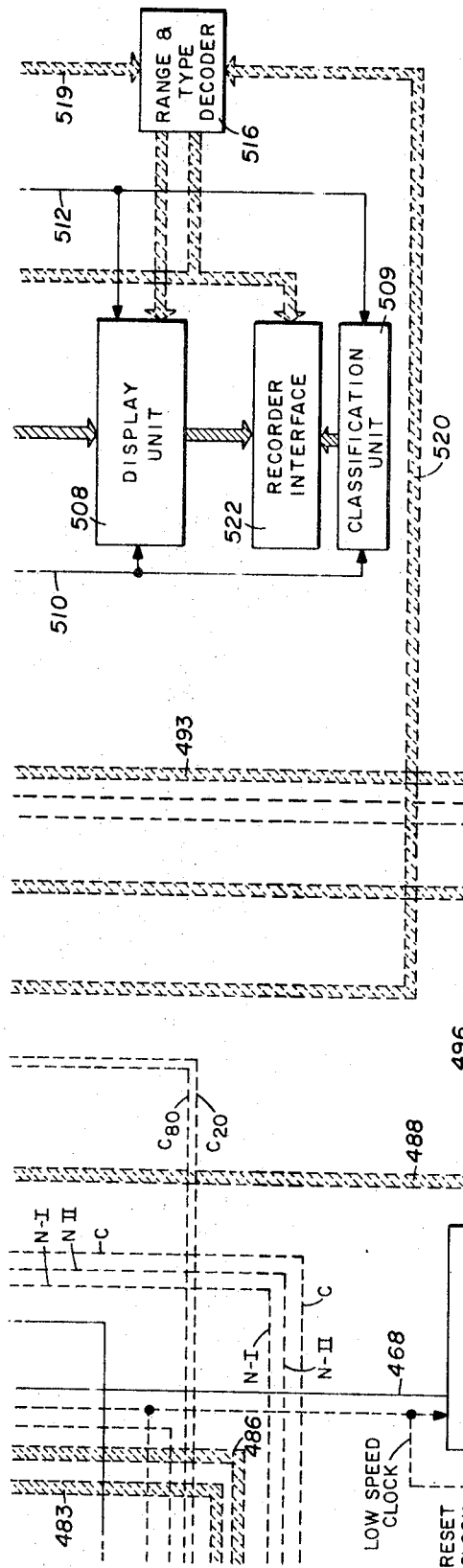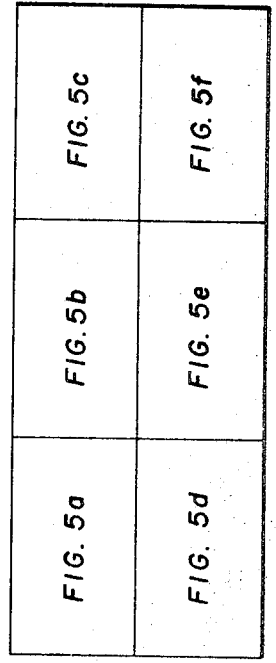

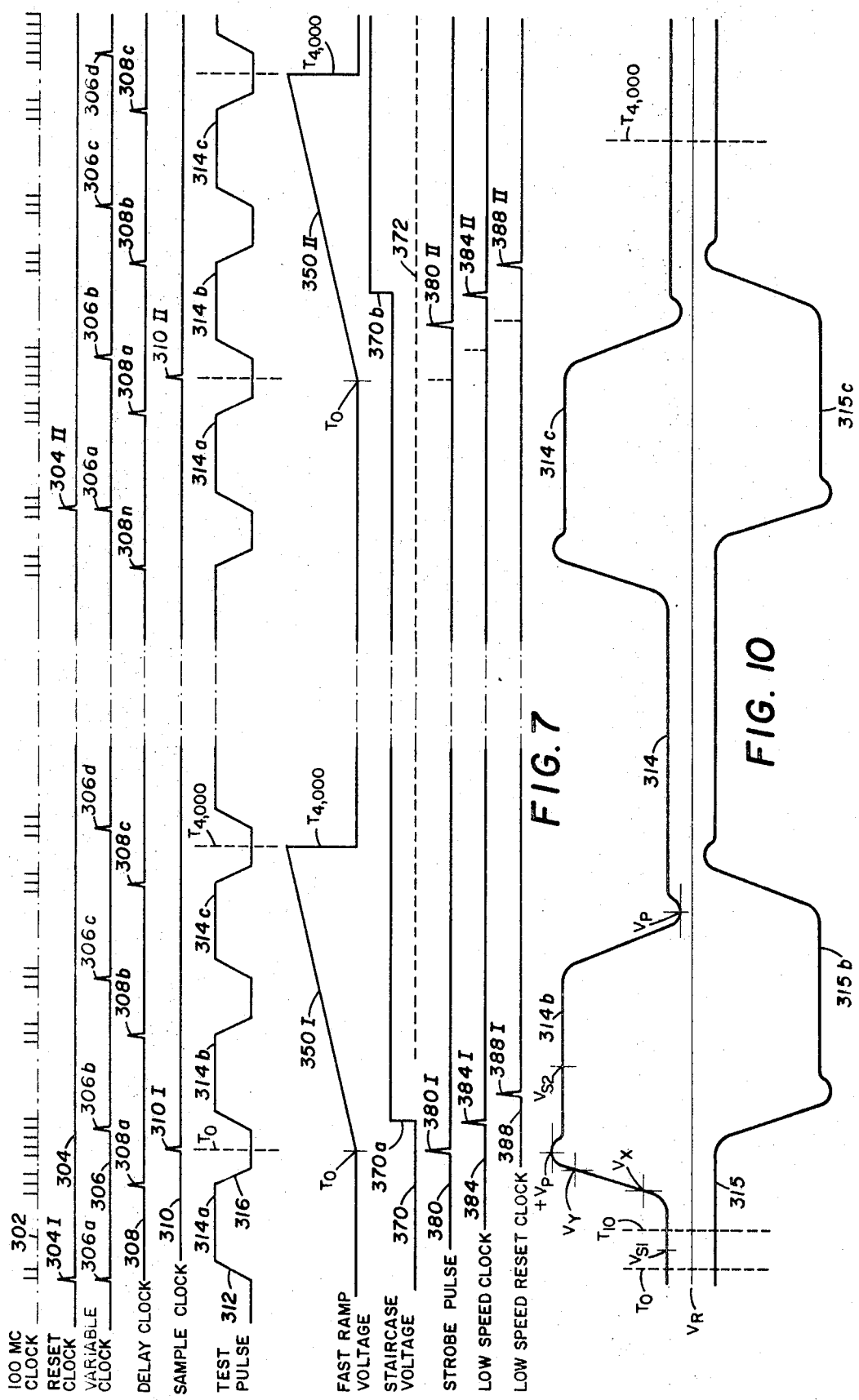

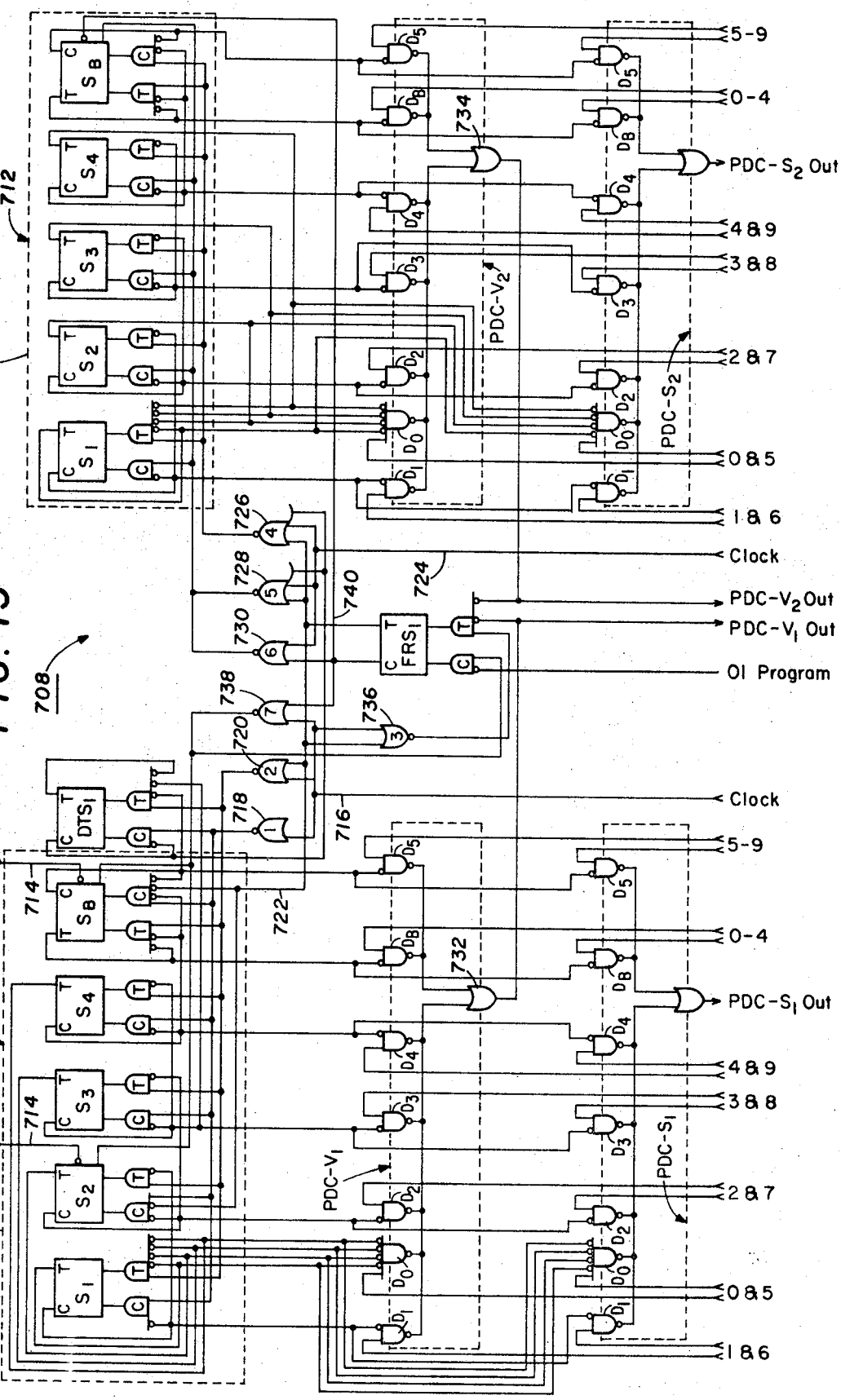

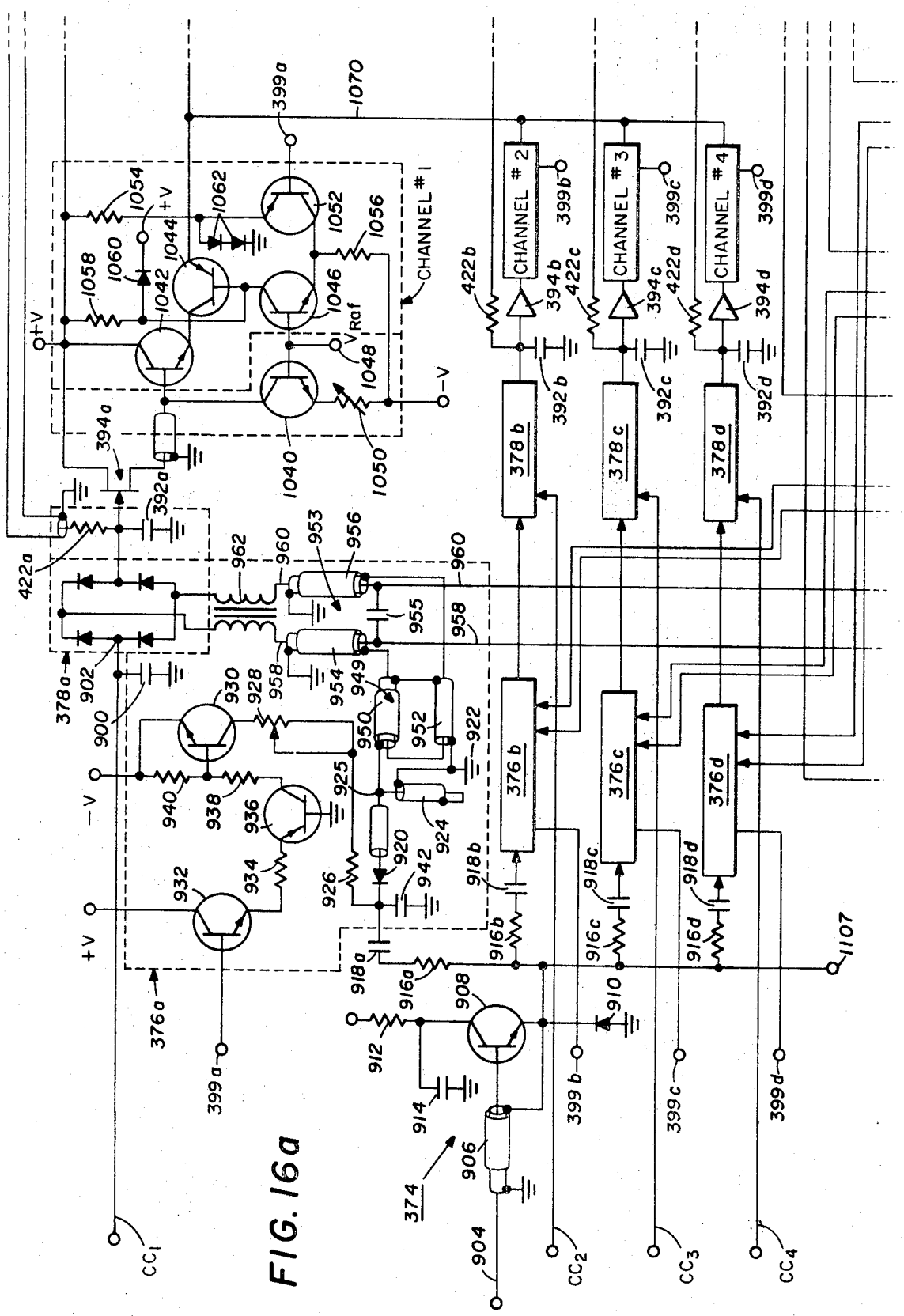

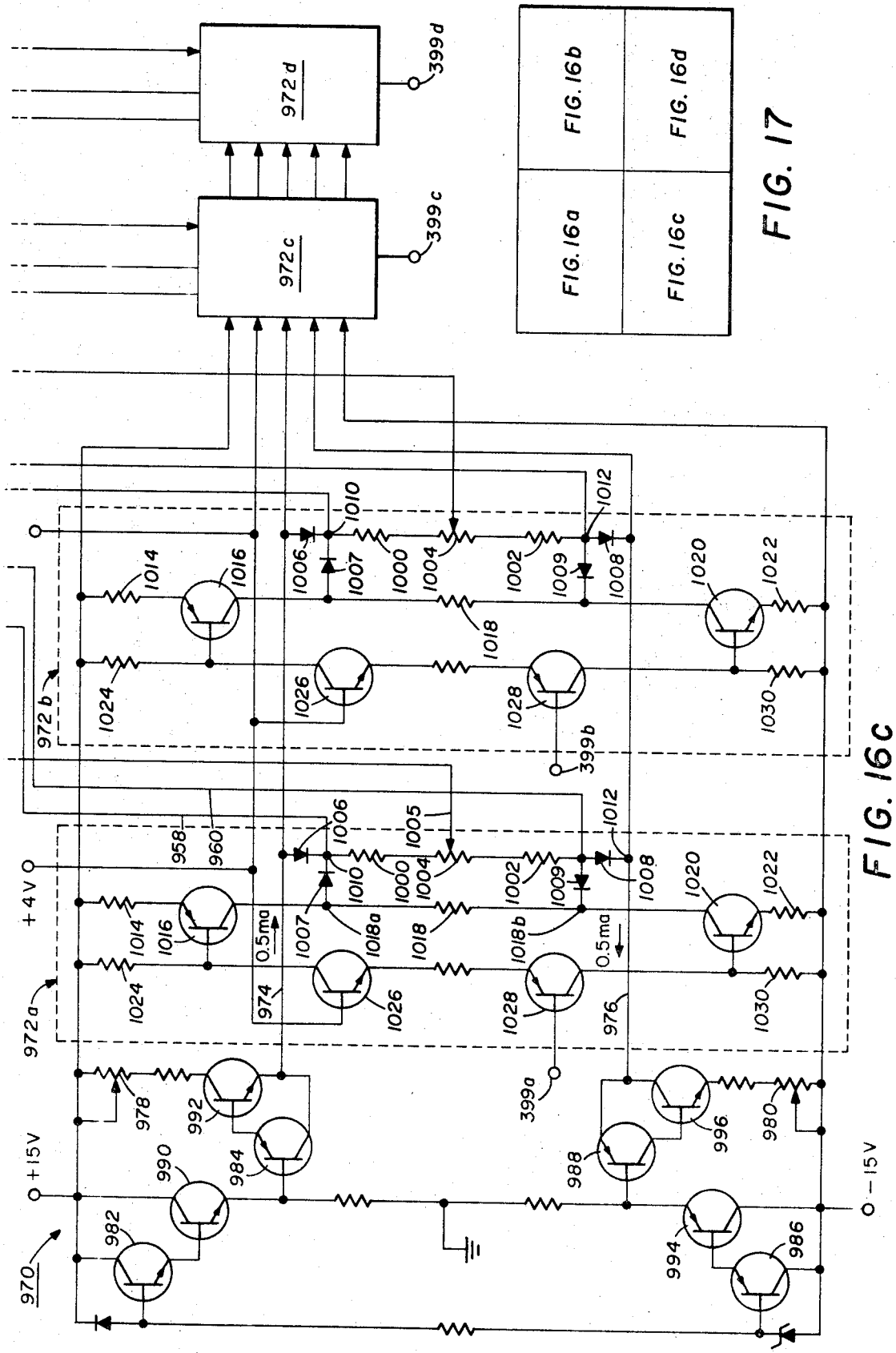

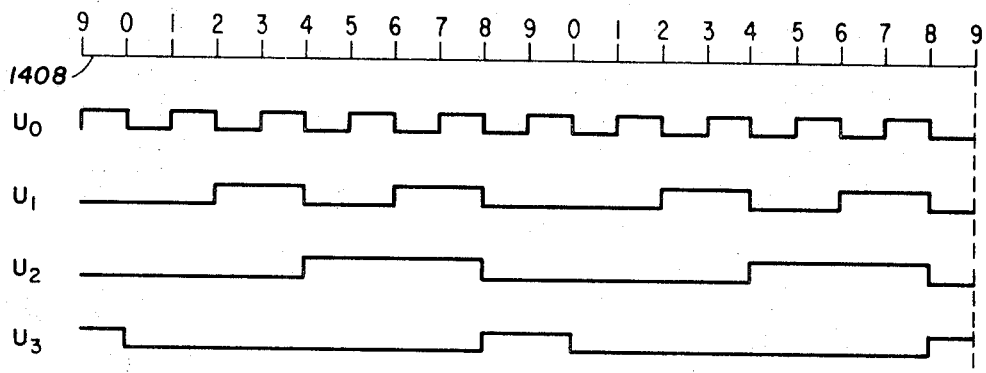
FIG. 23
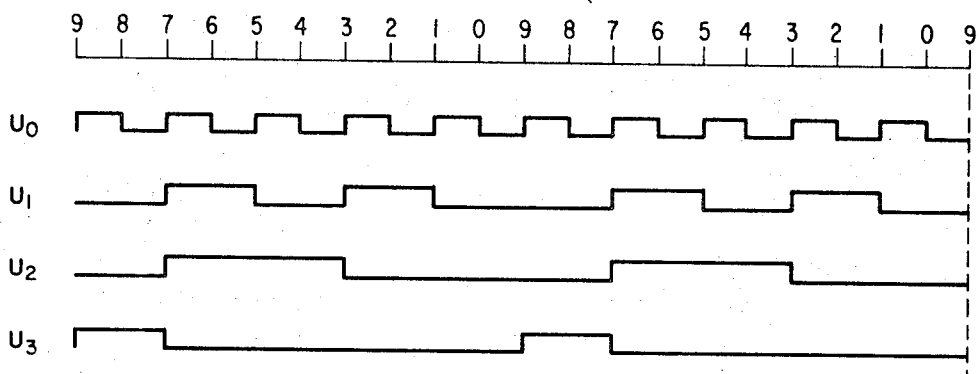
FIG. 24
| $J_n$ | $K_n$ | $J_n^*$ | $K_n^*$ | $T_{n+1}$ |
|---|---|---|---|---|
| 1 | 1 | 1 | 1 | C |
| 0 | 0 | 0 | 0 | C |
| 0 | 0 | 1 | 1 | $\overline{C}$ |
| 0 | 0 | 1 | 0 | 1 |
| 0 | 0 | 0 | 1 | 0 |
FIG. 26
| $J_n'$ | $K_n'$ | $T_{n+1}$ |
|---|---|---|
| 1 | 1 | $\overline{C}$ |
| 0 | 0 | C |
| 1 | 0 | 1 |
| 0 | 1 | 0 |
FIG. 27
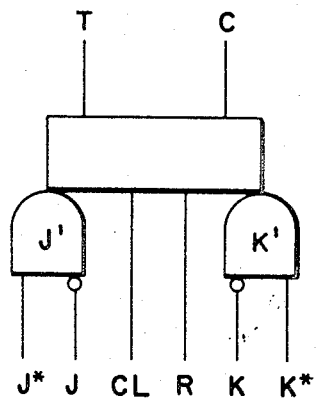
FIG. 25

United States Patent Office 3,538,439
Patented Nov. 3, 1970

3,538,439
METHOD FOR MEASURING THE AMPLITUDE OF ANY POINT ON REPETITIVE CYCLES OF A HIGH FREQUENCY WAVEFORM
William E. Bray and Leslie L. Jasper, Houston, Tex., assignors to Texas Instruments Incorporated, Dallas, Tex., a corporation of Delaware
Filed Dec. 7, 1965, Ser. No. 512,142
Int. Cl. G01n 23/16; G05g 1/52; G06g 7/14
U.S. Cl. 324—77                           30 Claims

ABSTRACT OF THE DISCLOSURE

A system for automatically making substantially any static or dynamic test on a multilead integrated circuit. The system includes a test station having a plurality of D.C. bias supplies, a plurality of pulse generators for producing repetitive pulse waveforms, a socket for receiving the integrated circuit, switch means for selectively connecting any D.C. bias supply and/or any pulse generator to any lead or leads of the integrated circuit, and sensing means for selectively connecting any lead of the integrated circuit to either a static measuring unit or a dynamic measuring unit. The dynamic measuring unit makes either time or amplitude measurements on the signal at any lead of the integrated circuit and produces a pulse train and a count data signal which are collectively representative of the magnitude of the time or amplitude measurement. The static measuring unit makes either static voltage or current measurements on the signal at any selected lead of the integrated circuit and produces a pulse train signal the frequency of which is representative of the magnitude of the measurement. A data readout system counts the pulses either from the dynamic measuring unit during the count data signal, or the pulses from the static measuring unit during a predetermined reference time period to indicate the results of the measurement. A programmable control means automatically operates the total system to make substantially any selected amplitude, time, voltage or current measurement on the signal occurring at or between substantially any lead or leads of the integrated circuit.

---

This invention relates generally to measuring and testing, and more particularly relates to method and apparatus for making amplitude and time measurements on waveforms which relate to the operation of electronic components and circuits.

During and after the manufacture of electronic components such as diodes, transistors and integrated circuits, it is common practice for either or both the supplier and the ultimate user to make various tests in order to determine the operability and characteristic parameters of the devices. For example, various parameter tests must be made on discrete semiconductor devices so that the devices can be classified for particular uses in circuits designed by mathematical formulas. On the other hand, the parameter information of each component is virtually unobtainable in integrated circuits where a large number of components are formed "in situ" on a single semiconductor wafer, and even if obtainable, would be of comparatively little value. This necessitates testing the entire integrated network in order to obtain the necessary design parameters and to test the operability of the network.

All tests performed on semiconductor devices can be broken down into two broad categories. The first, generally referred to a "static" testing, involves the application of stimuli and measurement of responses which are completely or essentially D.C. in nature and do not take into consideration either time or frequency ratings of the device under test. The other, referred to as "dynamic" testing, involves the application of both D.C. bias and a pulse stimuli which periodically varies to closely approximate the conditions under which the device will operate and the measurement of the responses from the stimuli. For example, the propagation delays of integrated logic circuits specified for 10 megacycle operation should be measured at a 10 megacycle repetition rate to properly consider R–L–C time constants and stored charge effects in the active devices.

Both component and integrated circuit testing has heretofore centered primarily around static measurements. Dynamic measurements have been made only in certain preselected areas using specially designed test equipment. Comprehensive testing of integrated circuit devices is greatly complicated in that such devices may have a large number of leads, fourteen to twenty being a very common number based on current technology. Further, a typical integrated circuit may require twenty-five, fifty, or more separate measurements or tests with each test perhaps being performed using different bias levels, amplitudes, and pulse widths applied to different leads. Because of the large number of tests which must be made on a large number of network devices, the test methods and systems heretofore available made comprehensive testing impractical.

This invention is concerned with method and apparatus for comprehensive testing of nonlinear logic circuits, parameter testing of discrete components, and certain functional testing of analog circuits. For example, the method and apparatus may be used to test such components and circuits as AND, OR, NAND, NOR, flip-flops, inverters, logic drivers, differential amplifiers, operational amplifiers, linear amplifiers, printed circuit logic cards, logic modules, diodes, transistors, and resistors. These devices may be tested for delay time, rise time, storage time, fall time, propagation delay, propagation difference, average delay, commutating time, feed-through, overshoot, undershoot, period, pulse width, peak amplitude, amplitude, logic levels, noise thresholds, set-reset sensitivity, balance, offset voltage, output level, D.C. gain, step response (band width), leakage, breakdown voltage, reverse recovery, droop, as well as the more conventional static voltage and current measurements. It is to be understood, however, that the above enumerated devices and tests are merely illustrative examples and that the method and system of this invention is not limited to the performance of these tests on these devices.

Accordingly, an important object of this invention is to provide method and system for making substantially all amplitude and time measurements on a waveform which are necessary to test and classify substantially any electronic device or circuit.

Another object is to provide a system which may be programmed to perform such measurements automatically and at a high rate of speed with minimum setup time and cost.

A further object is to provide such a system which will perform a large number of different tests in a short period of time.

Another object is to provide such a system which will make amplitude and time measurements on waveforms repeating at rates as high as 50 megacycles.

Another important object is to provide such a system which will sequentially perform a large variety of static and dynamic tests on different leads of a multilead device, such as an integrated circuit or the like, without removing the device from the test socket.

A further object is to provide such a system which can be quickly and easily adapted to test different devices having different multilead configurations.

Another object is to provide a system wherein the bias voltages and pulse stimuli may be selectively applied to any lead of a multilead device.

Another very important object of the invention is to provide a system wherein dynamic amplitude measurements may be made between any two leads of a multilead device or between any lead and ground.

Still another object is to provide a system which can easily be adapted to test substantially any device or circuit.

A further object of the invention is to provide a system for making any one of the large number of measurements at any selected device lead, or between any two device leads.

A further object of the invention is to provide such a system wherein the order in which a plurality of bias voltages and pulse stimuli are applied to and removed from a device being tested may be programmed to protect the device.

Still another object is to provide a stabilizing period after the application of such bias voltages and pulse stimuli prior to a measurement.

Another object is to provide a means for easily inserting various loads in any stimulus circuit for a particular device so that the device may be tested under various load conditions without removing it from the test socket.

Still another very important object of the invention is to provide a method and system for making successive measurements by a single sensing probe and comparing these measurements to provide a differential measurement.

A further object is to provide a system wherein a particular time on a waveform may be determined without viewing the waveform, thus permitting automatic operation of the sampling system.

Still another object is to provide a system of the type described wherein measurements can be made on a waveform having repetitive periods wherein the wave form within each repetitive period does not vary at a uniform rate.

Yet another object is to provide a pulse transformer for producing a large number of precisely synchronized pulses suitable for driving a large synchronous logic system such as the digital synchronization system.

Another object of the invention is to provide a system wherein a succession of current, voltage or time measurements may be automatically averaged to obtain more accurate results.

Yet another object of the invention is to provide a method and system for making time measurements on one or two waveforms between any two points on either of the waveforms identifiable by an amplitude or a percent difference in two amplitudes.

Still another object is to provide a method and system for making amplitude measurements between any two points on a single waveform or any two points on separate waveforms provided the points may be identified by time, by a most positive peak, by a most negative peak, or by a reference amplitude level.

Another object is to provide a system in which a repetitive pulse stimuli of a very high frequency is synchronized with a sampling system operating at a much lower frequency so that more accurate measurements may be obtained.

Another object of the invention is to provide such a system wherein measurements can be made between any two points in time or any two amplitudes without first identifying which point in time is first or which amplitude is greater.

Yet another object is to provide a system capable of making measurements on a waveform varying in frequency from zero to a very high frequency such as 50 megacycles.

A further object is to provide a system wherein D.C. offset voltage errors are eliminated during dynamic measurements.

Another object of the invention is to provide such a system which requires only one amplitude measurement channel.

Another important object is to provide a means for taking a single sample from each of a large number of periods on a waveform having repetitive periods to discriminate against noise and obtain a more accurate measurement.

A further object of the invention is to provide a completely synchronous, digital system for greater accuracy.

Still another object is to provide a method and system wherein all dynamic measurements are derived as the difference between two separate measurements.

Another object is to provide such a system in which all measurements are read out as digital values.

Yet another object is to provide a means for accurately distinguishing true transitions indicative of an end of a count period from spurious transitions.

Still another object of the invention is to provide a means for classifying a device based on digital measurement data and programmed digital classification data.

These and other objects are accomplished by measurement methods implemented in a system comprised of a test station subsystem, a dynamic measuring subsystem, a data readout subsystem, and a programming, control and emory subsystem.

The test station subsystem features one or more programable D.C. bias sources and one or more programable pulse generators which may be selectively connected to any device lead. Provision is also made to selectively connect a wide variety of loads in the bias or pulse stimuli circuits. The relay system also provides a means for selectively making a Kelvin type sensing connection to any device lead for either static or dynamic measurements, or remote stabilization sensing. Thus any bias or pulse stimulus may be applied to any device lead and measurements may be made at any device lead. Further, provision is made to apply the D.C. bias and pulse stimuli to the leads in any selected order to protect the device.

In the dynamic measuring subsystem, a digital synchronization system serves as the basic time reference that synchronizes the generation of one or more high frequency repetitive pulse stimuli for the device with a sampling system operating at a much lower frequency. The synchronization system generates a variable clock pulse train having frequencies selectable over a wide range which is used to initiate the pulse stimuli, and also generates a synchronous sampling pulse train occurring at a much slower repetition rate and at any point in time within a period including a large number of the stimuli pulses. The synchronization system also generates a delayed clock pulse which may be programmed to occur any predetermined number of reference clock pulses after each delayed clock pulse. The synchronization system is capable of defining a repetitive period, or word, within which a predetermined number of variable clock pulses and delayed clock pulses occur. In accordance with an important aspect of the invention, the sample clock pulse may be programmed to occur at any point in time within each period. This provides a capability of producing a repetitive waveform of substantially higher frequency within each period, and then defining a field of view beginning precisely at any point within the repetitive period.

The sample pulse is used to initiate a fast ramp voltage in the sampling system having a programmable slope. Each successive fast ramp voltage is compared with the output of a staircase voltage generator which may be operated either in a count mode to produce a staircase voltage, or a reference mode to produce a programmed reference level. When the fast ramp exceeds the staircase voltage, a strobe pulse is produced. Each successive strobe pulse is generated at a point in time delayed from the sampling pulse by the period required for the fast ramp voltage to reach the respective staircase voltage steps. The strobe pulse is used to operate a sampling bridge which transfers a percentage of the voltage at the selected device lead to a capacitor. A special purpose sampling amplifier is used to correct the percentage voltage on the capacitor to equal the full voltage at the device lead and reproduce that voltage at the output of the sampling system.

Thus when the staircase voltage generator is operated in the count mode, the high frequency waveform at the device lead is reproduced at a much slower frequency at the output of the sampling system to facilitate more accurate voltage and time measurements. On the other hand, if the staircase voltage is stopped at a constant level, the output of the sampling amplifier is proportional to the voltage at the lead at the time of the strobe pulse and therefore at a point identified by time on the waveform being measured.

The output from the staircase voltage generator may also be connected to the output of the sampling system so that the sampling system may be operated in either the scan mode, i.e., with the sampling amplifier connected to the output, or the reference mode, i.e., with the staircase generator connected to the output. Further, the staircase voltage generator can be operated in either the count mode to generate a staircase voltage or a program mode to produce a programmed steady state voltage during either the scan mode or the reference mode.

The output from the sampling system is applied to input #1 of an operational comparator amplifier of a reference and comparison system. The output of the comparator is connected to selectively charge either of two capacitor memories. The voltage on either of the capacitor memories may be fed back to input #2 of the comparator amplifier to effect the storage of the input voltage on the selected capacitor memory, or a percent level between the two voltages may be fed back for comparison with a voltage subsequently applied to input #1. The reference and comparison system also provides a means for storing either the peak positive or the peak negative voltage values occurring during a time period on either of the capacitor memories. Thus a voltage level proportional to the amplitude of a waveform at any point identifiable by time or peak amplitude, or proportional to a reference level or any percent level between any two of these voltage levels may be fed back to input #2 of the comparator for comparison with a subsequent signal. Time measurements may then be made by applying the low speed waveform from the sample amplifier of the sampling system to input #1 of the comparator and counting the number of strobe pulses until a transition at the output of the comparator occurs. Voltage measurements can be made by applying the staircase voltage to the first input of the comparator and counting the number of steps of the staircase voltage until a transition at the comparator occurs.

The dynamic measuring subsystem also features a transition detector which will discriminate between true transitions and spurious transitions caused by noise, and which will selectively detect the first or second positive going transition, or the first or second negative going transition.

The dynamic measurements are automatically made in accordance with a predetermined time sequence, with the particular functions performed during each sequence period fully selectable by programming so as to provide a wide variety of different measurements. In particular, each measurement is comprised of two major scan periods. A complete measurement is made during each major scan period with respect to the same reference of unknown absolute value. The two measurements are then compared to provide an accurate differential measurement. Each scan period includes a first normalizing period for storing a reference voltage on the first capacitor memory, a second normalizing period for storing a reference voltage on the second capacitor memory, and a third normalizing period for allowing the sample amplifier to stabilize. Then ten successive interlace scans, separated by a normalizing period, are performed by causing the staircase voltage to increment by tens during each interlace scan with each step of each successive interlace scan exceeding the corresponding step of the preceding interlace scan by a unit value. A transition is detected during each interlace scan and the total data count of the ten interlace scans summed to provide an average value for the entire measurement. The measurements made during each major scan are compared and the difference provides the differential measurement.

The readout subsystem includes a data counter which subtracts counts during the first major scan of a dynamic measurement and then adds counts during the second major scan so that the final count, whether positive or negative, indicates the actual differential measurement. The counter is programmable to add counts during the first major scan and subtract counts during the second major scan. The readout system also provides division capability for averaging a series of test measurements. The readout system also includes digital comparators to determine whether the differential measurement is less than, equal to or greater than both minimum and maximum selected values. Provision is also made to display and record the measurement data and to classify the test device.

The system further features a programming system including shift register memories for the test station, the D.C. bias supplies and pulse stimuli, the dynamic measuring subsystem, the static measuring subsystem and the data readout subsystem. These various memories are randomly accessible by address so as to provide a program of indefinite length to facilitate expansion.

The novel features believed characteristic of this invention are set forth in the appended claims. The invention itself, however, as well as other objects and advantages thereof, may best be understood by reference to the following detailed description of illustrative embodiments, when read in conjunction with the accompanying drawings, wherein:

FIG. 1 is a plan view of a typical electronic device, mounted on a plastic carrier frame, of the type which may be tested by the system of the present invention;

FIG. 3 is a somewhat schematic sectional view of the test station of FIG. 2 taken substantially on lines 3—3 of FIG. 4;

FIGS. 5a–5f are schematic block diagrams which collectively disclose the system of the present invention;

FIG. 6 is a schematic drawing illustrating the manner in which FIGS. 5a–5f should be arranged so that the lines extending between sheets will register and provide a composite diagram;

FIG. 7 is a timing diagram which illustrates the operation of the digital synchronization unit of the system and the derivation of the sample pulse and the low speed logic clock;

FIG. 10 is a timing diagram illustrating a pair of typical repetitive waveforms which may be measured by the method and system of this invention;

Figure 5A:
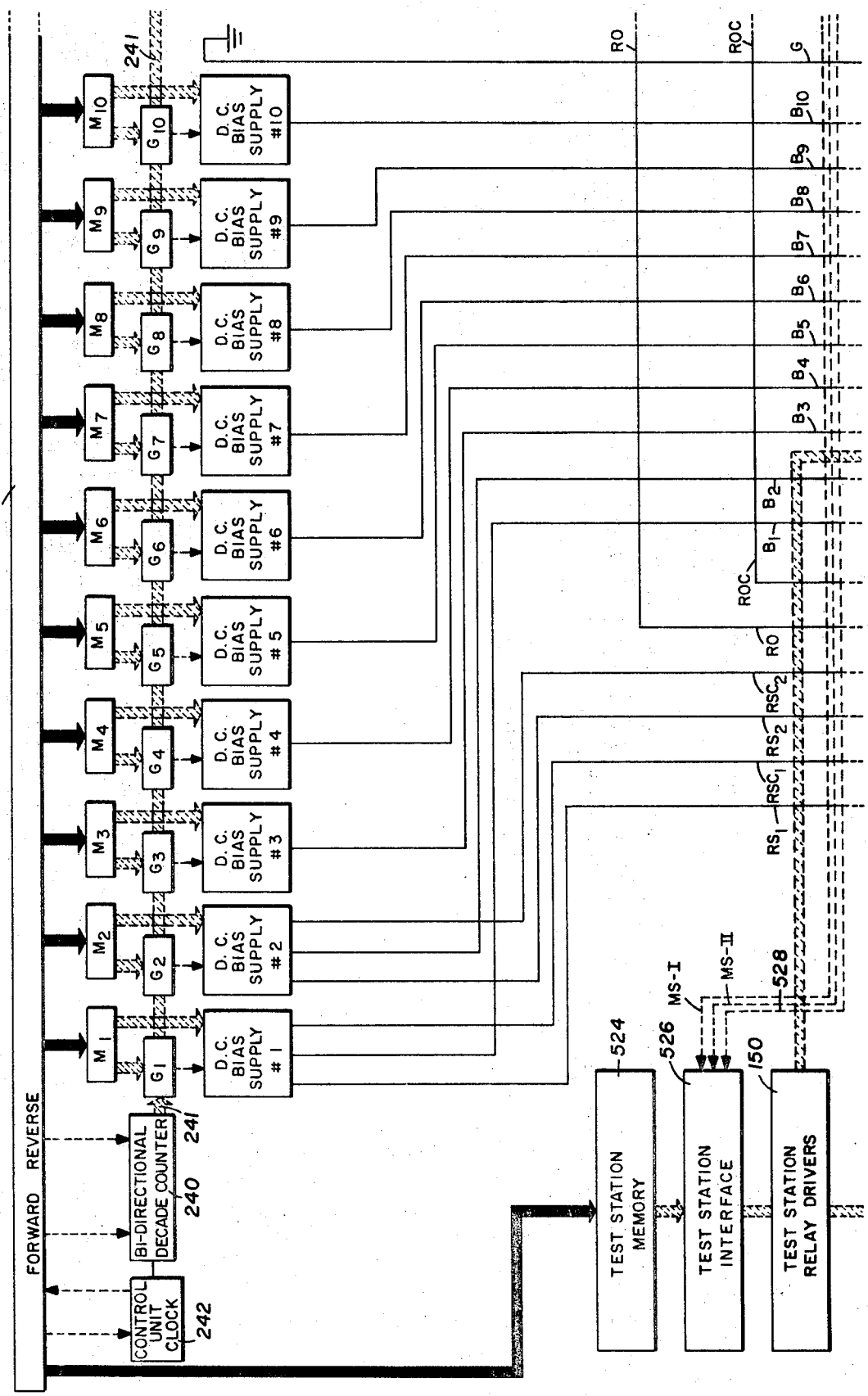
Figure 5B:
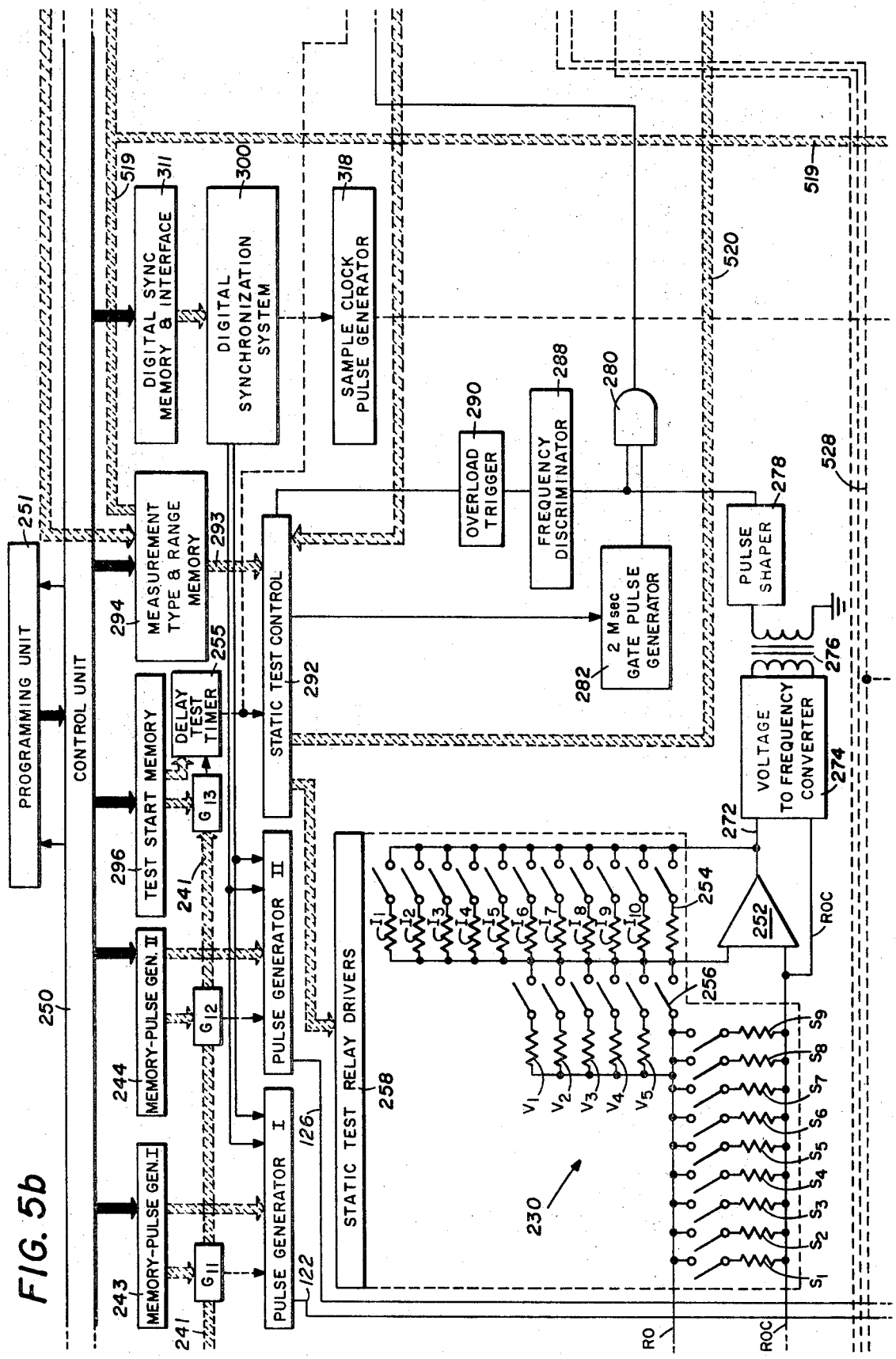
Figure 13A:
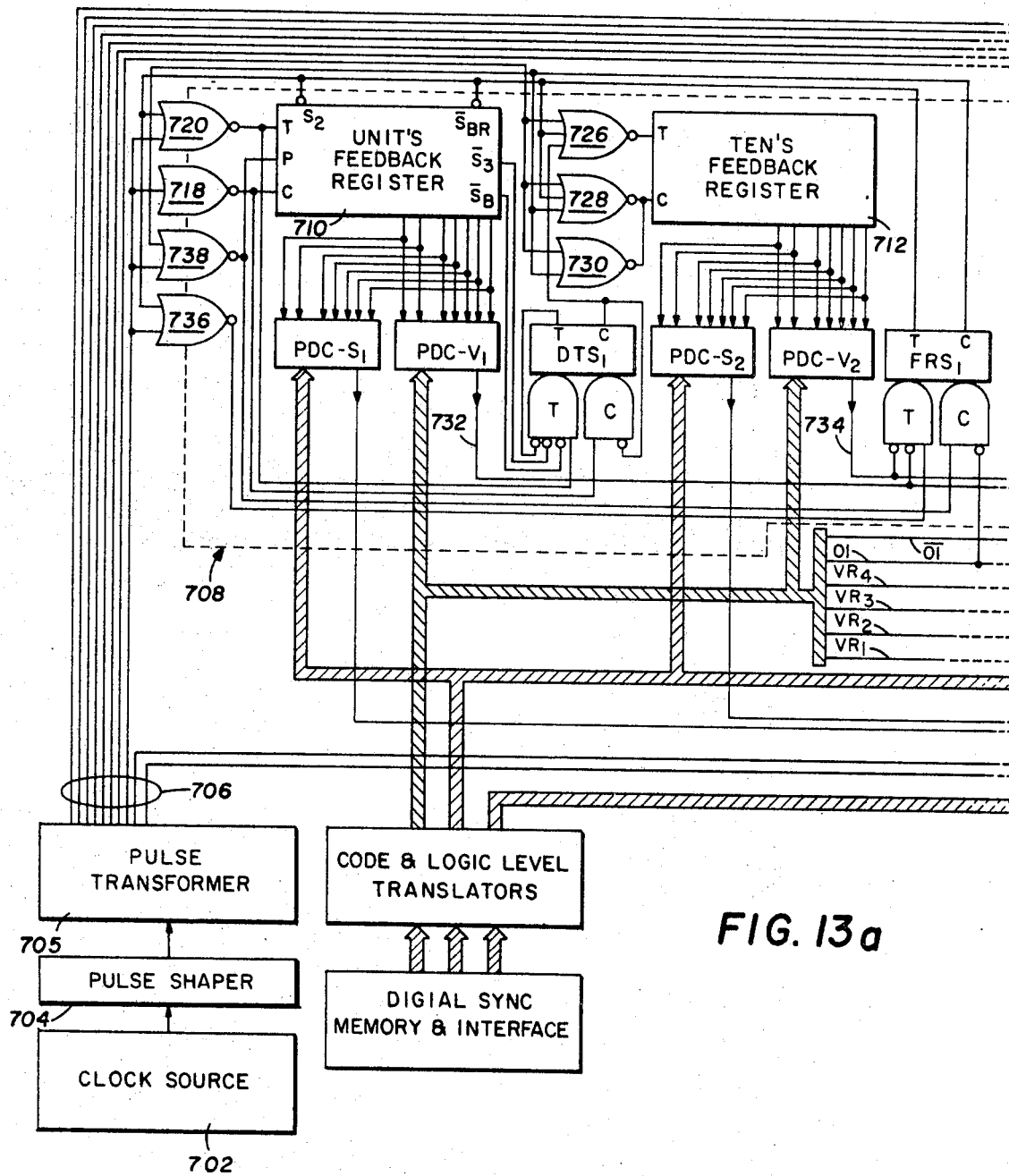
Figure 14:
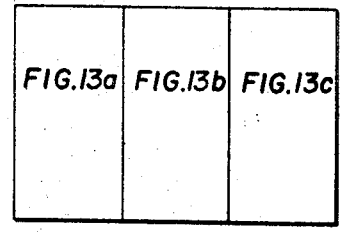
Figure 13B:
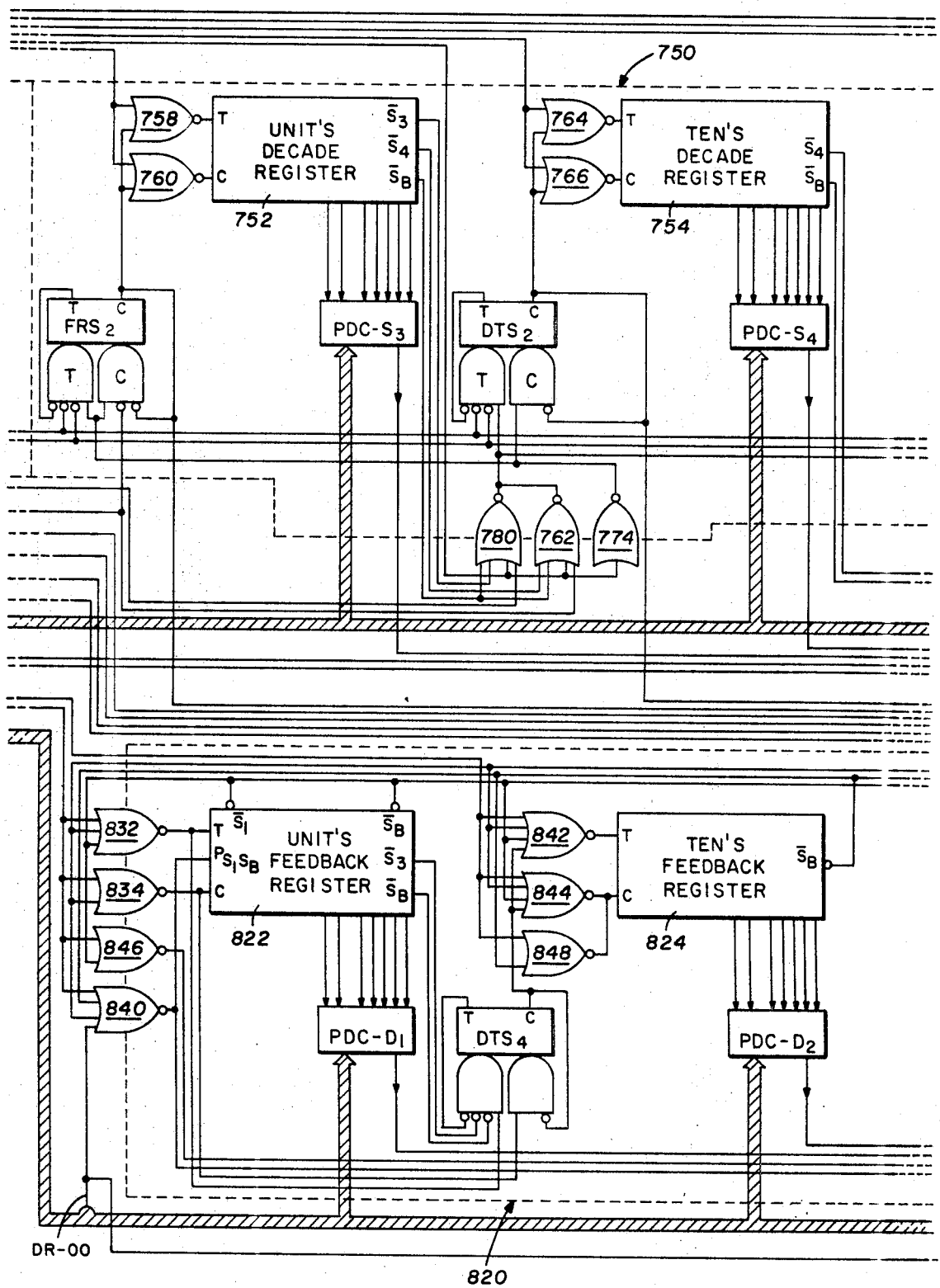
Figure 13C:
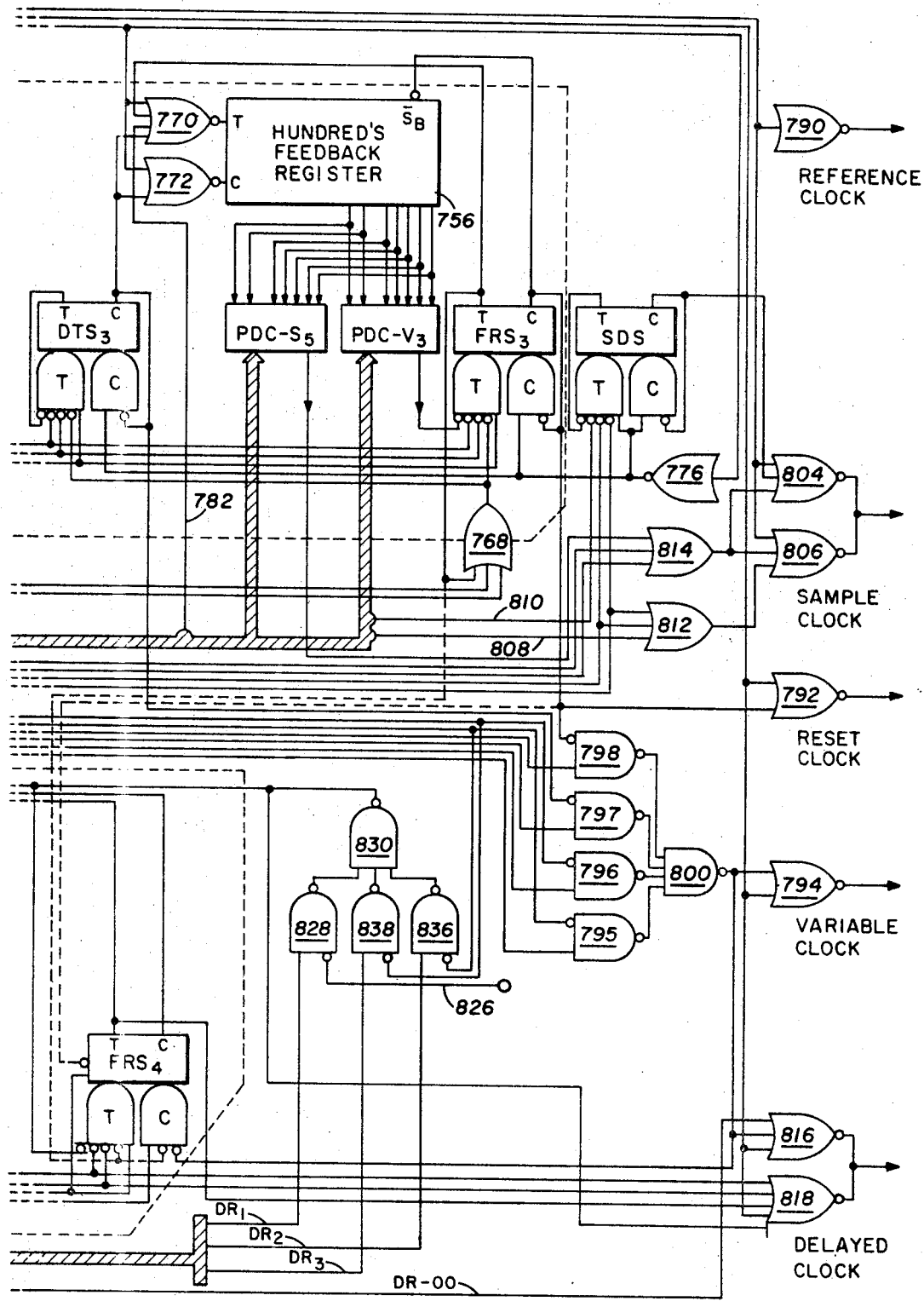
Figure 14A:
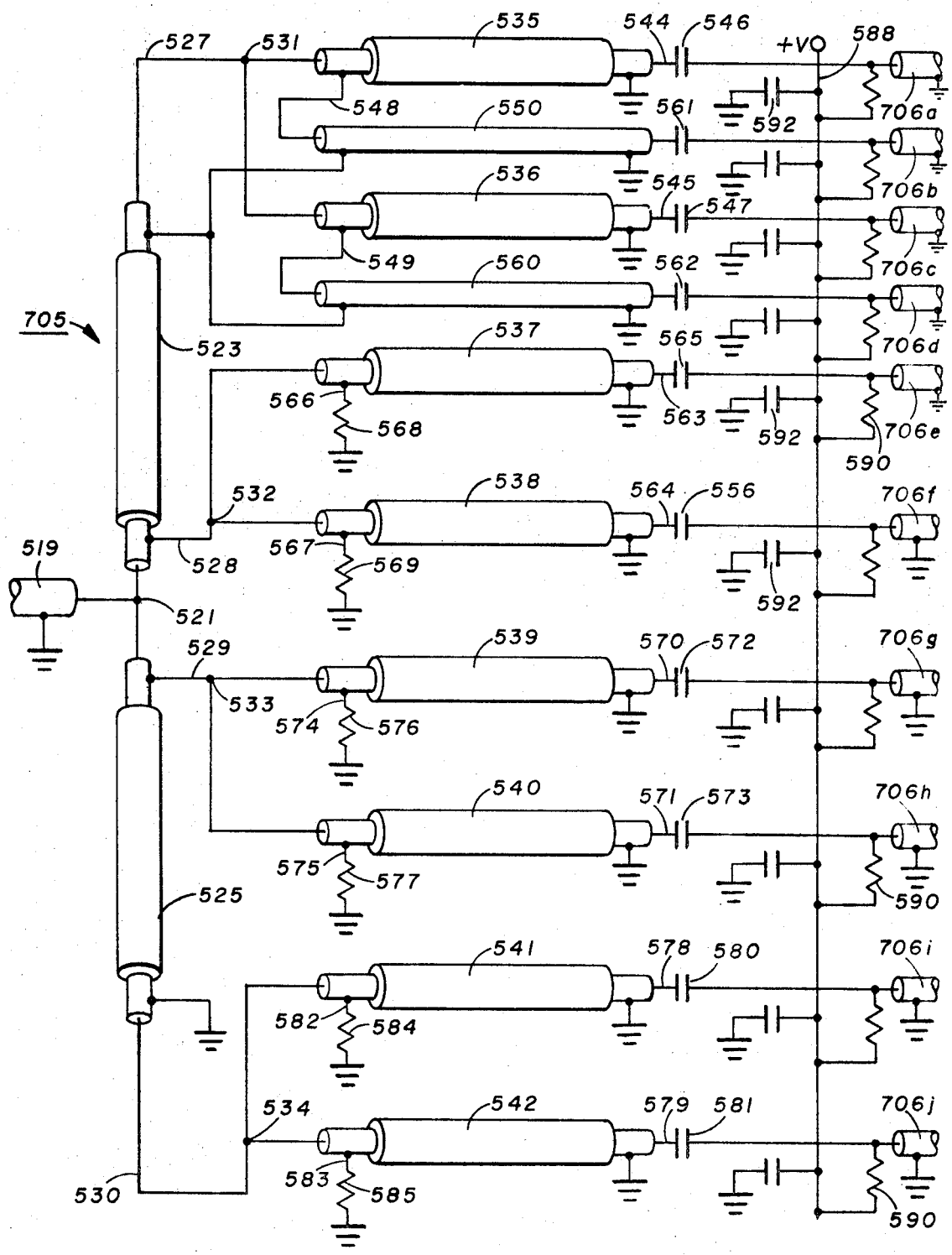
Figure 16B:
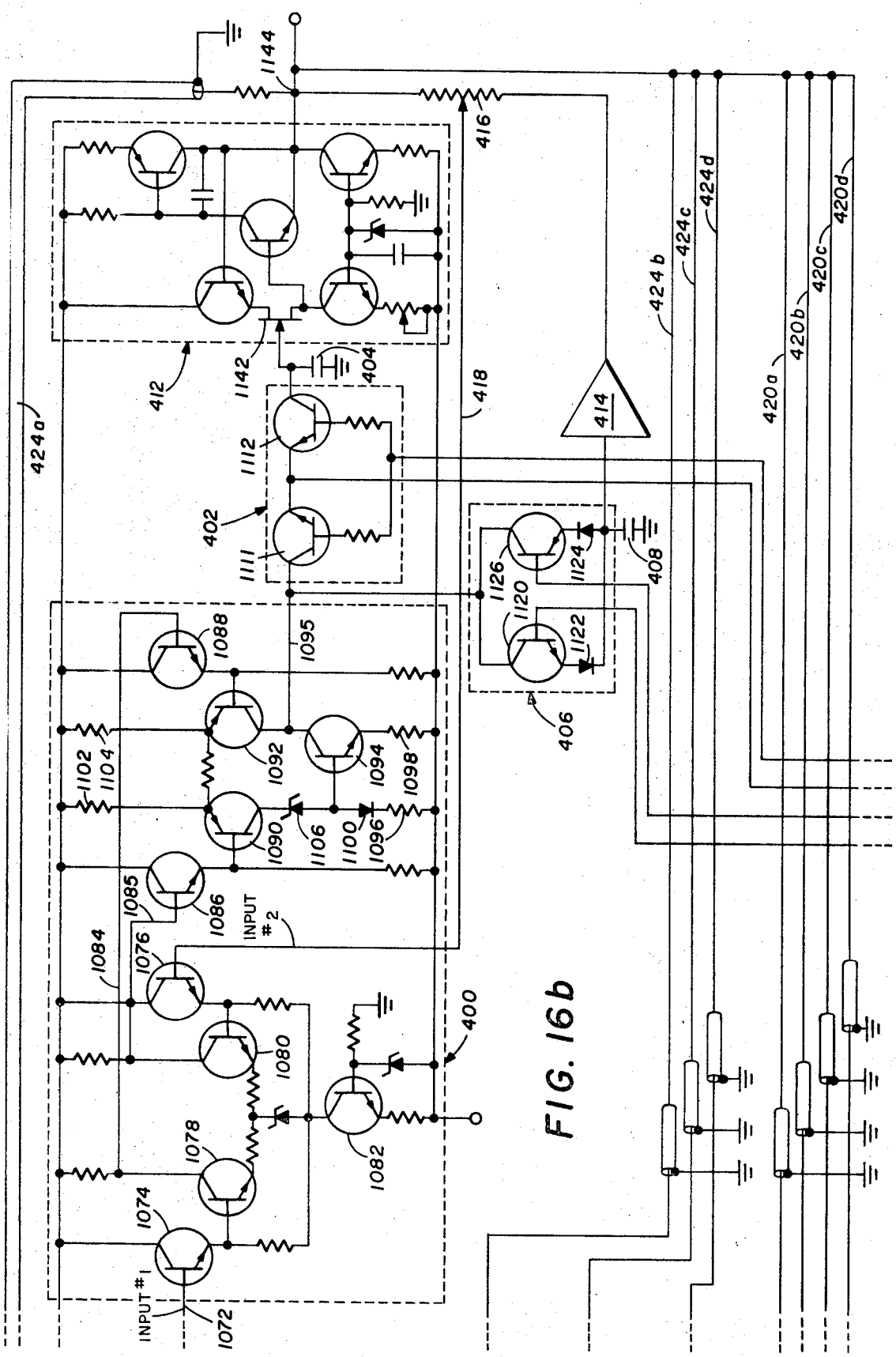
Figure 16D:
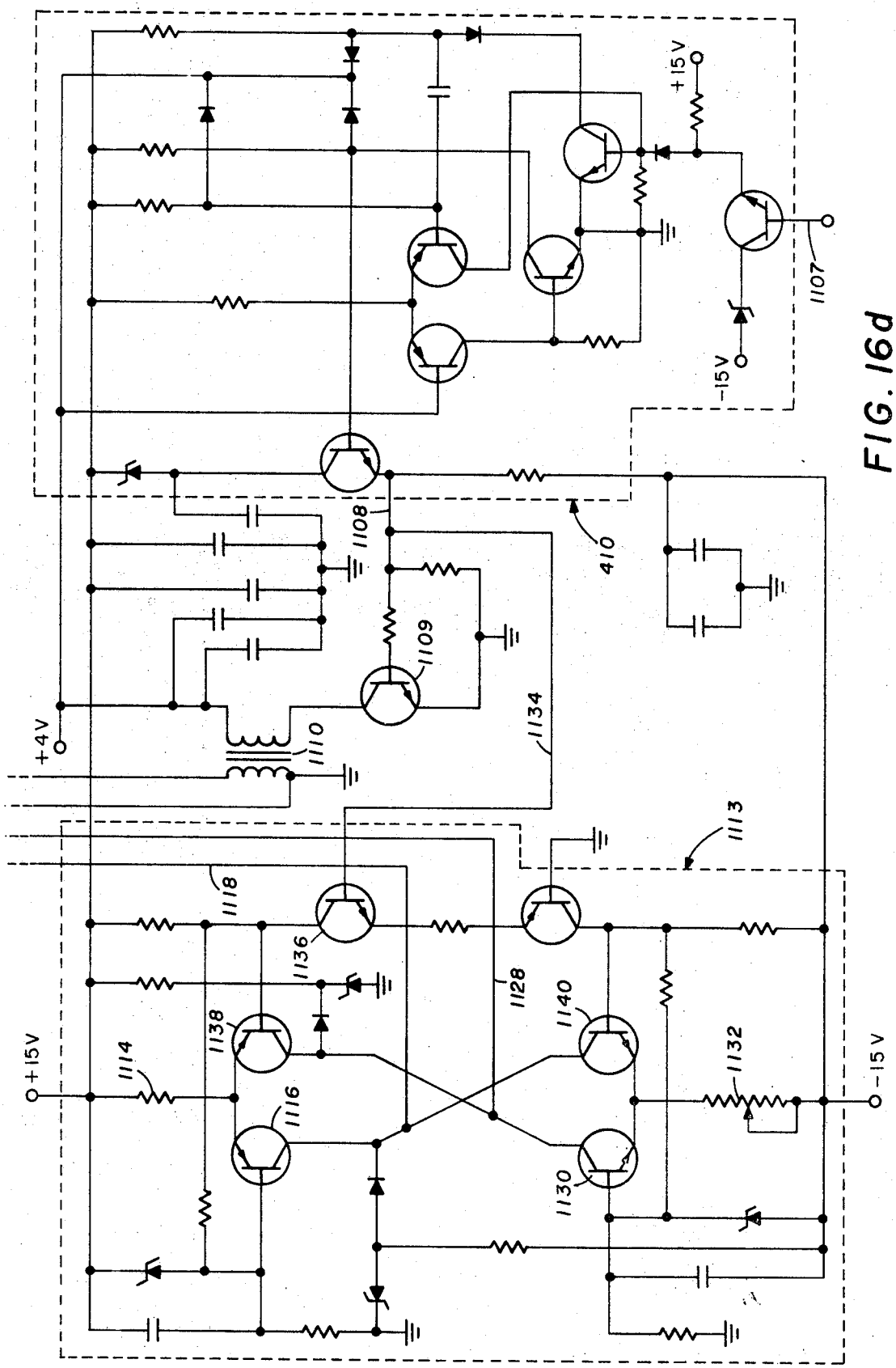
Figure 18A:
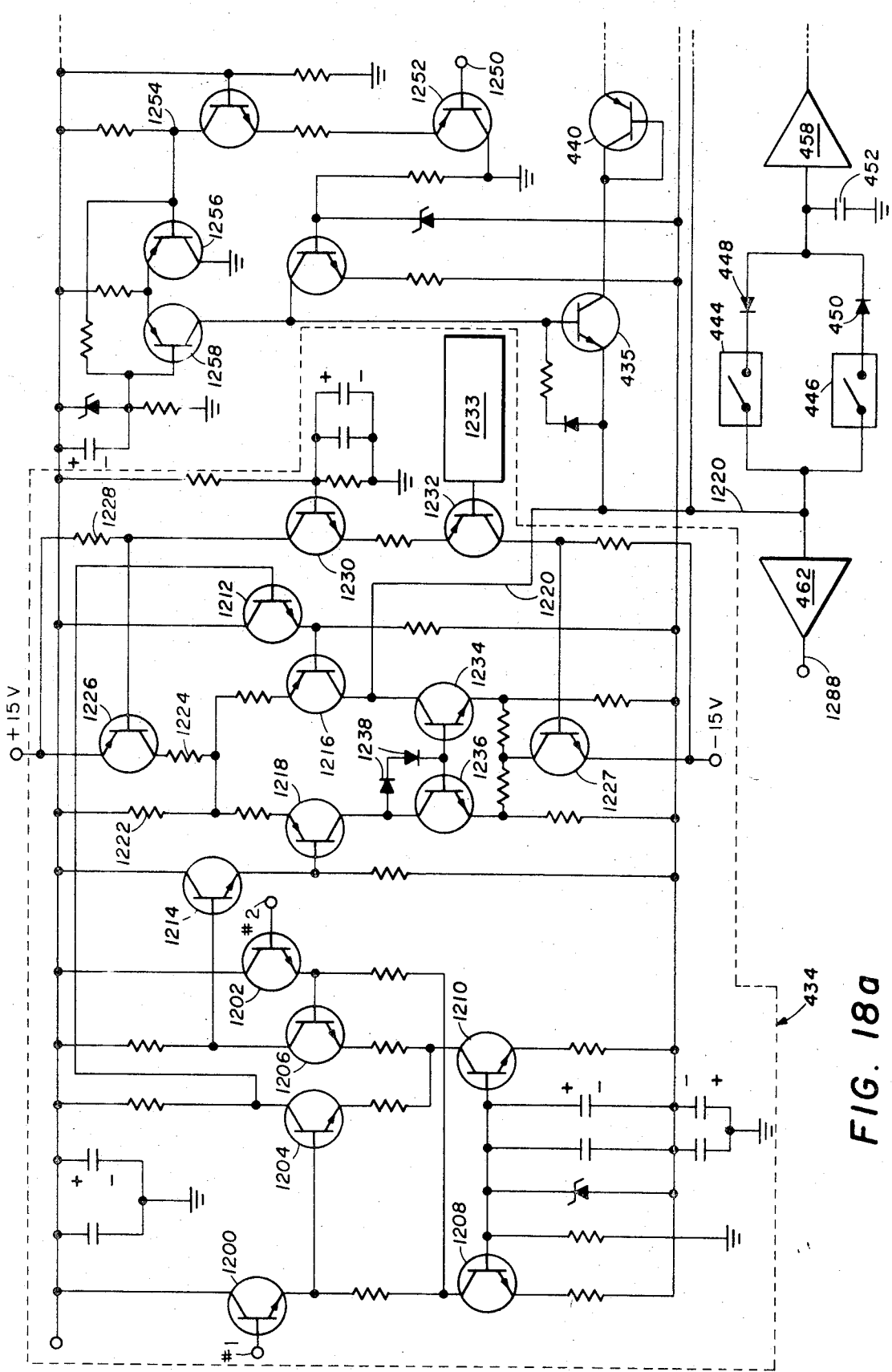
Figure 18B:
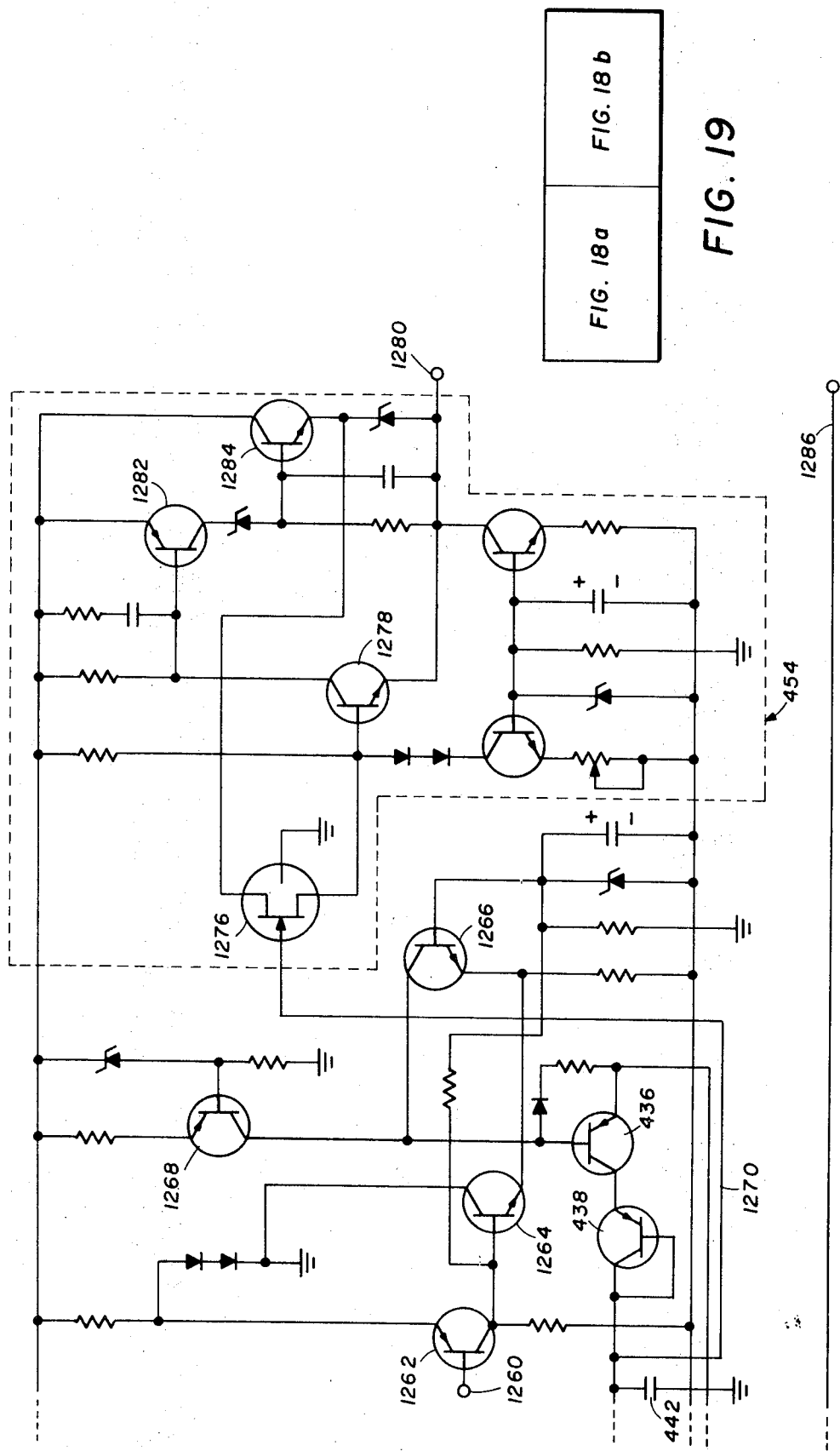
Figure 20:
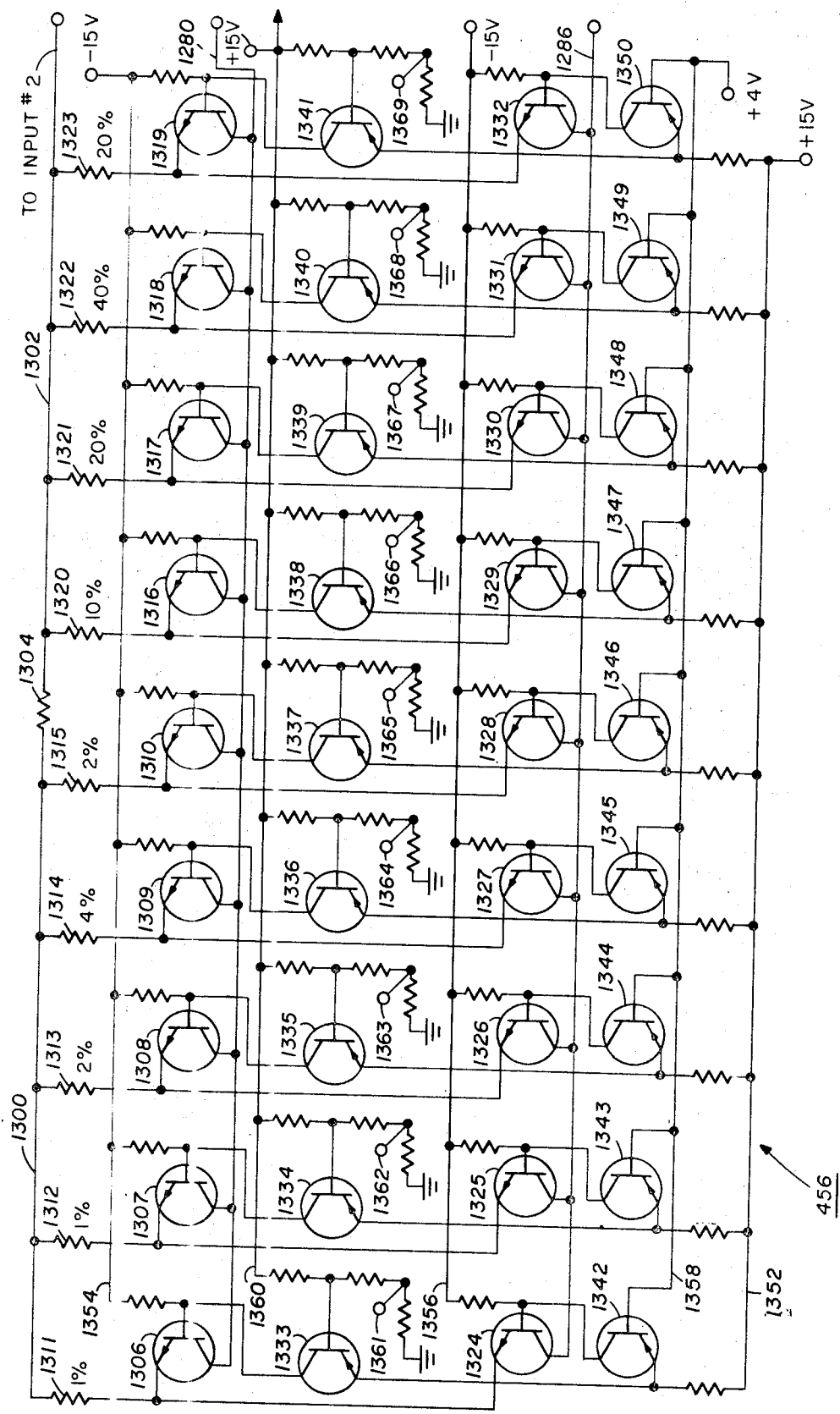
Figure 21:
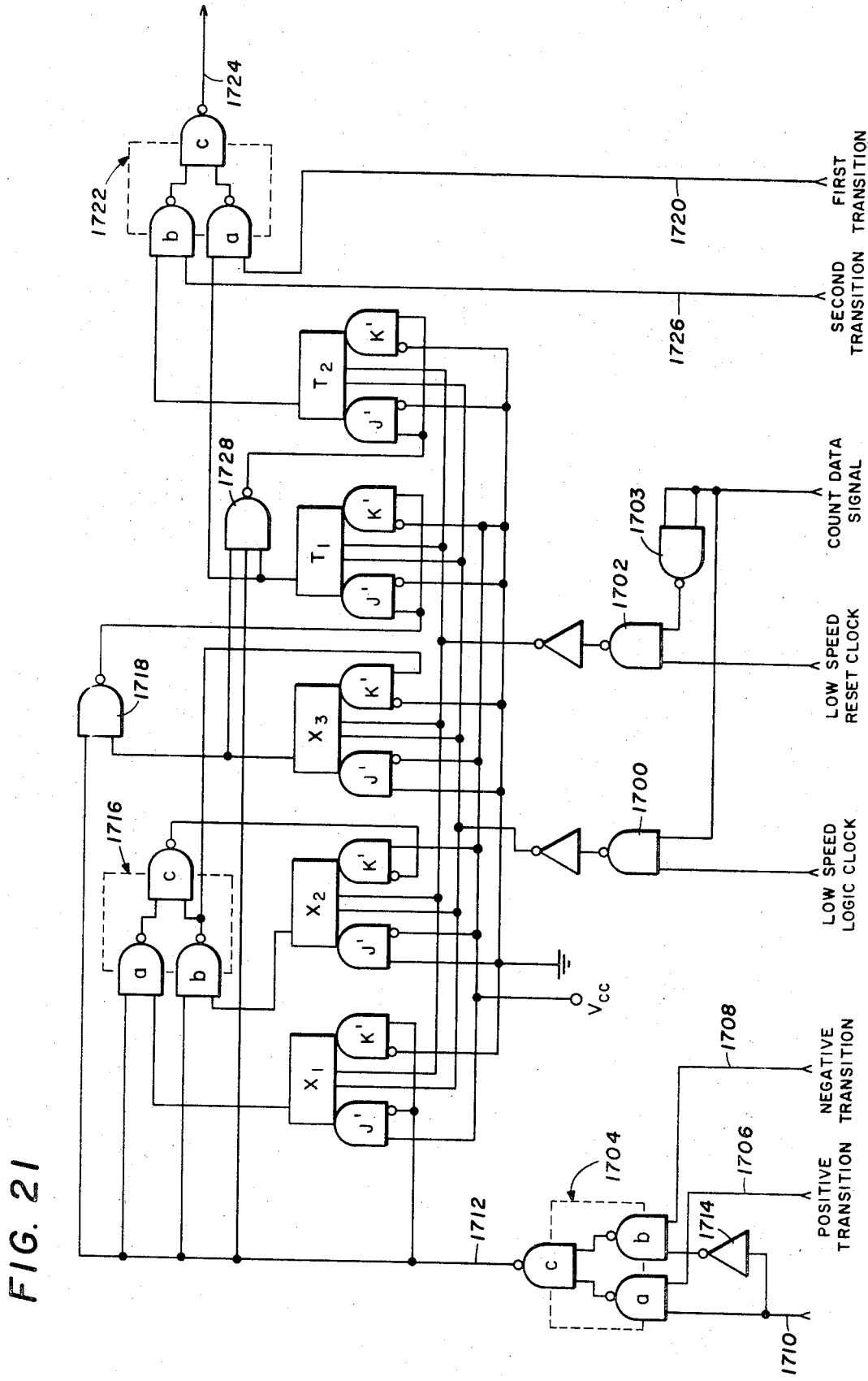
Figure 22:
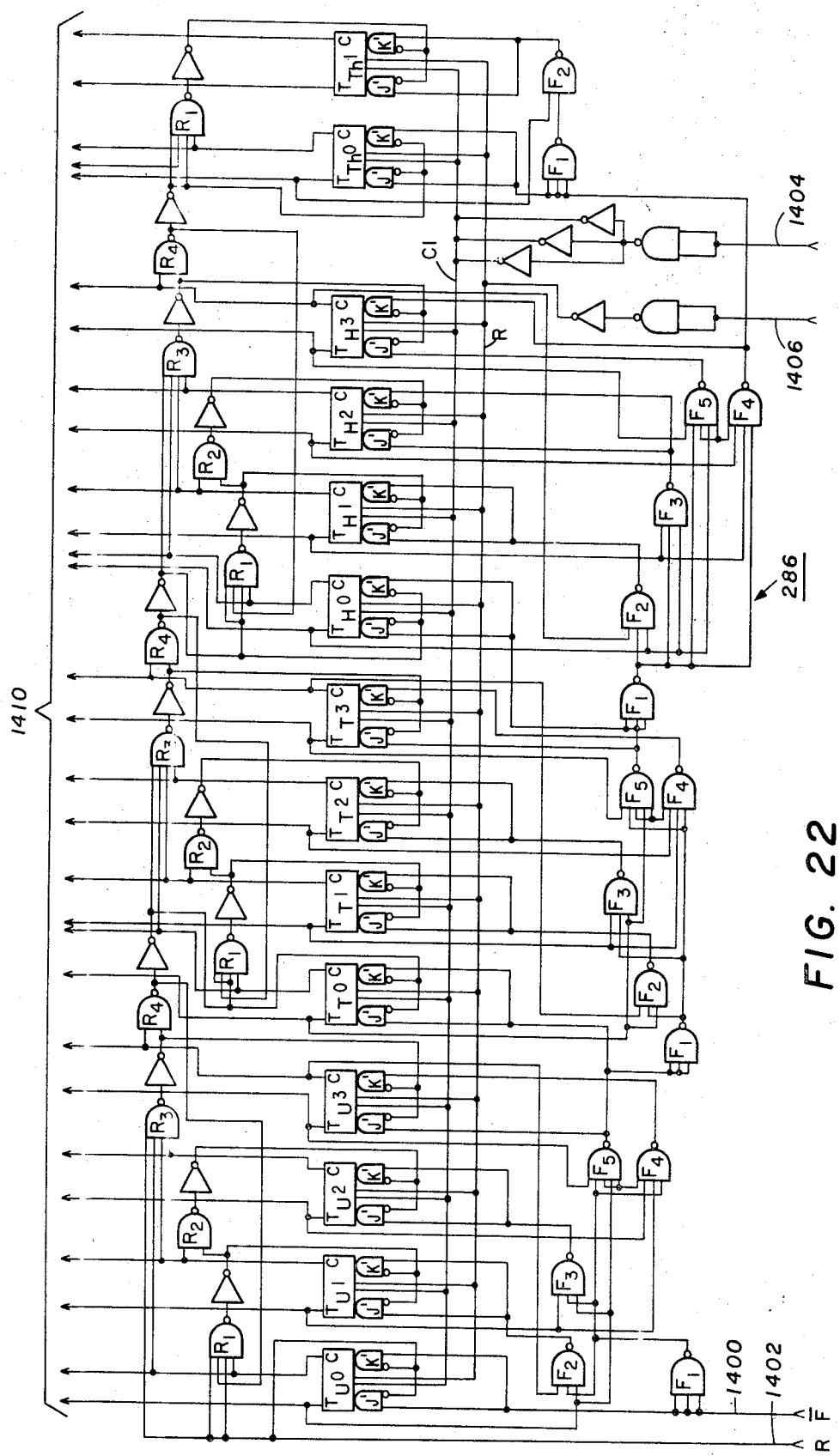
Figure 28:
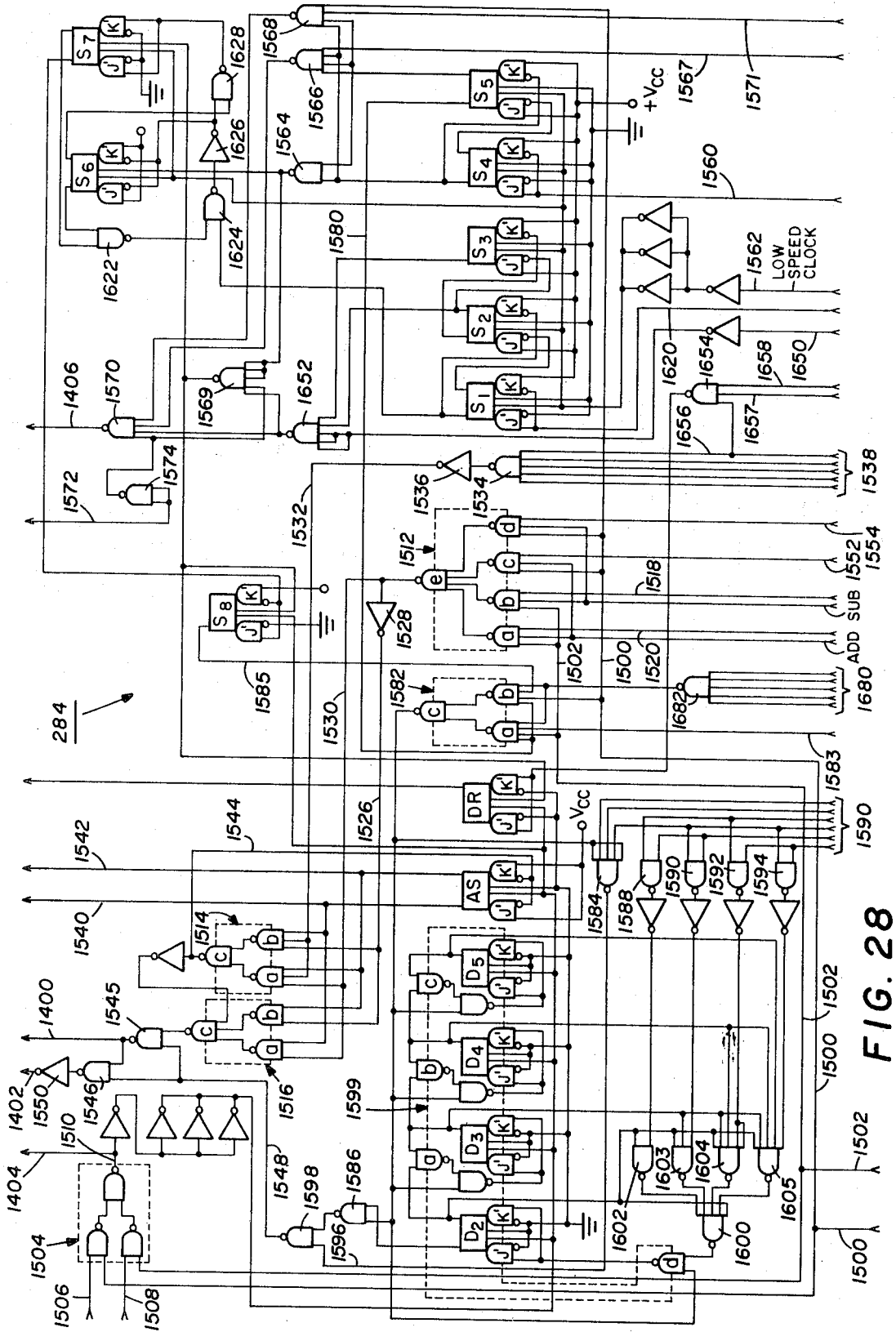
Figures 29, 30:
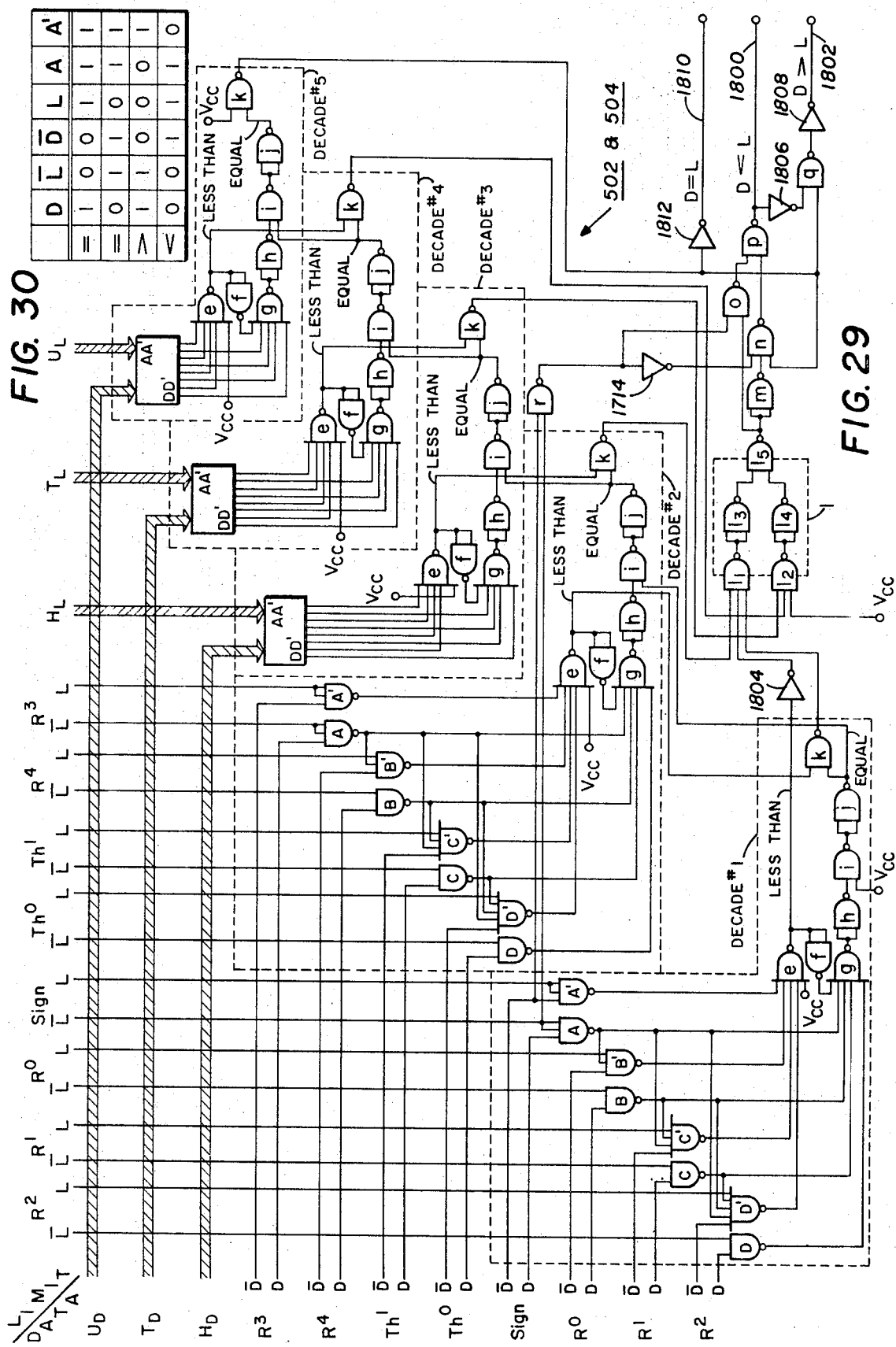

FIGS. 13a, 13b and 13c, taken collectively, are a schematic logic diagram of the digital synchronization system 300 shown in FIG. 5b;

FIG. 14 is a schematic diagram illustrating the manner in which FIGS. 13a–13c should be combined to produce a single composite drawing;

FIG. 14a is a schematic circuit diagram illustrating the multiple output pulse transformer of the digital synchronization system shown in FIGS. 13a–13c;

FIG. 15 is a schematic logic diagram of the increment counter and associate control circuitry of the digital synchronization system;

FIGS. 16a, 16b, 16c and 16d, collectively, are a schematic circuit diagram of a portion of the circuitry shown in FIG. 5e;

FIG. 17 is a schematic diagram illustrating the manner in which FIGS. 16a–16d should be combined to provide a single composite circuit diagram;

FIGS. 18a and 18b are schematic circuit diagrams of the reference and comparison system shown in FIG. 5f except for the percent digital-to-analog converter;

FIG. 19 is a schematic diagram illustrating the manner in which FIGS. 18a and 18b should be combined to produce a single composite drawing;

FIG. 20 is a schematic circuit diagram of the percent digital-to-analog converter shown in FIG. 5f;

FIG. 21 is a schematic logic diagram of the transition detector shown in FIG. 5f;

FIG. 22 is a schematic logic diagram of the data counter shown in FIG. 5c;

FIG. 23 is a timing diagram which serves to illustrate the function of the data counter when counting in the forward direction;

FIG. 24 is a timing diagram which serves to illustrate the operation of the data counter when counting in the reverse direction;

FIG. 25 is a symbolic representation of the J–K flip-flop used in the data readout subsystem;

FIGS. 26 and 27 are truth tables for the J–K flip-flop of FIG. 25;

FIG. 28 is a schematic logic diagram of the data counter control shown in FIG. 5c as well as the actual gate pulse generator and gate shown in FIG. 5b;

FIG. 29 is a schematic logic diagram of one of the digital comparators shown in FIG. 5c; and FIG. 30 is a truth table which assists in understanding the operation of the digital comparator of FIG. 29.

Referring now to the drawings, a typical integrated circuit component which may be tested by the method and system of the present invention is indicated generally by the reference numeral 10 in FIG. 1. The device 10 is comprised of a flat package 12 in which the semiconductor wafer is located. Sixteen leads 14 extend from the flat pack and are crimped around the ribs 16 and 18 of a plastic frame 20 which facilitates handling, testing and shipment of the device. Although the device 10 is illustrated as having sixteen leads, and the system illustrated has a capacity of handling only sixteen leads for dynamic testing, it is to be understood that within the broader aspects of the invention a device having substantially any number of leads may be tested by proper modification of the test station and system.

TEST STATION SUBSYSTEM

The device 10 is received in a test socket 22 of a high frequency test station indicated generally by the reference numeral 25. The test station 25 is comprised of the socket board 24 and socket 22, a relay unit 26, and a performance board 28.

The test socket 22 has a number of leaf spring contacts 23 each of which engages and makes electrical contact with each of the device leads 14. The socket 22 is mounted on a printed circuit socket board 24 which is plugged into the relay unit 26 by connectors 30. Suitable printed circuits formed on the socket board 24 electrically connect the leaf spring contacts 23 and the respective connectors 30. The socket 22 and the socket board 24 are specially designed for each different type of device being tested.

To insure that the proper test socket is being used for a particular test, an identification code is formed by a printed circuit (represented schematically at 32) on the socket board 24 and this code is fed out through contacts 34, which are mounted on a plate 36, to a control unit which will hereafter be described.

The relay unit 26 (see FIG. 5d) has nine high frequency relays $R_1$ through $R_9$ for each of the sixteen device leads $L_1$ through $L_{16}$. Thus the nine relays for lead $L_1$ are designated $L_1R_1$ through $L_1R_9$, etc. Each relay $L_nR_n$ is comprised of a glass encapsulated reed switch which is controlled by a coil wound around the glass capsule. The relays $L_nR_n$ are mounted in a circular housing 40 which is divided into four quadrants by radial partitions 41, 42, 43 and 44. Each quadrant, for example the quadrant between radial partitions 44 and 41, is divided into five segments by an insert 46 having radial partitions 47, 48, 49 and 50. Four upper printed circuit boards 60 overlay the top of each quadrant and four lower printed circuit boards 62 form the bottom of each quadrant. Each of the relays $L_nR_n$ is mounted between the upper and lower printed circuit boards with the relays structurally interconnecting the boards. This construction permits each of the segments to be merely dropped into the quarter segments of the circular housing 40 and hang suspended from the upper boards 60. The lead wire extending from the lower end of each of the relays $L_nR_n$ protrudes through the respective lower printed circuit board 62 and into a female connector 64 on a printed circuit adapter board 66. The adapter board 66 has leaf spring contacts 68 on its under surface which are electrically connected to the various female connectors 64 by printed circuits on the adapter board 66. The spring contacts 68 are conveniently arranged in two concentric circles.

The circular housing 40 is keyed into a ring 74, and the adapter board 66 is connected to the ring 74 by peripherally spaced screws 76 and standoffs 78. The entire relay unit 26 is received in an opening 80 cut in a tabletop 82 and is suspended from the upper plate 36 by screws 70 which extend through the ring 74 and standoffs 72 and are connected to a plate 36. The plate 36 rests on the tabletop around the periphery of the opening 80.

The performance board 28 has a large number of button contacts 86 which are arranged in two concentric circles and spaced to engage the spring contacts 68 on the lower surface of the adapter board 66. As will hereafter be described in greater detail, the performance board 28 is customized for each different type device 10 being tested and accordingly is made easily removable. This is accomplished by resting the performance board 28 on a tray 90 having a peripheral lip 92 and pedestal supports 94, together with suitable aligning means (not illustrated). The tray 90 is supported by suitable camming means represented schematically at 96 which are carried by a drawer 98. The drawer has rollers 100 which ride on tracks 102 which are secured to the desk top 82 or other support means. When the camming means 96 are rotated, the tray 90 and performance board 28 are lowered from the adaptor board 66 so that the drawer may be pulled out and the performance board replaced. The electrical connections of the test station 25 are hereafter described in connection with FIG. 5d.

Figure 5D:
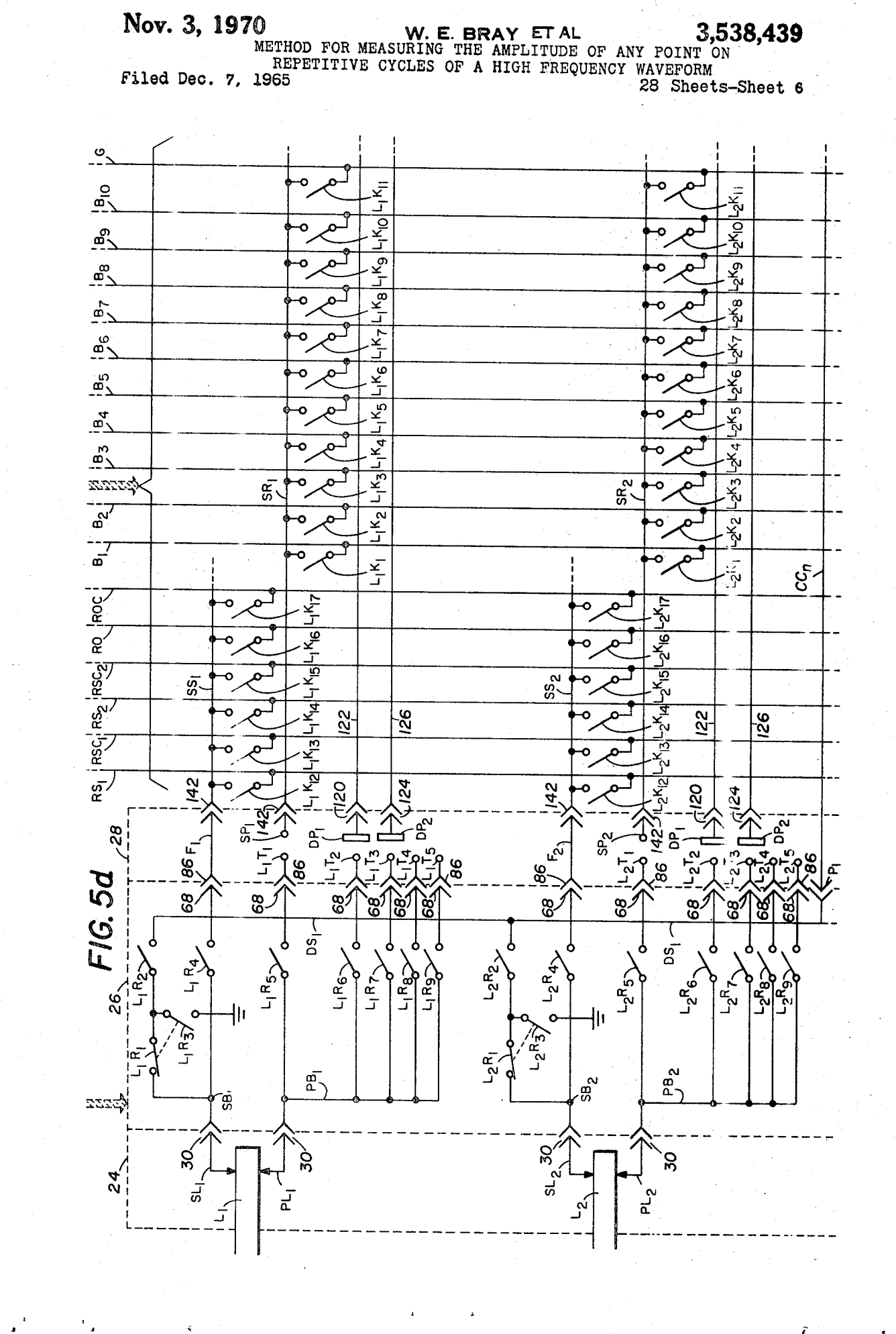

Referring now to FIGS. 5a–5f, and in particular to FIG. 5d, two leads of the device under test are illustrated schematically and designated by the reference characters $L_1$ and $L_2$. It should be noted that the device leads $L_3$–$L_{16}$, as well as the components associated with device leads $L_3$–$L_{16}$, are not illustrated in FIG. 5d, but are mentioned merely to assist in understanding the test station. The socket board 24 has power leads $PL_1$–$PL_{16}$ which are electrically connected to the device leads $L_1$–$L_{16}$ and to power buses $PB_1$–$PB_{16}$ on the upper printed circuit board 60 by the connectors 30. The power buses $PB_1$–$PB_{16}$ are connected through relays $L_nR_5$–$L_nR_9$ to the leaf spring contacts 68 on the adaptor board 66. The buttons 86 on the performance board 28 which mate with the contacts 68 are connected to power terminals $L_nT_1$-$L_nT_5$.

Figure 4:
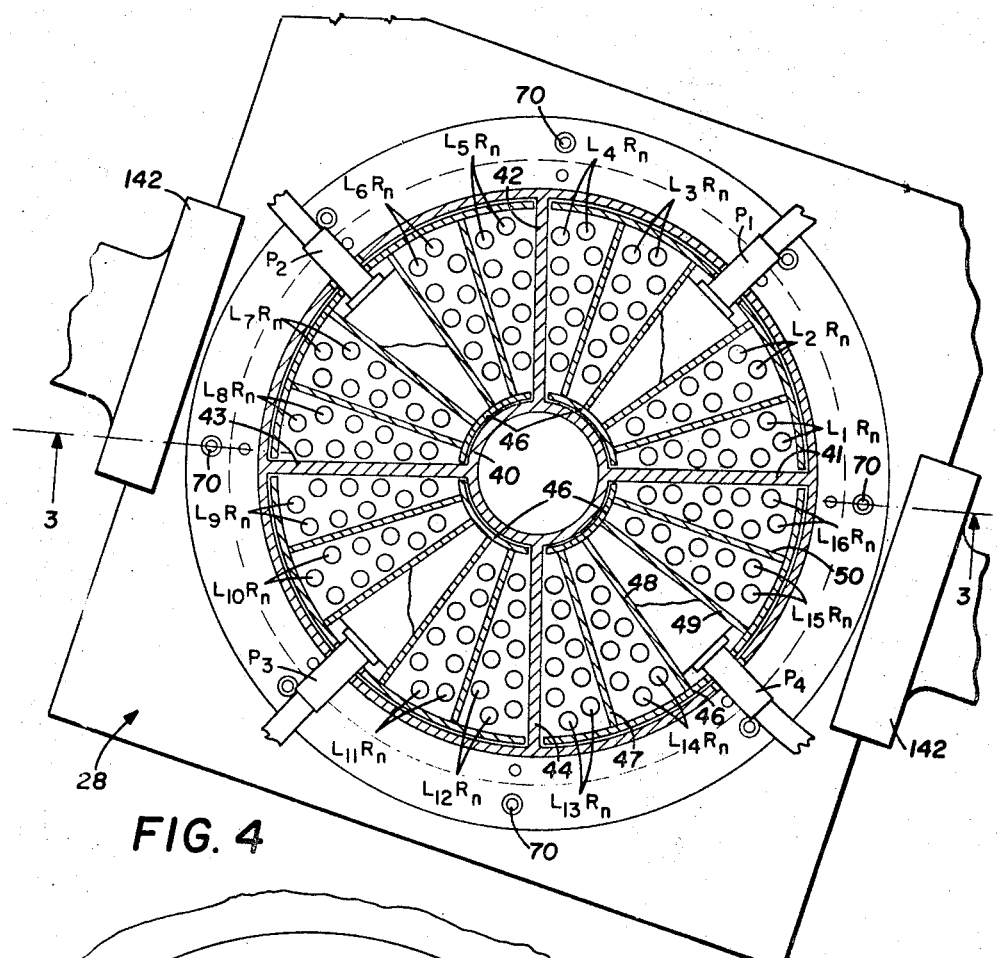
FIG. 4 is a somewhat schematic sectional view taken substantially on lines 4—4 of FIG. 3.

Kelvin type sense leads $SL_1$-$SL_{16}$ on the socket board 24 are each connected by one of the conductors 30 to sense buses $SB_1$-$SB_{16}$. D.C. sensing measurements are made through relay $L_1R_4$, and the connector comprised of a spring contact 68 and button contact 86 on the performance board 28. In most cases, a direct feed-through conductor $F_1$-$F_{16}$ will be formed on the performance board to connect the button 86 to a connector 142 presently to be described, and finally to a static sense bus $SS_n$ for each device lead. Dynamic sensing is provided through relays $L_nR_1$ and $L_nR_2$ to dynamic sense buses $DS_1$-$DS_4$, each of which may be conveniently located on either the upper or lower printed circuit boards 60 or 62 of each quadrant to interconnect the four relays $L_nR_2$ in that quadrant. For example, relays $L_1R_2$-$L_4R_2$ would be connected to dynamic sense bus $DS_1$. Similarly, the groups of relays $L_5R_2$-$L_8R_2$, $L_9R_2$-$L_{12}R_2$, and $L_{13}R_2$-$L_{16}R_2$ would be connected to dynamic sense buses $DS_2$, $DS_3$ and $DS_4$, respectively, which are not illustrated. Four bayonet type probe connectors $P_1$-$P_4$ are then connected to the dynamic sense buses $DS_1$-$DS_4$, respectively. The probe connectors $P_1$-$P_4$ are physically passed through the wall of the circular housing 40 into a female receptacle disposed in the center segment of each of the four quadrants as can best be seen in FIG. 4, and a sampling bridge as hereafter described is located in each probe connector.

Static bias supply terminals $SP_1$-$SP_{16}$ are formed on the performance board 28 for leads $L_1$-$L_{16}$, respectively. The sixteen straight through conductors $F_1$-$F_{16}$ are connected to static sense buses $SS_1$-$SS_{16}$ by multilead connectors 142 which may be seen at each edge of the performance board 28 in FIG. 3. A pair of dynamic stimuli buses $DP_1$ and $DP_2$ are provided on the performance board 28 and made available for connection to any one of the terminals $L_nT_1$-$L_nT_5$ at any one of the leads $L_1$-$L_{16}$ by means which will presently be described. The dynamic stimulus buses $DP_1$ and $DP_2$ on the performance board 28 may be circular in form and the terminals $L_nT_n$ arranged in a circle to facilitate connecting any of the terminals $L_nT_1$-$L_nT_5$ to either of the buses $DP_1$ or $DP_2$ by a jumper wire or load device as hereafter described. Bus $DP_1$ may be connected by a small connector 120 shown in FIG. 3 to a coaxial supply cable 122, and bus $DP_2$ may be connected by a like connector 124 to a coaxial supply cable 126. The function of the performance board 28 can best be understood after a description of the static power supplies and the dynamic pulse generators used to stimulate the device under test which will presently be described.

Figure 2:
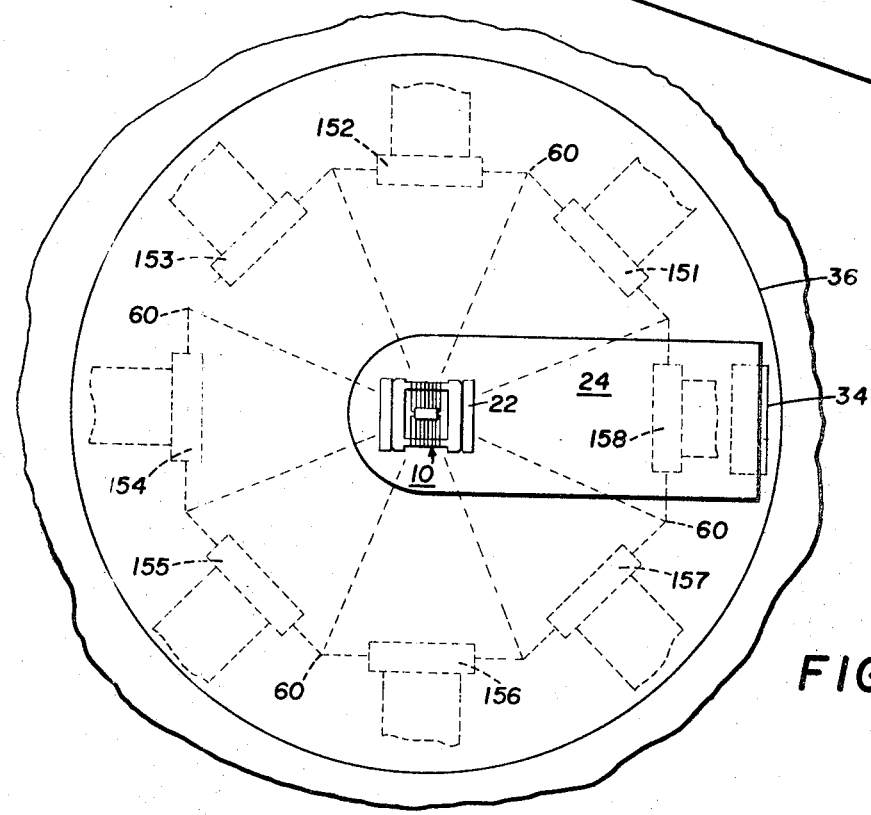
FIG. 2 is a plan view of the test station of the system of this invention.

Relays $L_nR_n$ are operated by current from a bank of controllable relay drivers 150. The leads from the drivers are coupled to the upper printed circuit board 60 by connectors 151-158 (see FIGS. 2 and 3). Each of the connectors 151-158 carries the conductors extending to the coils of the relays associated with the two device leads. For example, the connector 151 carries the relay driver leads to the coils of relays $L_1R_1$-$L_1R_9$ and relays $L_2R_1$-$L_2R_9$.

Ten D.C. bias supplies #1-#10 are connected to supply buses $B_1$-$B_{10}$, respectively. Each of the D.C. bias supplies is programmable over a wide range with respect to both voltage and current, and when operating in the voltage mode has an automatic current limiting feature. These bias supplies are commercially available items. Each of the sixteen static relay buses $SR_1$-$SR_{16}$ may be selectively connected to any one of the buses $B_1$-$B_{10}$ by the bank of relays $L_nK_1$-$L_nK_{10}$ or to a ground bus G by relays $L_nK_{11}$ provided for each device lead. D.C. bias supplies #1 and #2 have remote sense lines $RS_1$ and $RS_2$, and remote sense common lines $RSC_1$ and $RSC_2$ each of which may be selectively connected to any of the static sense buses $SS_1$-$SS_{16}$ by relays $L_nK_{12}$, $L_nK_{14}$, $L_nK_{13}$ and $L_nK_{15}$, respectively. The two remote sense leads for each of these bias supplies permit the sensing of either positive or negative voltages for reference purposes in the supplies. A pair of readout lines RO and ROC may also be individually connected to any one of the static sense lines by relays $L_nK_{16}$ and $L_nK_{17}$, respectively. The readout lines RO and ROC are the inputs to the static measurement subsystem 230 which will hereafter be described in greater detail. The coaxial cables 122 and 126 are connected to pulse generators I and II shown in FIG. 5b which produce pulse stimuli of a selected frequency, amplitude and width as hereafter described in greater detail.

The function of the performance board 28 will now be described. In a sequence of measurements or tests for a multilead device, it will often be necessary to apply D.C. bias levels to one or more of the device leads $L_1$-$L_{16}$ and to apply a pulse stimulus to others of the device leads. During a sequence of perhaps twenty-five tests to be performed on a single device, these bias levels and pulse stimuli will usually change in character and will usually be applied to different leads. In order to more nearly simulate the actual operating conditions, it will usually be necessary to connect some type of load in the bias or pulse stimulus circuit of the device, and the load value and character will often vary from test to test on a given device, and will nearly always vary for devices of different types. For this reason, the relay terminals $L_nT_2$-$L_nT_5$ and the static power terminals $SP_1$-$SP_{16}$ and dynamic power terminals $DP_1$ and $DP_2$ are oriented on the printed circuit board in close proximity. This provides great flexibility in that any terminal $L_nT_1$-$L_nT_5$ of each lead can be connected to any one of the supply buses $SP_1$, $DP_1$ or $DP_2$ either directly by a jumper wire or through an electronic component of the proper type and value, such as a resistor (indicated by the reference numeral 144 in FIG. 3), a capacitor or a resistor-capacitor network. This permits any device lead $L_n$ to be connected to any one of the ten D.C. bias supplies by connecting one of the terminals $L_nT_1$-$L_nT_5$ to the adjacent bus $SP_n$ and closing the corresponding switch $L_nK_n$. Then when the appropriate relay $L_nR_5$-$L_nR_9$ is closed during the proper test period, the lead will be connected to the selected power supply. Similarly, any one of the leads $L_1$-$L_{16}$ may be connected to either of the pulse generators I or II by wiring one of the terminals $L_nT_1$-$L_nT_5$ to the appropriate bus $DP_1$ or $DP_2$. As mentioned, this wiring may include a suitable electronic component selected to provide the desired circuit load. Any lead $L_1$-$L_{16}$ may be connected to ground, through a load if desired, by connecting one of the terminals $L_nT_1$-$L_nT_5$ to the adjacent bus $SP_n$ and closing the proper switch $L_nK_{11}$. The presence of the five terminals $L_nT_1$-$L_nT_5$ and controlling relays $L_nR_5$-$L_nR_9$ permits any one lead to be connected to the same power bus $SP_1$, $DP_1$ or $DP_2$ by different load components for different tests. Up to ten different D.C. bias leads may be used during any one time and any one bias supply may be connected to any number of device leads simultaneously. The provision of two pulse generators which are synchronously controlled as hereafter described permits the application of two related pulse trains to different terminals of the device.

Both static and dynamic sensing, as well as the remote sensing for D.C. bias supplies #1 and #2, are made through a Kelvin connection to the particular lead. Static measurements are made by closing relay $L_nR_4$ and opening relays $L_nR_2$ and $L_nR_3$ and closing the appropriate relay $L_nK_{16}$ or $L_nK_{17}$. Dynamic measurements are made by opening relay $L_nR_4$ and closing relays $L_nR_1$ and $L_nR_2$. The probes are grounded during the storage of a reference voltage in the dynamic measuring subsystem as will hereafter be described by opening relay $L_nR_1$ and closing relays $L_nR_2$ and $L_nR_3$. It should be noted that relays $L_nR_1$ and $L_nR_3$ are always operated in the alternative as represented by the interconnecting dotted line.

The time at which each of the D.C. bias supplies

1–#10 and the pulse generators I and II is activated may be programmed so that the bias voltages and pulse stimuli may be applied to the device under test in any desired sequence in order to protect the device. A bi-directional decade counter 240 sequentially energizes ten successive sequence lines 241 on ten successive pulses of the control unit clock 242. The ten sequence lines 241 extend to each of thirteen gate logic circuits $G_1$–$G_{13}$. Shift register memories $M_1$ through $M_{10}$ store program information for the D.C. bias supplies #1–#10, respectively. Each of the memories $M_1$–$M_{10}$ stores information concerning the type and level of bias to be supplied, whether the voltage is to be referenced based upon the voltage at the device lead or at the supply, the time at which the bias supply is to be activated, etc. Memories 243 and 244 store similar information for the pulse generators. An activate signal is gated to each respective bias supply and pulse generator by the respective gate logic systems $G_1$–$G_{12}$ when the logic level of the sequence line programmed for the particular supply or generator changes from "0 logic level to a "1" logic level.

SYSTEM OPERATING SEQUENCE

Figures 8, 9:
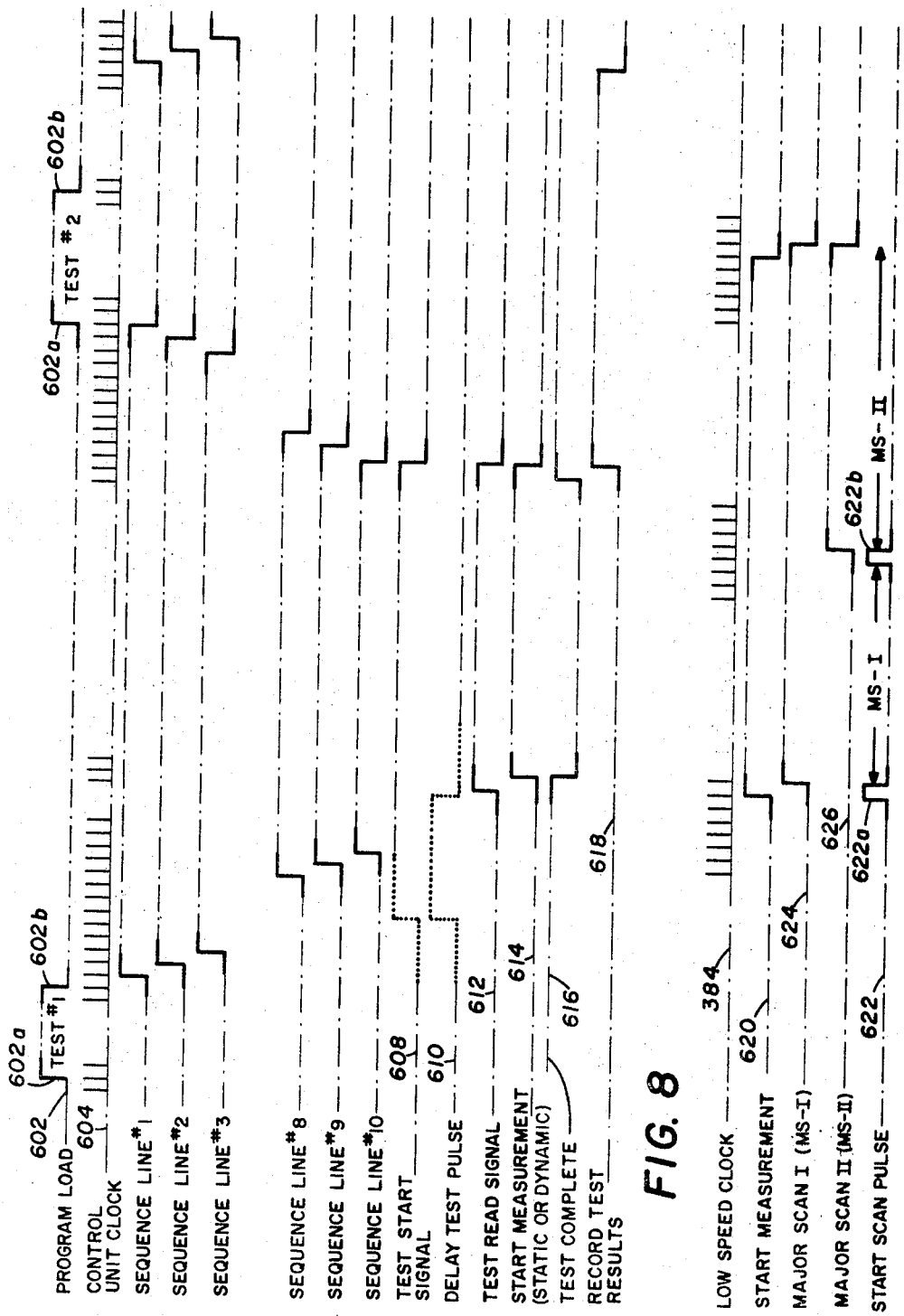
FIG. 8 is a timing diagram for the system of FIGS. 5a–5f.
FIG. 9 is a timing diagram illustrating the automatic sequence for a dynamic measurement.

The operating sequence of the system may be best understood by reference to the timing diagram of FIG. 8. The entire system is operated by the control unit 250. One of the principal functions of the control unit 250 is to route the program information from the programming unit 251 to the various shift register memories of the system which have been or will be described. Operation of the control unit 250 is synchronized by the control unit clock 242, the output of which is indicated by the time line 604. After operation of the system is initiated from the control unit 250, all program information for test No. 1 is routed into and stored in the respective memories during the period starting at 602a and ending at 602b.

The programming unit 251 may be of any conventional type, such as magnetic, punched card, punched tape, or computer, so that a sequence of different tests, including major scans I and II for a dynamic measurement, or a static measurement, can be easily repeated for successive test devices. As mentioned, the control unit 250 starts and stops the program unit 251 and routes the information from the programming unit to the appropriate memory as a result of a coded address at the beginning of each set of program information to be put in a particular register. Since all memories are shift registers, the memory must be completely filled in order to place the information in the proper bits of the shift register. The programming unit is automatically stopped after each test has been programmed by a stop signal in the program. The use of addressable shift register memories saves a considerable amount of programming time because for each succeeding test, only the registers in which a test condition is to be changed need be reprogrammed.

After the programming has been completed, as indicated by a signal from the programming unit to the control unit, the bi-directional decade counter 240 is activated to count the control unit clock pulses 604 in the forward direction and sequentially bring the ten sequence lines #1–#10 (which are indicated collectively by the reference numeral 241 in FIG. 5a) up to a logic "1" level as indicated by the time lines in FIG. 8. As previously described, any one of the D.C. bias supplies #1–#10 or the pulse generators I and II may be activated by a signal gated through the logic gate circuits $G_1$–$G_{12}$, respectively, by one of the sequence lines and a program line from the respective memories $M_1$–$M_{10}$, 243 and 244. In the same manner, any one of the ten sequence lines together with a program line from a test start memory 296 may gate a test start signal represented by the time line 608 from the logic gate circuit $G_{13}$ to a delay test timer 255. The delay test timer produces a delay test pulse represented by the time line 610 upon receipt of the test start signal 608. The delay test pulse 610 continues for a time determined by program information from the test start memory 296 to permit the device under test to stabilize. After the delay test pulse 610, a test read signal represented by the time line 612 is sent to the static test control 292 and to the dynamic sequence timetable 470 which will hereafter be described. A start measurement signal 614 is then generated in both the static and dynamic measuring subsystems to initiate automatic operation of each of the subsystems in accordance with the program instructions.

Upon the completion of the static or dynamic measurement, a test complete signal 616 is sent back to the control unit 250 which generates a record test results signal 618, reverses the bi-directional counter 240, and starts rippling down the sequence lines #1–#10 in reverse order, and also terminates the test start signal 608, terminates the test read signal 612, and terminates the start measurement signal 614. As soon as sequence line #1 has returned to "0" logic level, the program load signal 602 is sent to the programming unit 251 and the program information for test No. 2 is fed into the shift register memories. Upon completion of the programming for test No. 2 as indicated by the fall 602 of the program load signal, or the termination of the recordation of the data from test No. 1, as determined by the fall of the record test result signal 618, the sequence lines #1–#10 are again rippled up and the second test proceeds in the same manner.

STATIC MEASUREMENT SUBSYSTEM

The readout lines RO and ROC are connected to the inputs of a static measuring subsystem indicated generally by the reference numeral 230. The subsystem includes a differential, operational amplifier 252 which is used to make both voltage and current measurements between the two lines RO and ROC. The readout common line ROC is always connected to one input of the amplifier 252. The readout line RO is connectable through one of five attenuating resistor-relay branches $V_1$–$V_5$ to make voltage measurements in different ranges, since the resistor values in the branches are different to provide different degrees of attenuation. A resistor-relay branch 254 is also closed to provide a feedback loop for the amplifier of a standard resistance value for all voltage measurements. For current measurements, one of nine resistor-relay branches $S_1$–$S_9$ is first closed across the input leads RO and ROC and the voltage drop across the branch measured by closing one of branches $V_1$–$V_5$, depending on the range, for a brief sample period during which the voltage drop across $S_1$–$S_9$ is sampled to determine whether or not the current to be measured is of such a magnitude as to drive the amplifier 252 into hard saturation. If not, the closed resistor-relay branch $S_n$, the closed branch $V_n$, and relay 254 are opened, and the relay 256 is closed and one of the resistor-relay branches $I_1$–$I_{10}$ is closed in the feedback loop of the amplifier 252 to provide a direct current measurement. The current measurement range is selected by the different values of the resistors in branches $I_1$–$I_{10}$. The resistance values of the branches $S_1$–$S_9$ correspond to the ranges produced by branches $I_1$–$I_9$, and branch $V_5$ alone corresponds to branch $I_{10}$ during the brief initial test period. All of the resistor-relay branches $V_1$–$V_5$, $I_1$–$I_{10}$, and $S_1$–$S_9$ and relays 254 and 256 are controlled by individual drivers in a relay driver bank indicated by the reference numeral 258.

The voltage differential between the output 272 and the common readout line ROC is applied to a voltage-to-frequency converter 274. The voltage-to-frequency converter is a commercially available item and produces a frequency proportional to the input voltage. The output of the converter 274 is coupled by a transformer 276 to a pulse shaper 278. As a result of the transformer coupling, the amplifier 252 and the converter 274 are free floating and thus measure the voltage between any two leads of the device. The pulse shaper 278 converts the frequency to a pulse train which can be counted by a digital data counter. The digital counter is then enabled for two milliseconds, as will hereafter be described in greater detail. For purposes of the present description, however, it may be considered that the pulse from a two millisecond gate pulse generator 282 gates the pulse train from the pulse shaper 278 through an AND gate 280 to a data counter control 284 which gates the pulse train through to a data counter 286 during a static measurement. The gate pulse generator 282 is initiated by a five millisecond test read signal from a static test control 292.

The output from the pulse shaper 278 is also fed to a frequency discriminator 288 which is set to detect a frequency representative of about 250% of range. The output of the discriminator 288 fires an overload trigger 290 when the frequency exceeds the preselected level. The output of the overload trigger is fed to the static test control 292 which controls the operation of the relay driver 258. Upon receipt of an overload signal from the overload trigger, branches $V_1$–$V_5$ and relay 256 are immediately opened to prevent driving the amplifier 252 into hard saturation.

The static test control receives program instructions from the measurement type and range memory 294 which specify the type of static measurement, whether voltage or current, and the range.

The static measurement system also has an autorange capability as represented by the automatic range control 295. If the count of the data counter is either less than a predetermined minimum, such as 20% of range, or greater than a predetermined maximum, such as 199% of range, then a signal is fed back from the automatic range control 295 to the static test control to change the range to the next lower or next higher range and the measurement repeated. A static test is started on command from the delay test timer 255.

DYNAMIC MEASURING SUBSYSTEM

Synchronization system

Synchronization for dynamic measurements is provided by a digital sychronization system 300. Referring to FIG. 7, the synchronization system 300 generates a high frequency reference clock, such as the 100 megacycle clock represented by time line 302, a reset clock represented by the time line 304, a variable clock represented by the time line 306, a delay clock represented by the time line 308, and a sample clock represented by the time line 310. The last four clock pulses all occur in precise synchronization with a pulse of the high frequency reference clock. The period between pulses 304I, 304II, etc., of the reset clock 304 may be selected by programming to occur after any number of reference clock pulses 302, such as from one thousand reference clock pulses to one hundred thousand reference clock pulses. The reset period of the reset clock may conveniently be considered as a logic word having from one thousand to one hundred thousand bits. The variable clock represented by the time line 306 may be programmed to occur a predetermined number of times within each reset period. The delay clock represented by the time line 308 may be programmed to occur at any selected number of reference clock pulses up to one hundred after the occurrence of each variable clock pulse. The sample clock represented by the time line 310 may occur only once during each reset clock period, but may be programmed to occur in synchronism with any reference clock pulse within the period. The reset, variable, delay and sample clocks are programmed from a digital sync memory and interface 311.

Referring now to FIGS. 13a–13c, the digital synchronization system 300 is comprised of a highly accurate high speed clock source 702 such as, for example, a 100-megacycle oven controlled crystal oscillator. The clock source 702 is coupled to a pulse shaping circuit 704 which produces a square pulse of the desired amplitude and width. The pulse shaper 704 is coupled to the input of a novel multi-output coaxial pulse transformer 705 having a plurality of output leads indicated collectively by the reference character 706. Each of the leads 706 is normally at a logic "1" level and goes to a logic "0" level with each clock pulse, the logic levels being typically +0.3 volt and −0.3 volt, respectively. In order to have an accurate measuring system, it is extremely important that the pulses occurring on each of the leads 706 be precisely synchronized with the pulses on the other leads in order to provide a precise cadence for the operation of all components of the digital synchronization system.

The pulse transformer 705 is shown schematically in FIG. 14a. The input of the transformer 705 is a single coaxial cable 519 the shield of which is grounded so that the coaxial cable acts as a transmission line. In accordance with an important aspect of the invention, all impedances throughout the transformer are matched so that no energy is reflected at any point, and all coaxial cables should have the same characteristic impedance. In order to facilitate an understanding of the invention, it will be assumed that all coaxial cables have a 50-ohm characteristic impedance. However, it is to be understood that coaxial cables having other characteristic impedances could be used, so long as these impedances are matched in accordance with the scheme which will hereafter become more evident.

The cable from the coaxial input 519 is connected to the input 521 of a first transformer stage comprised of a pair of ferrite cored coaxial cables 523 and 525. The ferrite cores on the coaxial cables 523 and 525, as well as ferrite cores which will hereafter be described, are not essential to the function of the transformer, but do improve performance by reducing transmission losses through the coaxial cable when the coaxial cable is connected as a transformer. Also, in order to have optimum performance, the time lengths of the coaxial cables 523 and 525 should be at least equal to one-half the width of the pulses to be transformed. The first transformer stage 523–525 has four output conductors 527, 528, 529 and 530, the outputs 527 and 530 being the ends of the conductors of the coaxial cables 523 and 525, respectively, remote from the input 521, and the outputs 528 and 529 being the ends of the shields of the coaxial cables 523 and 525, respectively, adjacent the input 521. Of course, it will be appreciated that the shields of the three coaxial cables connected to the input point 521 will be as nearly continuous as is mechanically possible in order to obtain the best results.

The outputs 527–530 are connected to the inputs 531–534 of four secondary transformer stages comprised of ferrite cored coaxial cables 535 and 536, 537 and 538, 539 and 540, and 541 and 542, respectively. Each of the secondary transformer stages is identical to the primary transformer stage comprised of coaxial cables 523 and 525 and accordingly has four outputs. For example, secondary transformer stage 535–536 has outputs 544 and 545 which are coupled by capacitors 546 and 547 to coaxial lines 706a and 706c, and outputs 548 and 549 which are connected by coaxial transmission cables 550 and 560 and coupling capacitors 561 and 562 to coaxial lines 706b and 706d. The secondary transformer stage 537–538 has outputs 563 and 564 which are coupled by capacitors 565 and 556 to coaxial cables 706e and 706f, and outputs 566 and 567 which are terminated through 50-ohm resistors 568 and 569 to ground. Similarly, the transformer stage 539–540 has outputs 570 and 571 which are coupled by capacitors 572 and 573 to coaxial cables 706g and 706h, while the other outputs 574 and 575 are terminated through 50-ohm resistors 576 and 577 to ground. The transformer stage 541–542 has outputs 578 and 579 which are coupled by capacitors 580 and 581 to coaxial cables 706i and 706j, while the outputs 582 and 583 are terminated through 50-ohm resistors 584 and 585 to ground. A suitable positive bias source is connected to bus 588. The bus 588 is connected to the cable of each coaxial transmission line 706a–706j by a separate resistor 590, only some of which are indicated by reference characters. At each point where a resistor 590 is connected to the bus 588, the bus is also coupled to ground through a capacitor 592, only a portion of which are represented by reference characters.

In the operation of the transformer 705, assume that a —4-volt pulse is applied to input terminal 521 from the coaxial transmission cable 519 which extends from the pulse shaper 704. As mentioned, the characteristic impedance of the coaxial cable 519 is 50 ohms. In order to provide an impedance match, the input impedance at point 521 must also be 50 ohms, which is the case as will now be described. The input impedance at input 532 is 50 ohms because of two 100-ohm series circuits which are connected in parallel. One of the circuits is comprised of the 50-ohm resistor 568 and the 50-ohm resistance between the shield and the cable of coaxial cable 538, and the other is comprised of resistor 569 and the resistance between the shield and cable of coaxial cable 538. Similarly, the input impedance at point 533 is 50 ohms because of the parallel 100-ohm circuits through resistors 576 and 577. Thus the input impedance at point 521 is also 50 ohms, to match the impedance of transmission line 519, because each of the circuits to the outputs 528 and 529 is 100 ohms, as a result of the 50-ohm resistance between the cable and the shield of coaxial cables 523 and 525, and the 50-ohm input impedance at points 532 and 533. Thus the input impedance at input 521 matches the impedance of the transmission line 519 so that none of the energy is reflected back through the transmission line. The incoming pulse is divided equally between the cable of the coaxial cable 523 and the shield at output 528 at the shield so that, assuming a —4-volt input pulse, a —2-volt pulse will appear on output cable 528 and a —2-volt pulse will propagate down the coaxial cable 523 to the output 527. Similarly, a —2-volt pulse will appear on output cable 529 and a —2-volt pulse will propagate down the coaxial cable 525 to the output 530.

When the pulse from output 527 reaches input 531, the input impedance of the transformer stage 535–536 is again 50 ohms because of the two parallel 100-ohm paths each comprised of the 50-ohm resistance between the conductor and the shield of the respective coaxial cables 535 and 536 and the 50-ohm characteristic impedance of the coaxial transmission cables 550 and 560. Similarly, the pulse at the output 530 sees a 50-ohm impedance at input of the transformer stage 541–542 which is identical to the transformer stages formed by coaxial cables 537–538 and 539–540.

Thus it will be noted that as the result of a single —4-volt pulse applied at the input 521, a —2-volt pulse is produced at each of the outputs 527–530. Since all impedances are matched, there are no reflections at any point in the first transformer stage to degradate the character of the pulses. It is also important to note that there is substantially no loss of power in the transformer stage. When the —2-volt pulse reaches input 531, a —1-volt pulse is produced at the output 548 which propagates out through the transmission line 550 and a —1-volt pulse is fed through the coaxial cable 535 to the output 544. Similarly, the 2-volt pulse is divided equally between the output 549 and the output 545 of cable 536. Thus the single pulse on output 527 is again divided into four pulses by the transformer stage 535–536, each pulse having an amplitude equal to one-half of the input amplitude. The pulses on outputs 548 and 549 pass through transmission lines 550 and 560 and all four outputs from the transformer stage 535–536 are coupled by capacitors 546, 547, 561 and 562 to the transmission cables 706a–706d, respectively, which also have a 50-ohm characteristic impedance. Thus it will be noted that at any point between the input cable 519 and the output cables 706a–706d, except at the biasing resistors 590, the impedance in each direction is 50 ohms. However, the biasing resistors 590 are very large. Consequently there is no reflection of energy in the transformer except at the biasing resistors 590, and this is held to a minimum by the size of the biasing resistors. Each of the other secondary transformer stages 537–538, 539–540, and 541–542 also has four outputs, but the outputs 566, 567, 574, 575, 582 and 583 are not used. However, these outputs are terminated through the respective 50-ohm resistors to ground so as to maintain the necessary matched impedance throughout the transformer network. Of course, it will be appreciated that each of the coaxial transmission lines 706a–706j must ultimately be properly terminated through a 50-ohm resistance so as to prevent the reflection of energy back through the transformer network.

It will also be noted that the pulses do not arrive at the outputs 527, 528, 529 and 530 at the same time, because of the propagation delay through the coaxial cables 523 and 525 to the outputs 527 and 530. However, these pulses are nevertheless in a precise known relationship and can be made precisely synchronous by interposing coaxial delay lines of suitable lengths at the outputs 528 and 529. In the particular transformer here illustrated and described, however, the various coaxial cables 706a–706j extend to various components located on one or more printed circuit boards. This requires that a coaxial delay line be used for other purposes, and the length of the delay line is chosen so as to take into consideration the total lengths of the various paths of the pulses through the transformer.

Thus it will be noted that the transformer 705 is capable of deriving up to sixteen pulses which are in precise synchronism with a single input pulse, with a reduction in amplitude of only one-fourth and with no significant loss in power. Further, it will be appreciated that each of the sixteen outputs may be used to drive any desired load so long as the input impedance of the load is 50 ohms (for the example described), and may also be used to drive still another set of transformer stages to produce sixty-four pulses, etc. Since the transformer system is a passive, rather than an active system, the pulses are synchronized with maximum precision. It is also important to note that both the input and outputs of the transformer system may be coaxial transmission lines. Further, the transformer system is very inexpensive.

An increment counter indicated generally by the reference numeral 708 is comprised of a units feedback register 710 and a tens feedback register 712. The units feedback register 710 overflows into the tens feedback register 712 by the operation of the decade transfer stage $DTS_1$. This transfer occurs when the units register 710 is reset to zero after the count of nine. The increment counter 708 can also be reset after counting any programmed number of clock pulses up to one hundred by means of programmed digital comparators PDC–$V_1$ and PDC–$V_2$ and feedback reset stage $FRS_1$.

The operation of the increment counter 708 can best be understood by reference to FIG. 15. The units feedback register 710 is comprised of flip-flop or binary stages $S_1$, $S_2$, $S_3$, $S_4$ and $S_b$ which are connected to count in a qui-binary code. Each binary stage has what will be referred to as a true AND gate T and a complement AND gate C, and corresponding true and complementary outputs T and C. When all inputs to gate T are at logic "1" level, the stage switches such that the true output T is at a logic "1" level and the complement output C is at a "0" logic level. Conversely, when all inputs to complement gate C are at logic "1" level, the binary changes states so that the true output T is at "0" logic level and the complement output T is at logic "1" level. A circle at either the input or the output of any logic component indicates that the logic level applied to that point is inverted. The binary stages may also be preset to a logic "1" level, i.e., output T at a logic "1," by the application of a logic "1" level to the preset line P, such as illustrated on satges $S_2$ and $S_b$. A bias is applied through lines 714 to enable this preset function.

The clock source to the complement gates C of stages $S_1$–$S_4$, $S_b$ and $DTS_1$ is provided through line 716 and OR gate 718, the negative clock pulse being converted to a positive pulse by the inverter at the output of OR gate 718. The combination of an OR gate and inverter is sometimes referred to as a NOR gate. The clock pulse is also applied to the true gates T of all stages, including the transfer stage $DTS_1$, through NOR gate 720, which is represented by the OR gate plus the inversion at the output, except when the feedback stage $FRS_1$ is in the logic "1" state for reset purposes as will presently be described. Then if the logic "1" level is present on the input to the NOR gate 720, no clock pulses will be applied to the true input gates T of the binary stages. Thus the clock pulse is applied to the complement gates C of all stages $S_1$–$S_4$, $S_b$ and $DTS_1$ at all times, and the same clock pulse is applied to the true gates T except when disabled at NOR gate 720 by the stage $FRS_1$ being in the "1" state. Each of the stages $S_1$–$S_4$ is automatically reset to the "0" state on the next succeeding clock pulse after being set to the "1" state because the complement output C of each stage is fed back to an input of the complement gate of the stage through an inverter. Then on the next clock pulse, the respective binary stage is returned to the "0" logic state.

Binary stage $S_1$ can be changed from a "0" to a "1" state only when all of binary stages $S_1$, $S_2$, $S_3$ and $S_4$ are in the "0" state because the true output T of each is connected back to the true gate T of stage $S_1$. Binary stage $S_2$ is switched to logic "1" level only on the first clock pulse after stage $S_1$ has switched to the "1" level because the complement output C of stage $S_1$ is connected to an input of true gate T of stage $S_2$. Similarly, $S_3$ can be switched to logic "1" state only on the next clock pulse after $S_2$ has been switched to the "1" state because the complement output of stage $S_2$ is connected to gate T of stage $S_3$. The complement output of stage $S_3$ is also connected to the true gate T of stage $S_4$ so that stage $S_4$ can be switched to the logic "1" state only on the first clock pulse after $S_3$ is switched to the "1" state. The binary stage $S_b$ is switched to the "1" state on the first clock pulse after $S_4$ is switched to the "1" state because the true gate T is connected through an inverter to the complement output of stage $S_4$ and to the true output of stage $S_b$, which will be at "0" logic level when $S_b$ is in the "0" state. However, it will be noted that stage $S_b$ cannot be complemented back to the "0" state unless both stages $S_4$ and $S_b$ are in the "1" state, which condition represents the number nine, because the inputs of the complement gate C of stage $S_b$ are taken from the complement outputs of stages $S_4$ and $S_b$. The line 722 from the true output of $FRS_1$ will be at "0" level except when the increment counter 708 is being reset as will hereafter be described. The decade transfer stage $DTS_1$ is switched from a "0" state to a "1" state on the count of nine because the inputs to the true gate T of $DTS_1$ are connected to the complement outputs of stages $S_3$ and $S_b$ and to the true output of $DTS_1$.

Assume that all binary stages in the units decade 710 are in the "0" state. Only the true gate of stage $S_1$ will then be enabled due to the "0" feedback from the true output of stages $S_1$–$S_4$. On the first clock pulse from gate 720, stage $S_1$ is then switched to logic "1" state. The "0" logic level from the complement output of stage $S_1$ thus enables the complement gate C of stage $S_1$ and the true gate T of stage $S_2$. Then on the next clock pulse, stage $S_1$ is switched back to "0" state and stage $S_2$ is switched to "1" state, thus indicating a count of two. The "0" logic level at the complement output of stage $S_2$ then enables the complement gate C of stage $S_2$ and the true gate T of stage $S_3$ so that on the third clock pulse stage $S_2$ is switched back to "0" state and stage $S_3$ is switched to "1" state. The "0" logic level at the complement output of stage $S_3$ then enables the complement gate C of stage $S_3$ and the true gate T of stage $S_4$ so that the fourth clock pulse switches stage $S_3$ to a "0" state and stage $S_4$ to a "1" state. The logic "0" level on the complement output of stage $S_4$ then enables the complement gate C of stage $S_4$ and also enables both the true and complement gates of the binary stage $S_b$. Since binary stage $S_b$ is in the "0" state, the "0" logic feedback from the true output enables the true gate T and the "1" logic feedback from the complement output disables gate C. Then on the fifth clock pulse, stage $S_4$ returns to "0" state and binary stage $S_b$ switches to the "1" state.

Now since stages $S_1$–$S_4$ are all at "0" state, the true gate T of stage $S_1$ is again enabled due to the feedback from the true outputs of the stages $S_1$–$S_4$ so that on the sixth clock pulse stage $S_1$ is again switched to a logic "1" level. It will be noted that stage $S_b$ is not reset to "0" state at this time because the complement gate C of stage $S_b$ is disabled by the logic "1" feedback from the complement output of stage $S_4$. Stages $S_2$, $S_3$ and $S_4$ are then successively switched from logic "0" to logic "1" on the seventh, eighth and ninth counts and each is reset to zero on the next succeeding count, as heretofore described in connection with counts two, three and four. On the eighth count, however, the "0" logic level at the complement output of stage $S_3$, together with the "0" logic level at the true output of decade transfer stage $DTS_1$ and the "0" logic level of the complement output of the binary stage $S_b$ all enable the true gate T of stage $DTS_1$. Thus on the ninth count, i.e., when stage $S_4$ changes from the "0" to the "1" state, stage $DTS_1$ also switches from a "0" state to a "1" state. Thus stages $S_4$, $S_b$ and $DTS_1$ are all in the "1" state after the count of nine, and then all are reset to "0" state on the tenth count, the switching of stage $S_4$ being enabled by the "0" feedback from the complement output of stage $S_4$, stage $S_b$ being enabled by the "0" level at the complement outputs of both stages $S_4$ and $S_b$, and stage $DTS_1$ being enabled by the "0" level at the complement output of stage $DTS_1$. The decade count is then repeated in the same manner.

The tens feedback register 712 is identical to the units feedback register and also includes stages $S_1$, $S_2$, $S_3$, $S_4$ and $S_b$ which are interconnected in an identical manner. However, the clock pulse to both the true and complement gates T and C of the five stages are gated through to the tens register only when decade transfer stages $DTS_1$ is in the logic "1" state. Thus it will be noted that the negative clock pulse applied to the line 724 is applied to NOR gates 726, 728 and 730. The "0" output of stage $DTS_1$ is connected to NOR gates 726 and 728 so that the NOR gates are disabled whenever the decade transfer stage $DTS_1$ is at the "0" state. Assuming that the feedback reset stage $FRS_1$ is in the "0" state, gates 726 and 728 will not be disabled. Thus when the units feedback register 710 has reached a count of nine and $DTS_1$ is switched to a "1" state, NOR gates 726 and 728 will be enabled so that on the tenth clock pulse the tens feedback register 712 will be incremented one count. Since the decade transfer stage $DTS_1$ is also reset to logic "0" on the tenth pulse, the tens register 712 will again be disabled until the units register next reaches the count of nine. Thus the combination of the units register 710 and the tens register 712 will count from zero to ninety-nine unless reset at a programmed number between zero and ninety-nine, as will now be described.

Programmed digital comparators $PDC$–$V_1$ and $PDC$–$V_2$ may be programmed to reset the units and tens feedback register 710 and 712, respectively, after any programmed count has been reached on the increment counter. Digital comparators $PDC$–$S_1$ and $PDC$–$S_2$ are programmed independently of comparators $PCD$–$V_1$ and $PDC$–$V_2$ and may be programmed to sense any count of the increment counter as will hereafter be described. Since $PDC$–$S_1$ and $PDC$–$S_2$ operate independently of the reset function of the increment counter, their function will not be described at this time. The complement outputs of stages $S_1$, $S_2$, $S_3$, $S_4$ and $S_b$ are connected through inverters to inputs of gates $D_1$, $D_2$, $D_3$, $D_4$ and $D_5$, respectively. The true outputs of stages $S_1$, $S_2$, $S_3$ and $S_4$ are all connected through inverters to the input of gate $D_0$. The true output of the binary stage $S_b$ is connected to an input of gate $D_B$. A program input line is also connected to each of the gates $D_0$–$D_5$ and $D_B$, each program line being designated by the programmed count numbers for which the program line is at a logical "1" level. For all other program numbers, the program lines are at a logical "0" level. When a logical "0" is applied to a program line, the corresponding gate $D_n$ is disabled and has a "0" output regardless of the level of any other input to the gate. When the program line is at a logical "1" level and the input from the associated binary stage is at a logical "1" level, the output of the gate $D_n$ is at a logic "1" level. When the input from the binary stage is a logic "0," the output of the gate $D_n$ is at a logic "0" level. The outputs from gates $D_0$, $D_1$, $D_2$, $D_3$ and $D_4$ are connected to one input of an OR gate 732, and the outputs of gates $D_5$ and $D_B$ are connected to the other input of the OR gate 732. The output from the OR gate 732 is connected through an inverter to an input of true gate T of feedback reset stage $FRS_1$.

Programmed digital comparator PDC–$V_2$ is identical to comparator PDC–$V_1$ and its relationship to the tens feedback register 712 is identical to the relationship of comparator PDC–$V_1$ to the units feedback register 710. The OR output gate 734 of PDC–$V_2$ is also connected through an inverter to another input of the true gate T of the feedback reset stage $FRS_1$.

The clock pulse to the true gate T of stage $FRS_1$ is gated through NOR gate 736 by a "0" logic level at the true output of $FRS_1$. Similarly, the complement gate C of stage $FRS_1$ is clocked by NOR gate 738 whenever the complement output of stage $FRS_1$ is a "0" logic level. The gate C of $FRS_1$ is also disabled in the special case where the increment counter is programmed to be reset on the count of one by means of line 01, as will hereafter be described in greater detail. The output of gate 738 is also connected to preset the binary stage $S_b$ of the tens register 712 to a "0" state and to preset stage $S_2$ to a "1" state as will presently be described.

For purposes of explaining the reset function of the increment counter, assume that the increment counter is programmed to reset after the count of twenty-seven. The program lines to gates $D_2$ and $D_5$ of comparator PDC–$V_1$ would be brought up to a logic "1" level and the program lines of gates $D_2$ and $D_B$ of comparator PDC–$V_2$ would be brought up. The feedback reset stage $FRS_1$ will normally be in the "0" state because the "1" state results in a clock pulse being gated through the preset gate 738 to the complement gate C of $FRS_1$, thus resetting stage $FRS_1$. When the increment counter reaches a count of two, the output of gate $D_2$ will change from a logic "1" to a logic "0." However, since the output of gate $D_5$ is still logic "1," the output of gate 732 remains logic "1." When the units counter 710 reaches a count of seven, the output of both gates $D_2$ and $D_5$ will be changed to logic "0," and the output of gate 732 will be logic "0." However, the true gate T of $FRS_1$ is still not satisfied since the output from gate 734 of PDC–$V_2$ is still logic "1." When a count of two is reached on the tens register 712, the output of gate $D_2$ of PDC–$V_2$ will change to logic "0." Since the binary stage $S_B$ of the tens register is already in the logic "0" state so that the output from gate $D_B$ is already logic "0," the output from PDC–$V_2$, i.e., the output from gate 734, goes to logic "0." Then when the units register 710 again reaches the count of seven for the third time, the output from PDC–$V_1$, i.e., the output from gate 732, goes to "0" level thus enabling the true input gate T of the feedback reset stage $FRS_1$.

Then on the next clock pulse, $FRS_1$ changes from "0" state to the "1" state. As the complement output of $FRS_1$ goes from logic "1" to logic "0," gates 730 and 738 are enabled, stages $S_B$ and $S_2$ of the tens register 712 are respectively preset to a "0" state and "1" state, and stage $S_B$ of the tens register is preset to "0" state. At the same time, the logic "1" level at the true output of $FRS_1$ disables gate 720. This deprives the true gates T of stages $S_2$ and $S_b$ of the units register of a clock pulse and thereby disables the true gates, and also disables gates 726 and 728 so as to disable the true gates T of all the stages of the tens register 712. Also, the complement gates C of stages $S_2$ and $S_B$ of the units register and the complement gate C of stage $S_B$ of the tens register are disabled. Then on the second clock pulse after the increment counter reaches the programmed count, stages $S_1$, $S_3$, $S_4$ of the units counter, stage, $DTS_1$, and stages $S_1$–$S_4$ of the tens register are set to a "0" state through the complement gates C so that the units register will be preset to a count of two, and the tens register 712 will be preset to a count of zero. Thus it will be noted that stage $S_2$ of the units register is preset to a "1" state from gate 738, stage $S_B$ of the units register is preset to a "0" state from gate 738, and stages $S_1$, $S_3$, $S_4$ of the units register and the decade transfer stage $DTS_1$ are set to "0" state, if not already in the "0" state, through gate 718 and the complement gates C. Stages $S_1$, $S_2$, $S_3$ and $S_4$ of the tens register are reset to "0" state, if not already in the "0" state, through gate 730 and the complement gates C, and stage $S_B$ is preset to "0" state through gate 730 and the preset enable line P. On the same clock pulse that the increment counter is preset to a count of two, the feedback reset stage $FRS_1$ returns to the logic "0" state as a result of the feedback from gae 738 to the complement gate C, and the increment counter proceeds to count as heretofore described until the programmed count is again reached and the reset function repeated.

Since the reset function requires two clock pulses, the increment counter is reset to the count of two, rather than to zero. Thus it will be appreciated that the increment counter cannot be programmed to reset on the count of one. However, the same result is accomplished by disabling the complement gate C of the feedback reset stage $FRS_1$ through program line 01 so that the feedback reset stage $FRS_1$ will remain in the "1" state. Thus when program line 01 is at a logic "1" level, the gate C of $FRS_1$ is disabled. As a result, stage $FRS_1$ will remain in the "1" state so that the increment counter is disabled, and the reference counter, which will presently be described, will be continuously enabled and will count each clock pulse.

When the increment conuter is programmed to reset on the count of two, $FRS_1$ will complement on every clock pulse so that the reference counter will be incremented on every second clock pulse. Thus when the increment counter reaches the count of two, $FRS_1$ is enabled. On the next clock pulse, $FRS_1$ will change from a "0" state to a "1" state as the increment counter advances to the count of three. Then on the next clock pulse, $FRS_1$ will reset to "0" state, and the increment counter will be reset to the count of two thus again enabling $FRS_1$. $FRS_1$ will again be set to a "1" state as the counter increments to three, then reset to a "0" state as the counter is reset to a count of two. For all other programmed reset counts between three and one hundred, which is a 00 program, the operation of the increment counter is as first described.

Referring once again to FIGS. 13a–13c, the reference counter heretofore mentioned is indicated generally by the reference numeral 750 and includes a units decade register 752, a tens decade register 754 and a hundreds feedback register 756. Each of these registers is comprised of five binary stages $S_1$–$S_4$ and $S_B$ interconnected as heretobefore described in connection with registers 710 and 712. The increment counter 708 overflows into the reference counter 750, and in particular overflows into the units decade register 752 by the operation of stage $FRS_2$ which is operated in exact synchronism with feedback reset stage $FRS_1$ and is provided in addition to $FRS_1$ only to furnish the necessary fan-out. The transfer is accomplished by gating the next clock pulse after $FRS_2$ goes to the "1" state through to the true and complement gates of the stages $S_1$–$S_4$ and $S_B$ of the units register 752. Thus it will be noted that the complement output of stage $FRS_2$ enables gates 758 and 760 when stage $FRS_2$ is in the "1" state so that a clock pulse will be available to operate the stages of the units register 752. Since $FRS_2$ goes to the logic "1" state only on the first count after the increment counter 708 has reached the programmed count and then complements back to "0" state on the next clock pulse, the units decade register 752 is enable for only one count, the count being made on the same clock pulse that the increment counter is preset to the count of two. The units decade register 752 is not programable and always increments through a full ten counts before automatically resetting to a count of zero.

The units decade register 752 overflows into the tens decade register 754, which is identical to the units decade register 752, by operation of a decade transfer stage $DTS_2$. Stage $DTS_2$ operates generally in the same manner as $DTS_1$ heretofore described. However, except when the increment counter is bypassed by programming a count of one, the true gate T of $DTS_2$ is enabled from the complement outputs of stages $S_4$ and $S_B$ through gate 762, rather than from stages $S_3$ and $S_B$ as in the case of $DTS_1$, because the counter is counting at a rate less than the reference clock pulse train. When a reset count of one is programmed, the true gate T of $DTS_2$ is enabled from the complement outputs of stages $S_3$ and $S_4$ through gate 780, as hereafter described, because the counter 752 is then counting each pulse of the reference clock. The outputs of the program digital comparators $PDC-V_1$ and $PDC-V_2$ together with the clock pulse from gate 762 then set the decade transfer stage $DTS_2$ to a logic "1" state on the same clock pulse that $FRS_1$ and $FRS_2$ are set to the logic "1" state to enable gates 764 and 766. Then on the next clock pulse, i.e., when the increment counter 708 is pre-set to the count of two, the units decade register 752 is reset to the count of zero, and the tens decade register 754 is incremented one count by the clock pulse gated through gates 764 and 766.

This procedure is repeated until the tens decade register 754 reaches a count of nine, then the tens decade register 754 overflows into the hundreds feedback register 756 by means of decade transfer stage $DTS_3$. This enables gates 770 and 772 so that a clock pulse is gated through to the true and complement gates of the five binary stages of the hundreds decade 756 which is the same as the tens feedback register 712. The hundreds decade 756 then increments one count as stage $DTS_3$ resets to "0" state. This is accomplished with the programmed count on the increment counter is reached so that the outputs of $PDC-V_1$ and $PDC-V_2$ go to logic "0," and when the units decade register 752 reaches a count of nine so that the output from gate 762 goes to a logic "1," and when the tens decade register 754 reaches a nine count so that the output of OR gate 768 goes to a logic "1," because $DTS_3$ is already in the logic "0" state. Of course, $FRS_2$ $DTS_2$ and $DTS_3$ are all automatically reset on the first clock pulse after being set to the logic "1" state since each is steered from the zero output through an inverter, the clock pulse to the complementary gates C of $FRS_2$ and $DTS_2$ being provided through gate 774, and the clock pulse to the complement gate C of $DTS_3$ being provided through gate 776.

The hundreds feedback register 756 may be reset after any programmed count between zero and nine by means of a feedback reset stage $FRS_3$ and a programmed digital comparator $PDC-V_3$ which operate in the same manner as the programmed digital comparators $PDC-V_1$ and $PDC-V_2$ and the feedback reset stage $FRS_1$ heretofore described. Thus when the hundreds feedback register 756 reaches the count programmed in the comparator $PDC-V_3$, the output of the comparator goes to logical "0" and this is applied to one input of gate T of the feedback reset stage $FRS_3$. Then when the units feedback register 710 reaches the programmed count of $PDC-V_1$, the tens feedback register 712 reaches the programmed count of $PDC-V_2$, the units decade 752 reaches a nine count, and the tens decade register 754 reaches a nine count, $FRS_3$ is set to a logic "1" state. The true output of $FRS_3$ is connected to gate 770 and the logic "1" level disables gate 770 so that the true gates T of the five stages of the hundreds feedback register are denied a clock pulse. Since $DTS_3$ is also set to the "1" state at the same time as stage $FRS_3$, the complement gates C of the binary stages of the hundreds feedback register 756 are provided with a clock pulse through gate 772. Since the binary stage $S_B$ of the hundreds feedback register 756 may be in either the "0" or "1" state, it is preset to a "0" level from the complement output of stage $FRS_3$.

From the above, it will be noted that the increment counter 708 can be programmed to sense any count from one to one hundred before resetting the increment counter and incrementing the units decade register 752 of the reference counter 750. It will be recalled that when programmed to count only one clock pulse, the complement gates C of stages $FRS_1$ and $FRS_2$ are disabled by bringing program line 01 up to logic "1" level so that binary stages $FRS_1$ and $FRS_2$ remain in the logic "1" state. Then the units decade register 752 of the reference counter counts each of the clock pulses from the source 702. When operating in such a condition, data transfer stage $DTS_2$ must be enabled when the units decade register 752 reaches a count of eight, rather than a count of nine, in the same manner as stage $DTS_1$ of increment counter 708 to prevent losing a count. Thus program line 01 is connected to disable gate 762 when at a logic "1" level. Program line $\overline{01}$ is at a logic "1" level for all reset counts other than the 01 count so that gate 780 is disabled, but when the $\overline{01}$ line is at logic "0" level, gate 780 is enabled so that $DTS_2$ is enabled on the eight count (rather than the nine count), set to logic "1" state on the nine count, and reset to "0" state on the transfer count.

The hundreds feedback register 756 may be bypassed by programming line 782 to a logic "1" to disable gate 770. This deprives the true gates T of the five binary stages of a clock pulse so that the hundreds decade 756 remains at the preset count of zero. Then $PDC-V_3$ is programmed to provide a continuous output which enables the true input gate T of $FRS_3$ so that $FRS_3$ complements when $DTS_3$ complements, thus effectively bypassing the hundreds feedback register 756.

The reference clock pulse train is taken directly from the clock pulse shaper and transformer 704 by means of an inverting gate 790.

The reset clock pulse train is produced at the output of gate 792 so that a reset clock pulse is produced on the first clock pulse after stage $FRS_3$ has changed to a logic "1" state. It will be noted that this point in time is two clock pulses after comparators $PDC-V_1$, $PDC-V_2$ and $PDC-V_3$, and gates 762 or 780 and 768 have all been satisfied and therefore occurs on the same clock pulse that the increment counter 708 is reset to a count of two and the reference counter 750 is reset to a count of zero.

The variable clock pulse train is produced at the output of gate 794 and may be selected to occur on the first clock pulse after either $FRS_2$, $DTS_2$, $DTS_3$, or $FRS_3$ changes to a logic "1" level by bringing the range program lines $VR_1$, $VR_2$, $VR_3$ or $VR_4$, respectively, up to logic "1" level to enable either gate 795, 796, 797 or 798, respectively. Thus when the output of any one of the gates 795–798 changes to a logic "1" level, the output of gate 800 changes to a "0" level so that the next negative clock pulse results in a positive pulse out of NOR gate 794. Since the variable clock pulses are taken from the binary stages which change to a logical "1" state in synchronism with stage $FRS_3$, from which the reset clock is taken, a variable clock pulse will be produced in precise synchronism with the reset clock pulse, and subsequent variable clock pulses will occur at intervals thereafter determined by the selected range. If range $R_1$ is selected, the variable clock will occur at a rate of from every reference clock pulse up to one hundred reference clock pulses, depending upon the reset count programmed into the increment counter. Range $R_2$ increases the increment period between the variable clock pulses by ten as a result of the operation of the units decade register 752, and range $R_3$ increases the increment period by one hundred as a result of the tens decade register 754. Range $R_4$ results in a variable clock pulse train occurring in synchronism with and at the same frequency as the reset clock pulse train from gate 792.

A sample clock pulse is derived once, and only once, during each period defined by two successive reset clock pulses. This is accomplished by means of five programmed digital comparators $PDC-S_1$, $PDC-S_2$, $PDC-S_3$, $PDC-S_4$ and $PDC-S_5$ which are connected to sense the count on registers 710, 712, 752, 754 and 756, respectively. The programmed digital comparators $PDC-S_1$—$PDC-S_5$ are identical to the programmed digital comparators $PDC-V_1$—$PDC-V_3$. When each register reaches the count programmed in the respective digital comparator, the output from the digital comparator goes to logical "0."

It is important to note that the sample clock may be programmed to occur on any clock pulse during each period defined by successive reset clock pulses. The sample clock pulses may be derived either from NOR gate 804 or NOR gate 806. For all cases other than when the programmed period ends in 01, i.e., is XXX01, program line 808 is at a logic "1" level so that gate 806 is disabled. Program line 810 is at a "0" level so that true gate T of the sample clock delay stage SDS is not disabled. Then whenever the increment counter reaches the count programmed in $PDS_1$ and $PDS_2$, SDS is enabled. Then on the next clock pulse, SDS changes to logic "1" state in synchronism with stage $FRS_3$, and the complement output of delay stage SDS enables gate 804. Thus if the outputs of $PDC-S_3$, $PDC-S_4$ and $PDC-S_5$, which are connected to the inputs of gate 814, are at "0" logic level, a sample clock pulse will be produced from the gate 804 on the first reference clock pulse following the change of SDS to logic "1" state. It will be noted that the delay stage SDS provides a one count delay corresponding to the one count delay caused by the stage $FRS_2$ so that each sample clock pulse will be properly oriented in time with respect to each reset clock pulse. However, when the increment counter is operated in the 01 program mode, i.e., when the increment counter is bypassed, the units decade register 752 counts each reference pulse so that this one count delay is no longer present. For this reason the program line 810 is changed to logic "1" level to disable delay stage SDS, and gate 812 is enabled by changing the logic "1" on program line 808 to a logic "0" and bypass delay stage SDS.

The delayed clock pulse train is produced at the output of either gate 816 or 818. When program line DR-00 is at "0" logic level, indicating a zero time delay, the output of gate 800 of the variable clock source is gated through gate 816 so that the pulses of the delay clock pulse train occur in precise synchronism and at the same frequency as the pulses of the variable clock pulse train. However, the pulses of the delay clock pulse train may be selectively programmed to occur at a large number of different delay periods after the variable clock pulse by means of a delay counter indicated generally by the reference numeral 820 and programable ranges.

The delayed counter 820 is substantially identical to the increment counter 708 and includes a units feedback register 822 and a tens feedback register 824 which are substantially identical to registers 710 and 712, respectively. The units feedback register 822 overflows into the tens feedback register 824 by operation of a decade transfer stage $DTS_4$. The count of the units feedback register is sensed by programmed digital comparator $PDC-D_1$, and the count on the tens feedback register 824 is sensed by programmed digital comparator $PDC-D_2$. When the count in the respective registers reaches the count programmed in the respective comparators, the outputs from the digital comparators $PDC-D_1$ and $PDC-D_2$ go to logic "0" as heretofore described and these outputs enable a feedback reset stage $FRS_4$ which is used to reset the units and tens registers 822 and 824.

The delayed counter may count on any one of three ranges. When program line DR-1 is at a logic "1" level, this together with a steady state logic "0" on line 826 from a suitable source causes the output of NAND gate 828 to go to logic "0" so that the output of gate 830 goes to "0" and all reference clock pulses are gated through gates 832 and 834 to the true and complement gates of the binary stages of the units feedback register when $FRS_4$ is in the "0" state as will presently be described. If program line DR-2 is at a logic "1" level, then gate 836 causes the output of gate 830 to go to logic "0" only when $FRS_2$ is at logic "1" level, so that the delayed counter 820 counts the overflow from the increment counter. This permits the period for each count of the delayed counter to be programmed from one to ninety-nine merely by programming the increment counter. The count period of the delayed counter can be increased by a factor of ten by raising program line DR-3 to a logic "1" so that gate 838 will cause gate 830 to go to logic "0" when $DTS_2$ goes to a logic "1" state. The output from gate 830 is also connected to gate 840 which performs a reset function as will presently be described, and to gates 842 and 844 which gate clock pulses to the tens feedback register 824. Gate 846 enables stage $FRS_4$ to be set to a logic "1" state. Gate 848 is used to reset the tens feedback register 824 as will presently be described.

The feedback reset stage $FRS_4$ determines whether the delayed counter is in the count mode or in the preset mode. When $FRS_4$ is in the "0" state, the delayed counter operates in the count mode because the logic "0" level of the true output of $FRS_4$ enables gates 832, 842 and 844. The units feedback register 822 then proceeds to count the clock pulses through gate 832, the rate of the clock pulses depending, as previously described, upon the range selected by program lines DR-1, DR-2 and DR-3. When the units feedback register 822 reaches the count of eight, decade transfer stage $DTS_4$ is enabled. Then on the ninth clock pulse, stage $DTS_4$ is switched from a "0" state to a "1" state. Then on the tenth clock pulse through gate 832, the units feedback register 822 is reset to a count of zero, the tens feedback register 824 is incremented one count, and $DTS_4$ returns to the "0" state. This procedure is repeated until the count programmed in the comparators $PDC-D_1$ and $PDC-D_2$ is reached, at which time stage $FRS_4$ is switched from a "0" state to a "1" state, provided gates T and C of $FRS_4$ are not disabled by a logic "1" level at the true output of stage $FRS_3$ for purposes which will presently be described. After $FRS_4$ has switched to a "1" state, the logic "1" level at the true output of $FRS_4$ disables the gates C of stages $S_1$ and $S_B$ of the units register 822, and disables gates 832 and 846, the latter gate disabling both the reset function and the true gate T of $FRS_4$. The logic "1" level at the true output of $FRS_4$ also disables gates 842 and 844. On the other hand, the complement output of $FRS_4$, which is at "0" logic level, enables the preset of stage $S_B$ of the tens feedback register 824 so that the stage is preset to zero, enables gate 848 so that the succeeding reference clock pulses will reset the first four stages $S_1-S_4$ of the tens feedback register 824 to zero, and enables gate 840 for purposes which will presently be described.

The count period for the delay clock counter is initiated by a variable clock pulse. Thus when the output of gate 800 goes to logic "0," the variable clock gate 794 is enabled and the complement gate C of $FRS_4$ is enabled, assuming that $FRS_3$ is in the logic "0," state. Then $FRS_4$ is set to the "0" state when all inputs to gate 840 go to logic "0." This occurs when the output from range gate 830 goes to logic "0," and when the reference clock goes to logic "0," assuming that $FRS_4$ is already in the "1" state. Thus on the next clock pulse (either the high speed reference clock pulse or the clock pulse selected by the range gates 830), $FRS_4$ is changed to the "0" state thereby enabling gates 832, 842 and 844 and the units feedback register 822 proceeds on the count of two, the first count being lost as the feedback stage $FRS_4$ was set to the "0" state.

Gates 840 and 848 are disabled when $FRS_4$ is in the logic "1" state. When $FRS_4$ is changed to a logic "0" state, gate 840 is enabled so that the reset and the true gate T of $FRS_4$ are both enabled. The delayed counter 820 proceeds to count until the programmed count is reached at which time the outputs of $PDC-D_1$ and $PDC-D_2$ go to logic "0." Since $FRS_4$ is in the logic "0" state, gate 818 is enabled when the output of gate 830 goes to a logic "1" level so that the next reference clock pulse will be gated out from gate 818. On the same clock pulse, since the true input gate T of $FRS_4$ is also enabled by the output from gate 830, $FRS_4$ is also switched to a logic "1" state thereby disabling gate 818 and disabling the delayed counter 820. On the next clock pulse after feedback stage $FRS_4$ has switched to the logic "1" state, the delayed counter is preset to a count of one, and both $FRS_4$ and the delayed counter remain in this state until $FRS_4$ is set to the "0" state by a pulse from gate 800 of the variable clock, at which time the delayed counter again begins to count.

If desired the feedback reset stage $FRS_4$ may also be set to a logic "1" state to preset the delayed counter 820 whenever $FRS_3$ is switched from a logic "0" to a logic "1" state preparatory to producing a reset clock pulse. This may be accomplished by the connections indicated in dotted line. Then the complement output of $FRS_3$ will enable the reset function and the true output of $FRS_3$ will disable the T and C gates of $FRS_4$ so that $FRS_4$ will be preset to a "1" state in synchronism with the reset clock pulse from gate 792. However, since $FRS_4$ cannot be set to a "0" state, this results in the delayed counter being disabled during the period between the reset clock pulse and the first variable clock pulse after the reset clock pulse which again starts the count on the delay counter.

It will also be noted that when a zero time delay period is programmed, program line DR-00 disables gate 840 so that $FRS_4$ cannot be switched to the "0" state, i.e. the count enable mode. The true output of $FRS_4$ then disables gate 818 to prevent spurious delayed clock pulses. If no count between zero and ninety-nine is programmed on $PDC-D_1$ and $PDC-D_2$, the delay counter will stop on the count of ninety-nine with stage $FRS_4$ in the "0" state and no delayed clock pulse train will be produced.

Although any of the clock pulses may be used to synchronize either of the pulse generators I or II, the variable clock pulses 306 will customarily be used to initiate a test pulse as represented by the rise 312 of the waveform 314. The fall 316 of the test pulse may be determined either by the delay clock 308 or by a counter in the respective pulse generator operated by the 100 megacycle clock 302.

VOLTAGE SAMPLING SYSTEM

The sample clock from the digital synchronization system 300 is applied to a sample clock pulse generator 318 which produces a pulse suitable for triggering the sampling system. The sampling clock pulse opens a normally closed electronic switch 320 of a fast ramp generator indicated generally by the reference numeral 322. The fast ramp generator 322 is comprised generally of a current source 324 which is connected to charge one of four capacitors 326-329 through one of four resistors 331-334, depending upon which of four electronic switches 337-340 is closed in response to programmed range information. The capacitors may be selected to provide a fast ramp of different slope. Also, the current into the resistors and capacitors may be varied by turning a transistor 342 "on" which acts as a current source and shunts a portion of the current flow from the source 324 to ground. This is accomplished by reducing the potential at the base of a switching transistor 344 so as to lower the potential of the emitter of the transistor 342.

When the switch 320 is closed, as is normally the case, the output conductor 346 is at some low potential. However, when the switch 320 is opened by the pulse from the sample clock pulse generator 318, the voltage builds as one of the capacitors 326-329 is charged, depending upon which of the switches 337-340 is closed, to produce a linear fast ramp 350 as illustrated in FIG. 7.

The output 346 is connected to one input of a comparator amplifier 354. The other input to the amplifier 354 is connected to the output of a high input impedance amplifier 356. When the voltage of the output conductor 346 exceeds the voltage at the output of amplifier 356, the change in voltage at the output of amplifier 354 is fed back by conductor 352 to again close the switch 320 and quickly discharge the capacitor, thereby returning the voltage at the output 346 to its initial low level.

The amplifier 356 has an adjustable gain and adjustable offset for calibration purposes. The input to the amplifier 356 is derived from a staircase ladder network 358 through a resistor 360. The staircase ladder network provides a large number of selectable voltage levels in equal increments between two limits. For example, in the embodiment of the invention here being described, the staircase ladder provides four thousand equal voltage increments between —2.0 volts and +2.0 volts. The staircase ladder network may be selectively set at any one of the voltage increments by a logic interface designated staircase control 362. The staircase control 362 essentially has two modes of operation, one being the reference mode during which any one of the four thousand voltage levels is generated, and the other being the count mode. In the count mode, the staircase ladder network is successively stepped in cadence to the low speed logic clock, which is derived from the sample clock as is hereafter described, through equal increments as a result of the operation of a staircase counter 364.

The staircase counter 364 is comprised of a units, a tens, a hundreds and a thousands decade, although the thousands decade only counts from zero to three in order to provide four thousand total counts. The counter 364 is connected by the staircase control 362 to step the staircase voltage one voltage unit for each count, a unit being one millivolt. However, for purposes which will hereafter be described in connection with the interlace scan, each low speed logic clock pulse increments the tens decade, rather than the units decade, and the tens decade overflows into the hundreds decade, which overflows into the thousands decade to produce a count of 400 (from 0-399). As a result, the staircase voltage is increased by an increment of ten millivolts for each low speed clock pulse. Then the thousands decade overflows into the units decade and the 400 counts are repeated but each step is 1 millivolt greater than the corresponding step of the previous staircase produced by the preceding 400 steps. The following table, based on a voltage range from —2.0 volts to +2.0 volts and 4,000 increments will serve to illustrate the output of the staircase ladder network when operated in the count mode for the ten interlace scans IS-1 through IS-10.

STAIRCASE VOLTAGES IN COUNT MODE FOR INTERLACE SCANS

|  | IS-1 | IS-2 | ... | IS-9 | IS-10 |
|---|---|---|---|---|---|
| Step 1 | −2.000 | −1.999 |  | −1.992 | −1.991 |
| Step 2 | −1.990 | −1.989 |  | −1.982 | −1.981 |
| Step 3 | −1.980 | −1.979 |  | −1.972 | −1.971 |
| Step k | . | . |  | . | . |
| Step 397 | +1.970 | +1.971 |  | +1.978 | +1.979 |
| Step 398 | +1.980 | +1.981 |  | +1.988 | +1.989 |
| Step 399 | +1.990 | +1.991 |  | +1.998 | +1.999 |

The staircase voltage at the output of the amplifier 356 is represented by the voltage time line 370 in FIG. 7, with the dotted line 372 representing the level at which no output is produced by the comparator 354. The D.C. offset voltage of the amplifier 356 is adjusted such that when the staircase ladder network is at the lowest voltage and the switch 320 is closed, no output is produced by the comparator 354. However, as soon as the fast ramp 350 exceeds the staircase voltage by an infinitesimal amount, an output is produced by the comparator 354 sufficient to trigger a pulse generator 374. The pulse generator 374 has three outputs, one of which drives a strobe pulse generator 376 which produces a strobe pulse, indicated by the time line 380 in FIG. 7, which is used to momentarily close a sampling bridge switch 378. Thus, the strobe pulses occur when the fast ramp voltage 350 exceeds the staircase voltage 370. When the staircase voltage is at the lowest level represented by the dotted line 372, the strobe pulse 380I occurs substantially in synchronism with the sample clock pulse 310I. But as the staircase voltage increases, strobe pulse 380II is delayed by a time interval equal to the time it takes for the fast ramp voltage to exceed the staircase voltage.

An output from the pulse generator 374 also drives the low speed clock pulse generator 382 which produces a pulse delayed a very short period of time behind the strobe pulse as indicated by the time line 384. The low speed clock 384 provides the cadence for the dynamic measuring system as will hereafter be described, and in particular operates the staircase counter 364 so that the voltage from the staircase ladder network is stepped up in synchronism with the low speed clock 384 as indicated at 370a and 370b. The low speed clock pulse generator 382 also drives a reset clock generator 386 which produces a low speed reset clock represented by the time line 388 and having successive pulses 388I and 388II. The low speed reset clock is used to reset the staircase counter 364 between any two successive low speed clock pulses as represented by the dotted line 387. This permits the use of the staircase counter for certain other control functions which will hereafter be described in greater detail.

As previously mentioned, the sixteen leads $L_1$–$L_{16}$ may be selectively connected to one of the four probe connectors $P_1$–$P_4$ by closing the appropriate relays $L_nR_1$ and $L_nR_3$. The connectors $P_1$–$P_4$ are at the ends of cables $CC_1$–$CC_4$, respectively, which are connected to the inputs of sampling bridges 378a–378d, respectively. The four sampling bridges 378a–378d are each operated by separate strobe pulse generators 376a–376d, all of which are operated by the pulse generator 374.

When a sampling bridge 378 is closed by the pulses from the strobe pulse generator for a period on the order of a 0.5 nanosecond, the capacitor 392 assumes a charge between the existing voltage on the capacitor plus some percentage of the difference between the voltage at the particular lead $L_n$ and the existing voltage on the capacitor 392. The voltage on the capacitor 392 is passed through a unity voltage gain high input impedance amplifier 394 and the multiplex unit 396 to input #1 of a high gain, high input impedance comparator amplifier 400. As used herein, a high input impedance amplifier is meant to be an amplifier having a high input impedance as compared to its output impedance. The output from the amplifier 400 is connectable through a normally open electronic switch 402 to charge a capacitor 404, and is connectable through a normally closed electronic switch 406 to charge a capacitor 408. The normally open switch 402 is closed and the normally closed switch 406 opened in synchronism with the closing of the sampling bridge 378 for 1.0 microsecond by a 1.0 microsecond pulse from a single shot pulse generator 410 which is triggered by an output from the pulse generator 374. The voltage on the capacitor 404 is applied to the input of a high impedance, unity gain amplifier 412, and the voltage on the capacitor 408 is applied to the input of an identical amplifier 414. The outputs of the amplifiers 412 and 414 are interconnected by a variable voltage divider 416, the sliding contact of which is connected by conductor 418 to the second input of the comparator amplifier 400. The output of the amplifier 412 is also connected by a conductor 420 back to each of the strobe pulse generators so as to establish the proper reverse bias level for the sampling bridge, and is connected through resistors 422 and four coaxial cables 424 to charge the four input capacitors 392 for purposes which will presently be described in greater detail.

When one of the sampling bridges 378 is closed for a very short duration, for example about 0.5 nanosecond, some percentage of the difference in voltage at the device lead and the voltage stored on the capacitor 392 will be added to the capacitor 392, the percentage being defined as the sampling efficiency of the bridge. For example, if the charge on the capacitor 392 is 1.0 volt and 2.0 volts is present at the device lead, the voltage at the capacitor 392 would be 1.5 volts after the sampling bridge has momentarily closed and then opened, assuming a 50% sampling efficiency. The purpose of the sampling system just described is to produce a voltage at the output of the unity gain impedance amplifier 412 equal to the voltage at the input of the sampling bridge when the bridge is momentarily closed. This is accomplished as follows.

Simultaneously with the closing of the sampling bridge 378, the normally open switch 402 closes and the normally closed switch 406 opens, and this condition persists for approximately 1.0 microsecond. Assume that as the sampling bridge 378 is closed three times in succession, the voltage at the input of the bridge is a positive 1.0, 2.0 and 3.0 volts, respectively. Also assume for ease of illustration that the sampling efficiency of the bridge is 50% and that the initial voltage charge stored on each of the capacitors 392, 404 and 408 is 0.0 volt. After the sampling bridge 378 has closed momentarily, the capacitor 392 will be charged to 0.5 volt. The unity gain amplifier 394 applies the 0.5 volt to the first input of the high gain operational amplifier 400. Since the switch 402 is closed and the switch 406 is open, the capacitor 404 is quickly charged by the high output of the amplifier 400 because the initial feedback through conductor 418 to the second input of the amplifier 400 is 0.0 volt. The capacitor 404 is charged until the voltage at the output of the unity gain amplifier 412 is sufficient to raise the voltage at the second input of the amplifier 400 to 0.5 volt. Since the sliding contact on the variable resistor 416 is set at 50%, and since the charge on the capacitor 408 is 0.0 volt, the output voltage at the amplifier 412, and hence the charge on the capacitor 404, must reach 1.0 volt before the amplifier 400 is balanced and charging of the capacitor 404 ceases. This condition occurs during the period when the switch 402 is closer and the switch 406 is open. The time constant of resistor 422 and capacitor 392 is sufficiently long that the change in the voltage on capacitor 392 is of no consequence during the period while switch 402 is closed, and any such change appears as an increase in sampling efficiency of the sampling bridge and can be compensated by adjusting resistor 416.

After switch 402 opens and switch 406 closes, the capacitor 392 is charged up to 1.0 volt over a period of about 9.0 microseconds and the capacitor 408 follows the charging of capacitor 392 as a result of the imbalance at the inputs of amplifier 400 until the charge on all three capacitors 392, 404 and 408 is 1.0 volt, which was the presumed voltage at the device lead.

When the sampling bridge 378 next closes, the input voltage is assumed to be 2.0 volts. The voltage on the capacitor 392 is 1.0 volt due to the previous sample. When the sampling bridge again opens, the charge on the capacitor 392 will have been increased to 1.5 volts, or 50% of the level between the input voltage to the bridge and the voltage on the capacitor 392 before the sample, due to the 50% sampling efficiency presumed for the bridge. The 1.5 volts is passed through the unity gain amplifier 394 and the multiplexer 396 to the first input of the amplifier 400. Since 1.0 volt is fed back to the second input of the amplifier 400 by conductor 418, the capacitor 404 is first charged by the output until the feedback through the amplifier 412 and the voltage divider 416 rebalances the amplifier 400, because switch 402 is closed and switch 406 is open. In order for the voltage at the second input of the amplifier 400 to be 1.5 volts, the voltage at the output of the amplifier 412 must be 2.0 volts because the voltage at the output of the amplifier 414 is 1.0 volt and the voltage divider 416 is set at 50%. Thus, the 2.0 volts at the output of the amplifier 412 is the same as the 2.0 volts at the input to the sampling bridge. After switch 402 opens and switch 406 closes, the 2.0 volts at the output of amplifier 412 is again transferred through the coaxial cable 424 and resistor 422 to charge the capacitor 392 and thus capacitor 408 to 2.0 volts so as to again balance the amplifier 400.

It should be noted that any D.C. offset voltage errors in the sampling system are ultimately stored on capacitor 408 and therefore no significant errors appear in the output of amplifier 412. Further, the high gain of the amplifier 400, which may be on the order of 20,000, makes any offset voltage errors in the switches 402 and 406 or in the amplifiers 412 and 414 negligible when compared to the measuring capabilities of the system. Thus, the output voltage from the amplifier 412 is always equal to the voltage at the input of the sampling bridge at the time the sampling bridge switch is closed.

When operating in the scan mode, the sampling system reproduces the waveform at the device lead by a stair step approximation, but at a much lower frequency. Assume that two successive reset clock pulses are represented at 304I and 304II. Then the first, second and third variable clock pulses 306a, 306b and 306c occur on predetermined 100 megacycle clock pulses after the occurrence of each reset clock pulse 304I and 304II. Assume also that the variable clock pulses 306a, 306b and 306c are used to initiate the rise of test pulses 314a, 314b and 314c and that the corresponding delay clock pulses 308a, 308b and 308c are used to initiate the fall of the test pulses. Each of the test pulses 314a, 314b and 314c is thus oriented in precise relationship to the preceding reset clock pulses 304I or 304II. Assume also that this train of test pulses appears as illustrated in FIG. 10 at an input lead of the device under test. A complementary waveform comprised of a pulse train represented by the time line 315, such as might be produced at an output lead of the device as a result of the input stimulus, is also illustrated, but this waveform will not now be discussed. Assume also that the sample clock pulses 310I and 310II are programmed to occur between the first and second test pulses 314a and 314b after each reset clock pulse, and that the fast ramp generator is set such that the fast ramp voltages 350I and 350II, which start at $T_0$ in synchronism with the sample clock pulses 310I and 310II, end after the fall of the third test pulse 314c. Since each sample clock pulse 310 occurs precisely the same number of 100 mc. clock pulses after each reset clock pulse 304, and since each successive variable clock pulse is also referenced to the preceding reset pulse, the point $T_0$ will occur at the same relative position with respect to the second and third test pulses 314b and 314c during each of the periods I, II, etc. defined by the reset clock pulses 304I and 304II.

It will be appreciated that there may be several thousand variable clock pulses 306 between each two reset clock pulses 304, but only one sample clock pulse.

When operating in the scan mode, the staircase ladder network is operated in the count mode to produce a series of ten staircase voltage ramps heretofore described. At time $T_0$, the output from the amplifier 356 will be at the reference potential and the strobe pulse will occur essentially at time $T_0$, the sampling bridge 378 will momentarily close, and the voltage at the output of a sampling system will be equal to the voltage of the sampled waveform 314 at time $T_0$. Just after the sample, the low speed logic clock 384 actuates the staircase counter which increases the staircase voltage by ten millivolts as heretofore described. As a result, the second fast ramp pulse 350II does not exceed the staircase voltage until a point in time $\frac{1}{400}$ of the time period of the fast ramp after $T_0$, or at time $T_{10}$, on the test pulses 314b and 314c following the second reset pulse 304II. Similarly, succeeding strobe pulses are each delayed by $\frac{1}{400}$ of the ramp period so that samples are taken at $T_{20}$, $T_{30}$, etc. up to $T_{3990}$ on the pulses 314b and 314c occurring during successive reset clock periods. As a result, the waveform within the period $T_1$–$T_{4000}$ is reproduced at the output of amplifier 412, but at a much slower frequency equal to $\frac{1}{400}$ of the frequency of the reset clock, which in turn is merely a fraction of the frequency of the variable clock and hence of the test pulse train 314. This scan constitutes interlace scan IS–1. During interlace scan IS–2, the procedure is repeated except that because each ten millivolt stair step level of the staircase voltage is 1.0 millivolt higher than corresponding stair steps during IS–1, the samples are taken at times $T_1$, $T_{11}$, $T_{21}$, etc. During the third interlace scan, the samples are taken at times $T_2$, $T_{12}$, $T_{22}$, etc. until ten interlace scans are completed for purposes which will hereafter be described in greater detail.

The sampling system may also be operated in such a manner as to repeatedly sample the test waveform 314 at any point between $T_0$ and $T_{4000}$ during each fast ramp voltage. Of course, since $T_0$ is variable to any 100 mc. clock pulse by programming the sample clock, the test waveform 314 may be sampled at any point. This is accomplished merely by programming the staircase ladder network 358 to continuously produce a static voltage at a level corresponding to the particular time $T_n$ of interest during the field-of-view defined by the fast ramp, i.e., $T_0$–$T_{4000}$. As a result, the successive strobe pulses 380 are generated at the same time during each reset period and all samples are taken at the same time $T_n$ on each of the sampled repetitive pulses of the test waveform.

Provision is also made to selectively transfer the voltage at the output of the staircase ladder network 358 to the output of the sampling system for reference purposes, which is referred to as the reference mode. This is true whether the staircase ladder network is operating in the count mode or steady state program mode. The output from the staircase ladder network 358 is connected through resistors 425 and 426 to the input of a high impedance, unity gain amplifier 428 which is connected through a pair of resistors 429 and 430 to the output of impedance amplifier 412. The resistors 429 and 430 form a voltage divider and the junction 431 is the output of the sampling system. A pair of electronic switches 432 and 433 are provided to isolate the staircase voltage from the amplifier 428 and hence from the output 431 by grounding the input of the amplifier 428 when closed. The switches 432 ond 433 are operated complementary to the switch 373 and to the ground probe switches $L_nR_1$, $L_nR_2$ and $L_nR_3$.

When the system is operating in the sample mode, either for scanning or for sampling at a selected point in time, switches 432 and 433 are closed and switch 373 is open. However, when the system is operating in the reference mode, the switches 432 and 433 are open and the switch 373 is closed to ground the input to amplifier 356, and in addition all of the switches $L_nR_1$ at the test station are open and the switches $L_nR_2$ and $L_nR_3$ are closed to ground all dynamic sensing probes to insure that the inputs to the sampling bridges 378 will be at ground and that capacitors 404 and 408 will store a ground reference voltage. The staircase ladder network 358 may then be used to supply any of the four thousand reference voltages between −2.000 volts and +2.000 volts to the output 431 for normalization, i.e., reference purposes, or may suply the ten successive staircase voltages produced when operating in the count mode in order to measure amplitudes as will hereafter be described.

A portion of the sampling system is shown in detail in FIGS. 16a–16d. The cables $CC_1$–$CC_4$ are shown connected to diode sampling bridges 378a, 378b, 378c and 378d, respectively. Each diode bridge is comprised of four diodes connected as illustrated in the bridge 378a. The capacitor 900 represents the capacitance of the network between the input 902 of the sampling bridge and the lead of the device. The sampling bridges are operated by a pair of pulses from strobe pulse generators 376a, 376b, 376c and 376d, respectively.

Each of the strobe pulse generators is driven from the pulse generator 374. The input 904 of the pulse generator 374 is connected to the output of the comparator amplifier 354. A positive transition developed by the comparator 354 is fed through a coaxial ferrite core isolation transformer 906 to the base of an avalanche transistor 908. The shield of the coax transformer 906 is tied between ground and the emitter of the transistor 908. The emitter of the avalanche transistor 908 is connected through a reverse biased diode 910 to ground to prevent the reverse swing of the transformer 906 from retriggering the avalanche transistor 908. The collector of the transistor 908 is connected through a resistor 912 to a positive rather high voltage source and through a capacitor 914 to ground. The resistor 912 limits the current through the avalanche transistor once it is conducting and the avalanche current is supplied principally to the capacitor 914.

The output of the pulse generator 374, that is the emitter of avalanche transistor 908, is connected through resistors 916a, 916b, 916c, and 916d and capacitors 918a, 918b, 918c, and 918d to strobe pulse generators 376a–376d, respectively, each of which is of identical construction. Therefore, only generator 376a is shown in detail and is comprised of a snap-off diode 920 which is forward biased (when the strobe pulse generator 376a is active) from ground 922 through the shield and then through the cable of a coax stub 924, the diode 920, a fixed resistor 926, a variable resistor 928 and the collector-emitter circuit of a transistor 930 to a negative voltage source. The transistor 930 is controlled by the circuit extending from a positive voltage source through the emitter-collector circuit of transistor 932, resistor 934, the emitter-collector of transistor 936, and resistors 938 and 940 to a negative voltage source. The base of transistor 936 is connected to ground, and the base of transistor 932 is a control point 399a which is connected to the program control from the multiplex memory and interface 398 for the particular channel of the multiplex being activated as will presently be described. The voltage and resistance values are such that when a 0.0 voltage is applied to the base of transistor 932, the conductance of transistor 930 is reduced to the point that forward bias on the diode 920 is reduced to an ineffective level. When +4.0 volts is applied to the base of transistor 932, transistor 930 is turned on to forward bias the snap-off diode 920.

The anode of snap-off diode 920 is connected through a capacitor 942 to ground so that the forward bias voltage across the diode 920 will be impressed across the capacitor 942. When the pulse from the generator 374 hits the diode 920, the diode momentarily conducts in the reverse direction, then stops conducting very abruptly. This abrupt cessation in the current the stub 924 generates a negative pulse at point 925. Then length of the pulse is determined by the length of the coax stub 924. This pulse is applied to coax cables 950, having a ferrite core, and 952 which form a first Balun transformer 949. The first Balun transformer produces equal and opposite pulses of very short duration which are applied to a second Balun transformer 953 formed by coax cables 954 and 956, each of which has a ferrite core. The second transformer 953 produces equal and opposite pulses in the cables 958 and 960, the pulse on cable 958 being negative and that on cable 960 being positive. It will be noted that cables 958 and 960 are electrically isolated from the first Balun transformer, except by inductive coupling, and from each other by capacitor 955. This permits the introduction of a D.C. bias on cables 958 and 960 as will hereafter be described. The pulses on the cables are then pased through a transformer 962 to opposite sides of the diode bridge 378a to momentarily forward bias the diodes which are normally reverse biased by a negative potential applied to the cable 958 and a positive pot ential applied to the cable 960.

Thus when it is desired to enable a particular strobe pulse generator, transistor 930 is turned on by the application of +4.0 volts to control terminal 399 of that generator to forward bias the snap-off diode 920. The variable resistor 928 provides a means for adjusting the forward bias current through the snap-off diode and the point at which the snap off occurs. Prior to the time of the avalanche pulse from generator 374, the point 925 is at ground potential and the capacitor 942 is charged to approximately −0.7 volt. The current through the diode is approximately 10 milliamps. The avalanche pulse has a finite positive transition of about 40 volts and a current as limited by the resistor 912 charges the capacitor 942 and passes through the snap-off diode 920 to establish approximately a 200 milliamp reverse current through the diode and through the coax stub 924. During this time, the voltage at point 925 may reach a value of about +2.0 volts. When the charge on the snap-off diode has been dissipated by the reverse current, the current through the diode terminates very abruptly, within a period on the order of 100 picoseconds. This results in a correspondingly fast negative going pulse at the point 925 which propagates through the Balun transformer 949 where it is divided into equal positive and negative pulses with respect to ground. The length of the stub 924 determines the duration of the pulse. These pulses are fed to the second Balun transformer 953 which permits the injection of a D.C. bias at a substantially zero potential due to the capacitor 955 which is connected between the cables 958 and 960 passing through the Balun transformer 953. A negative pulse is produced on cable 958 and a positive pulse on cable 960 which are of substantially identical shape and amplitude. These pulses pass through the isolation transformer 962 and are further balanced before being applied to overcome the reverse bias on the diodes of the bridge and forward bias the diodes of the bridge as will presently be described. The amplitude of the pulses applied to forward bias the diodes is on the order of 6.0 volts.

The D.C. reverse bias on the diodes of the bridges 378a–378d is provided from a current source indicated generally by the reference numeral 970 and switching networks 972a–972d, respectively. The current source 970 is temperature stabilized to produce approximately 0.5 milliamp in conductor 974 flowing from the current source and approximately 0.5 milliamp in conductor 976 returning to the current source. The matched pairs of transistors 982 and 984, and 986 and 988 are all mounted on a common heat sink, as are the matched pairs of transistors 990 and 992, and transistors 994 and 996 to provide temperature stability. The current in conductors 974 and 976 may be adjusted by variable resistors 978 and 980.

Each of the switching networks 972a–972d is comprised of a voltage divider network comprised of fixed resistors 1000, 1002 and a variable resistor 1004 which is connected across lines 974 and 976 by switching diodes 1006 and 1008. The sliding contact 1005 of variable resistor 1004 is connected through line 420a to the output of amplifier 412. The total resistance between points 1010 and 1012 is approximately ten kilo-ohms. A switching network is comprised of a series circuit including resistor 1014, transistor 1016, a ten kilo-ohm resistor 1018, transistor 1020 and resistor 1022. Diodes 1007 and 1009 connect, when forward biased as will presently be described, the voltage across resistor 1018 across the voltage divider resistors 1000, 1004 and 1002. Transistors 1016 and 1020 are controlled by a circuit comprised of resistor 1024, transistor 1026, transistor 1028 and resistor 1030 which is connected between the +15 volt and −15 volt power supplies. The base of transistor 1016 is connected between the resistor 1024 and the collector of transistor 1026, and the base of transistor 1020 is connected to the junction between the collector of transistor 1028 and resistor 1030. The base of transistor 1026 is connected to a +4.0 volt power supply, and the base of transistor 1028 is connected to point 399a which, it will be recalled, is the program ouput from the multiplex memory and interface. Each of the switching circuits 972b, 972c and 972d includes the same network and is driven from the +15 volt and −15 volt power supply to control the current carried by lines 974 and 976, and for this reason only networks 972a and 972b are shown in detail. However, the base of transistor 1028 of each of the switching networks is connected to a separate program line from the multiplex memory and interface 398.

In operation, +4.0 volts is applied to the base of transistor 1028 of only one of the switching circuits 972a–972d at any one time and a 0.0 voltage is applied to the corresponding transistor of the other three switching networks. For example, assume that bridge 378a is to be active and that the other bridges are to be disabled. A +4.0 volt level would be applied to terminal 399a, which is the base of transistor 1028 of switching network 972a, and a 0.0 voltage would be applied to terminals 399b, 399c and 399d of switching networks 972b–972d. Thus assume that program terminal 399a is at +4.0 volts, then the terminals 399b, 399c and 399d would all be at 0.0 volt. When +4.0 volts is applied to the base of transistor 1028, transistor 1028 is essentially turned off so that the potential at the base of transistor 1016 is raised and the potential at the base of transistor 1020 is lowered thereby turning each of these transistors essentially off. This causes the voltage drop across resistor 1018 in the switching branch to approach zero so that points 1018a and 1018b are essentially at ground potential. On the other hand, the 0.0 volt applied to terminals 399b–399d switches the transistor 1028 of these networks conductive thereby lowering the base of the corresponding transistor 1016 and raising the potential at the base of the corresponding transistor 1020 so that the control circuit conducts about 2.0 milliamps. As a result, a voltage drop of about ten volts is established across resistor 1018 which forward biases diodes 1007 and 1009 so that a voltage drop slightly less than ten volts is provided between points 1010 and 1012 in each of the networks 972b–972d. This reverse biases diodes 1006 and 1008 in each of the networks 972b–972d.

On the other hand, since the points 1018a and 1018b in network 972a are essentially at ground potential, the diodes 1007 and 1009 in network 972a are both reverse biased so that substantially the entire 0.5 milliamp passes through diode 1006, resistors 1000, 1004, 1002 and diode 1008. As a result, the points 1010 and 1012 of switching network 972a, which are connected by conductors 958 and 960 to reverse bias the bridge 378a, are at approximately +2.5 volts and −2.5 volts with respect to the sliding contact 1005, assuming that the sliding contact 1005 is centered. The sliding contact 1005 is connected through coax cable 320a to the output of amplifier 412 so that the +2.5 and −2.5 reverse bias voltages at points 1010 and 1012 will be centered about the voltage of the previous sample, which is the voltage at the output of the sampling bridge on capacitor 392, as will hereafter be described. Thus the strobe pulses, which are about −6.0 and +6.0 volts, respectively, can forward bias the diodes of bridge 378a.

The sampling bridges 378b–378d on the other hand are reverse biased by approximately +5.0 and −5.0 volts due to the ten volt drop between points 1010 and 1012 of the respective switching networks 972b–972d. This insures that even when the feedback voltage from the output of amplifier 412 is at one extreme potential, and the input to one of the inactive sampling bridges is at the opposite extreme potential, the diodes of the sampling bridge will nevertheless be sufficiently reverse biased to remain open or nonconductive.

Due to the voltage feedback to the sliding contact 1005 of resistor 1004 of the active sampling bridge system, the reverse bias on each of the diodes of the active sampling bridge is about 2.5 volts. Thus when the strobe pulses, which are about six volts, are applied, the diodes are forward biased to approximately 3.5 volts. Depending upon the potential of the input signal with respect to the charge on the capacitor at the output of the active sampling bridge, the current through the active sampling bridge is divided such that a portion of the voltage difference is transferred to the capacitor 392. For example, if the sampled voltage is equal to the voltage on the capacitor 392, then current from the conductors 958 and 960 will be equally divided through the branches of the bridge. If the sampled voltage is positive with respect to the charge on the capacitor 392, current will flow from capacitor 900 through the forward biased diode to conductor 958. At the same time, current flows from cable 960 through the forward biased diode to charge the capacitor 392 to a level equal to the level originally stored on the capacitor 392 plus a fraction of the difference between that value and the value of the voltage on capacitor 900, which is in effect the voltage being measured. The other two diodes of the sampling bridge are turned off due to the signal difference.

It will be noted that the transformer 962 will pass the strobe pulses because they are of opposite polarity. However, when a difference in the input voltage level at capacitor 900 and the voltage level on capacitor 392a is applied, the coupling between the windings of the transformer 962 serves as an impedance isolation means between the sampling bridge and the coax cables to the strobe pulse source.

The charge on capacitor 392a is applied to the field effect transistor 394a which has an extremely high input impedance. A transistor 1040 serves as a current source for the field effect transistor 394a. A second impedance stage is provided by transistor 1042 which is connected in emitter-follower configuration through the collector base of a transistor 1044 to still another current source transistr 1046. Transistor 1044 serves as the multiplex switch as will presently be described. The current sources 1040 and 1046 are driven from a common reference potential represented by the terminal 1048. The variable resistor 1050 provides a means for adjusting the current through the field effect transistor 394a, and therefore for adjusting the voltage drop from gate to source to a level that will offset the opposite polarity voltage drop from base to emitter of transistor 1042 thereby producing a zero voltage drop through the impedance stages.

The multiplex transistor 1044 is controlled by the current source transistor 1046, which in turn is controlled by the voltage at the base of transistor 1052. When a 0.0 voltage is applied to the base of transistor 1052, the transistor conducts such that the current through resistor 1054 in the emitter circuit is sufficient to satisfy all current passing through resistor 1056 as determined by the potential of the reference voltage at the base of transistor 1046 plus the voltage drop from base to emitter. This effectively reverse biases transistor 1046 to cut off, thus stopping all base current through multiplex transistor 1044. The multiplex transistor 1044 is further reverse biased by the current through the large resistor 1058. The multiplex transistor 1044 is protected by diode 1060, which is connected to a +4.0 volt source sufficient to reverse bias the base of transistor 1044. When a +4.0 volts is applied to the base of transistor 1052, the transistor is turned off and current through the resistor 1054 is shunted through diodes 1062. Then all current through the resistor 1056 is supplied from the reference voltage through the base-emitter of the current source transistor 1046, thus overcoming the reverse bias applied to the base transistor 1044 and turning the transistor on. The transistor 1044 is turned on so long as the particular probe controlled by the multiplex switch is being used. When the multiplex transistor 1044 is connected in the inverted mode as shown, i.e., where the base-collector junction is forward biased, a very low D.C. offset voltage on the order of 0.5 to 1.0 millivolt occurs through the multiplex transistor from collector to emitter. Multiplex channels 2, 3 and 4 are of the same configuration as multiplex channel 1 and all of the outputs are common as illustrated.

From the foregoing description, it will be noted that when a particular probe is active, a +4.0 volts is applied to the corresponding program control line 399a–399d. This enables the strobe impulse generator for that particular probe, enables the sampling bridge by reducing the reverse bias applied to the sampling bridge, and closes the appropriate multiplex channel by turning the corresponding transistor 1044 on.

The outputs from the multiplex channels are all connected by conductor 1070 to the first input 1072 of the differential operational amplifier 400. The amplifier 400 has a pair of impedance stages 1074 and 1076 and a pair of gain stages 1078 and 1080 which form a first differential stage. Feedback conductor 418 is connected to the base of the second input impedance stage 1076. A current source 1082 provides bias current for both the gain and the impedance stages and also provides common mode rejection.

The output from the first stage of amplifier 400 is fed by conductors 1084 and 1085 to the inputs of a second differential stage which includes a unity gain current inverter for the negative potentials. When the potential at the base of transistor 1074 is positive with respect to the potential at the base of transistor 1076, the input to the base of transistor 1086 will be positive with respect to the input to the base of transistor 1088. As a result, the transistor 1090 is turned off and transistor 1092 is turned on. At the same time, the lack of current through the collector circuit of transistor 1090 lowers the potential of the base of transistor 1094 thereby turning it off. As a result, all current through transistor 1092 is diverted to the output conductor 1095 to charge the capacitor 404 or 408 with a positive current. On the other hand, when the input to the base of transistor 1074 is negative with respect to the input to the base of transistor 1076, the input to transistor 1088 will be positive with respect to the input to the base of transistor 1086 so that transistor 1090 will conduct while transistor 1092 will be turned off. When transistor 1090 conducts, transistor 1094 is turned on so that a negative current is applied to the output conductor 1095 to charge the capacitor negatively, that is, current flows from the capacitor through transistor 1094 to the negative voltage supply.

An important aspect to consider is that the resistors 1096 and 1098 are matched and that the forward voltage drop across the diode 1100 offsets the voltage drop across the base-emitter of the transistor 1094. As a result, the voltage drop across resistor 1096 is equal to the voltage drop across resistor 1098 and the current flow through each will be equal. This in effect provides a unity gain current inversion to the output conductor 1095. Of course, resistors 1102 and 1104 are also matched to maintain the currents equal. The Zener diode 1106 merely protects transistor 1090 by reducing the voltage drop across the transistor and dissipating a portion of the power. The output conductor 1095 is connectable through switches 402 and 406 to charge capacitors 404 and 408, respectively.

The one microsecond single shot generator 410 is of conventional design and has an input 1107 which is driven by the emitter of transistor 908 of the pulse generator 374. The single shot 410 produces a single positive pulse at the output 1108 which lasts for approximately 1 microsecond. This pulse turns transistor 1109 on so that a current is passed through the primary winding of a transformer 1110. The pulse generated in the secondary winding of the transformer 1110 is used to close the normally open switch 402 by making the emitters of transistors 1111 and 1112 negative and the bases positive. The normally closed switch 406 is operated by a switch driver circuit indicated generally by the reference numeral 1113. In the normal condition, current flows from the +15 volt supply through resistor 1114, transistor 1116, conductor 1118, the base-emitter of transistor 1120 of switch 406, diode 1122, diode 1124, emitter-base of transistor 1126, conductor 1128, transistor 1130, and variable resistor 1132 to the −15 volt supply. However, when the positive pulse from the output 1108 is applied through conductor 1134 to the base of transistor 1136, transistors 1138 and 1140 are turned on so that the current through conductors 1118 and 1123 is reversed and the switch 406 turned off. The reversed current flows through resistor 114, transistor 1138, conductor 1128 and returns through conductor 1118, transistor 1140 and resistor 1132.

The charge on the capacitor 404 is applied to the input field effect transistor 1142 of the unity gain impedance amplifier 412 so that the voltage stored on the capacitor is essentially reproduced at the output 1144 of the amplifier. Similarly, the voltage on the capacitor 408 is passed through the impedance amplifier 414, which is identical to the amplifier 412, and is applied to one terminal of the variable resistor 416 the other terminal of which is connected to the output 1144. The sliding contact of the variable resistor 416 is connected by conductor 418 back to the base of transistor 1076 which is the #2 input to the amplifier 400 as heretofore described.

COMPARATOR SYSTEM

The output 431 of the sampling system is connected to input #1 of a comparator amplifier 434 of a reference and comparison system. The output of the amplifier 434 is connectable through a pair of switches 435 and 436 and diodes 438 and 440 to charge a capacitor memory M–II. The output of the amplifier 434 is also connectable by switches 444 and 446 through diodes 448 and 450 to charge a capacitor memory M–I. The voltage on the memory M–II is applied to the input of the high impedance, unity gain amplifier 454 and the output of the amplifier 454 is applied to the 100% terminal of a percent digital-to-analog converter 456 which is a programable voltage divider ladder network as will hereafter be described in detail. The voltage on the memory M–I is applied to the input of a high impedance, unity gain amplifier 458 and the output of the amplifier is applied to the 0% terminal of the DAC 456. The output 460 of the DAC 456 is connected to input #2 of the comparator amplifier 434. Thus if the percent DAC 456 is programmed at 0%, the voltage on memory M–I is applied to input #2 of the comparator amplifier 434. If 100% is programmed, the voltage stored on the memory M–II is applied to the input #2 of the comparator amplifier 434. Any percent between 0% and 100% can also be programmed in which case a voltage equal to the voltage stored on memory M–I plus the programmed percent of the difference between the voltage stored on memory M–II and the voltage stored on memory M–I will be applied to the second input of the comparator amplifier 434.

Whenever the voltage applied to input #1 of the comparator amplifier 434 exceeds the voltage fed back from the percent DAC 456 at the second input and switches 435, 436, 444 and 446 are open, the gain of the amplifier 434 together with the gain of the high impedance, high gain amplifier 462 is sufficient to change the output of the amplifier 462 from a "0" logic level of 0.0 volt to a "1" logic level of +4.0 volts.

Assume now that it is desired to store the voltage level applied to input #1 of the comparator amplifier 434 on capacitor memory M–I. The percent digital-to-analog converter 456 is set to 0.0% so that the output of the unity gain amplifier 458 is connected to input #2. Switches 444 and 446 are closed. When the voltage is applied to input #1, amplifier 434 produces an output which is applied through the switches 444 and 446 and the diodes 448 and 450 to rapidly charge the capacitor memory M–I. The voltage level on memory M–I is fed back through the amplifier 458 and the percent DAC 456, without division, to input #2 of amplifier 434 until the feedback voltage at input #2 equals the input voltage at input #1. Then the output from the comparator amplifier terminates and the voltage stored on the memory M–I is equal to the voltage at input #1. The procedure for storing a voltage on memory M–II is the same except that switches 435 and 436 are closed rather than switches 444 and 446 and the percent DAC 456 is programmed at 100%. The most positive voltage applied to input #1 during a given time period can be stored on capacitor memory M–I by closing only switch 444, or on memory M–II by closing only switch 435 as a result of diodes 448 and 438, respectively. Similarly, the most negative voltage value can be stored on M–I by closing only switch 446 so that the diode 450 is operative, or on M–II by closing only switch 436 so that diode 440 will be operative.

All dynamic measurements are based upon the reference voltage fed back from the percent DAC 456 to input #2 of the comparator 434. This feedback reference voltage is derived from the voltages stored on either or both of the capacitor memories M–I and M–II. For this reason, the automatic operation of the system provides a normalization I period during which a voltage is stored on memory M–I followed by a normalization II period during which a voltage is stored on memory M–II. After normalization of either or both memories M–I and M–II, the voltage on either memory M–I or M–II, or a voltage equal to the voltage on M–I plus a programmed percent of the voltage on M–II minus voltage on M–I may be fed back to input #2 of the comparator amplifier 434 and compared to the voltage at input #1. For example, the voltage on memory M–I can be applied to input #2 by programming the percent DAC to 0.0%. Similarly, the voltage on memory M–II may be applied to input #2 by programming the percent DAC 456 to 100%. When the percent DAC 456 is programmed to any percent other than 0.0% or 100% it acts as a voltage divider so that the feedback reference voltage is equal to the voltage on memory M–I plus the programmed percent of the difference between the two voltages. For example, assume +1.0 volt on M–I and +2.0 volts on M–II with 40% programmed. The feedback reference voltage would then be +1.4 volts. Whenever the voltage at input #1 of comparator 434 is equal to or less than the voltage at input +2, the output of amplifier 462 is 0.0 volt or a logical "0," and whenever the potential at input #1 exceeds that at input #2, the output of amplifier 462 is +4.0 volts or a logical "1," assuming that switches 435, 436, 444 and 446 are open.

The reference and comparison system is shown in detail in FIGS. 18a, 18b and 20 wherein corresponding components are designated by the same reference characters as in FIG. 5e. The #1 input of amplifier 434 is the base of transistor 1200 and the #2 input is the base of transistor 1202. These transistors are high impedance input stages and are connected in emitter-follower configuration to transistors 1204 and 1206 which are gain stages, forming the first differential stage. Transistor 1208 provides a current source for impedance stages 1200 and 1202, and transistor 1210 provides a current source for the gain stages 1204 and 1206, the current sources providing common mode rejection.

The outputs of gain stages 1204 and 1206 are connected to the bases of emitter-follower impedance stages 1212 and 1214, respectively, of a second differential stage which also has a variable transconductance mode as well as a current inversion mode. The outputs of the impedance stages 1212 and 1214 are connected to the bases of gain stages 1216 and 1218, respectively. The output of the second differential stage, that is the output of transistor 1216, is connected through conductors 1220 to charge the capacitor 442 (which is memory M–I) either through transistor switch 436 and diode 438, or through diode 440 and transistor switch 435, as well as to charge capacitor 452 through the corresponding transistor switches 444 and 446 and diodes 448 and 450 as will presently be described.

During normal operation, the emitter supply to the gain stages 1216 and 1218 is supplied through a relatively high resistance 1222 so that the transconductance of the amplifier is at a relatively low value. During the first portion of a normalization period, however, the emitter current is supplied through a relatively low resistance 1224 by turning transistor 1226 on. Transistor 1226 is controlled from the circuit comprised of resistor 1228, transistor 1230 and transistor 1232. The base of transistor 1230 is at a fixed potential. Transistor 1232 is controlled by a single shot circuit 1233 which normally applies a +4.0 volts to the base of transistor 1232 but removes the +4.0 volts for the first part of each normalization period. When +4.0 volts is applied to the base of transistor 1232, the current through the control branch including transistor 1232 is at a low value so that transistor 1226 is biased off. However, when the +4.0 volts is removed from the base of transistor 1232, the current through resistor 1228 increases so that transistors 1226 and 1227 are turned on, thereby increasing the current through the gain stages 1216 and 1218 so as to increase the current available to charge the respective capacitors 442 and 452. Thus the transconductance of the amplifier 434 will be a high value during the initial part of the normalization period, and then will be at the normal lower value during the last portion of the normalization period.

As mentioned, the second stage of the amplifier 434 also has a current inverter mode which permits either positive or negative current through the output conductor 1200 to the capacitors 442 and 452 while placing substantially lower power handling requirements upon the transistors 1216 and 1218. The current inversion is provided by transistors 1234 and 1236. When input #1 is positive with respect to input #2, the collector of transistor 1216 will be positive with respect to the collector of transistor 1218. Since the bases of transistors 1234 and 1236 are connected through diodes 1238, the conductance of transistors 1234 and 1236 will be reduced so that the positive current will flow through conductor 1220, and either switch 436 and diode 438 to charge capacitor 442, or switch 446 and diode 450 to charge capacitor 452. On the other hand, when input #1 is negative with respect to input #2, the collector of transistor 1218 will become more positive, the collector of transistor 1216 will become more negative, and transistor 1234 will be turned on so that current will flow either from capacitor 442 through diode 440 and switch 435, or from capacitor 452 through diode 448 and switch 444 to conductor 1220 and through transistor 1234.

Switch 435 is closed, i.e., turned on, by applying a +4.0 volts indicative of a logic "1" level to control terminal 1250. This turns transistor 1252 off, thus raising the potential at junction 1254. This makes the base of transistor 1256 more positive than the base of transistor 1258 of the differential amplifier pair so that transistor 1258 conducts and supplies current to the base of transistor switch 1235 thereby turning it on. Similarly, a +4.0 volts applied to the base 1260 of transistor 1262 turns the transistor off. This turns transistor 1264 off and transistor 1266 on, thereby diverting current from transistor 1268 through the transistor 1266, rather than through the base of transistor switch 436, thereby turning transistor 436 on. Switch 444 is identical to the switch 435 and its associated control circuitry, and switch 446 is identical to the switch 436 and its associated control circuitry.

The voltage charge on capacitor 442 is passed through conductor 1270 to the control gate of a field effect transistor amplifier 1276 of the unity gain impedance amplifier 454. The input impedance of the field effect transistor 1276 is very high in excess of 2,000 megohms. The output from amplifier 1276 is applied by way of emitter-follower 1278 to the output terminal 1280. In order to have an extremely low output impedance, a feedback loop including transistors 1282 and 1284 is provided to supply the loop gain necessary to lower the impedance of an output terminal to a very low value, which may be around 0.012 ohm. Amplifiers 458 and 462 may be of substantially the same configuration as amplifier 454. However, amplifier 462 also has a gain stage so that the output of amplifier 462 is at 0.0 volt, indicative of a "0" logic level, when input #1 of amplifier 434 is more negative than input #2, and has an output of +4.0 volts, indicative of a logic "1" level, when input #1 is more positive than input #2. Output 1280 from amplifier 454 and output 1286 from amplifier 458 are connected to the percent digital-to-analog converter network shown in detail in FIG. 20 and form the input buses to the ladder network. The output 1288 of amplifier 462 is connected to the transition detector 464.

Referring now to FIG. 20, the percent DAC 456 is comprised of a voltage divider network having a units decade summing bus 1300 and a tens decade summing bus 1302 which are interconnected by a resistor 1304. The tens decade summing bus 1302 is connected to input #2 of the amplifier 434, and in particular to the base of transistor 1202. The output 1280 from amplifier 454 is a bus which is selectively connectable to summing bus 1300 through transistor switches 1306–1310 and resistors 1311–1315, respectively, and to summing bus 1302 through transistors 1316–1319 and resistors 1320–1323, respectively. Similarly, the output 1286 from amplifier 458 is a bus which is selectively connectable to the units summing bus 1300 by transistors 1324–1328 and resistors 1311–1315, respectively, and to the tens summing bus 1302 by transistors 1329–1332 and resistors 1320–1323, respectively. The resistors 1311–1315 and 1320–1323 have values selected to provide a basic 1:2:4:2 code and resistor 1304 is selected to provide a decade step to produce the percentages as indicated in FIG. 20, with the addition of resistor 1311 to provide the additional 1% necessary for one hundred increments.

The switching transistors 1306–1310 and 1316–1319 for the input bus 1280 are operated in the alternative with the transistor switches 1324–1332 for the input bus 1286 by means of control transistors 1333–1341 and 1342–1350. Each pair of control transistors, for example transistors 1333–1341, form a differential pair having a common emitter supply voltage bus 1352 and collector supply buses 1354 and 1356. The base of each of the transistors 1342–1350 is connected to a +4.0 volt reference bus 1358 while the bases of transistors 1333–1341 are connected to a voltage divider between a positive bus 1360 and ground. Control terminals 1361–1369 are connected to the voltage divider controlling each of the transistors 1333–1341, respectively, and are programmed from the percent DAC memory 480 and percent DAC interface 494. When a logic "0" level, i.e., ground potential, is applied to one of the control terminals 1361–1369, the bus 1280 is connected through the corresponding transistor 1306–1310 or 1316–1319, and corresponding resistor 1311–1315 or 1320–1323 to either bus 1300 or 1302 and the corresponding transistor 1324–1332 is turned off. When a logic "1" level, i.e., +4.0 volts, is applied to one of the terminals 1361–1369, the corresponding transistor 1306–1310 or 1316–1319 is turned off and the corresponding transistor 1324–1332 is turned on, thereby connecting bus 1286 from amplifier 458 to the corresponding resistor. It should be noted that each of the buses 1300 and 1302 is always connected through each of the resistors 1311–1315 and 1320–1323 to either input bus 1280 or input bus 1286.

In order to program 100%, all terminals 1361–1369 would be at ground potential so that the input bus 1280 of amplifier 454 would be connected through all of the resistors 1311–1315 and 1320–1323 to the respective summation buses 1300 and 1302. As a result, a voltage level representative of 100% of the voltage level at the output of amplifier 454 would be connected back to input #2 of the operational amplifier 434. On the other hand, if a 0% is programmed, all of the terminals 1361–1364 would b a +4.0 volts, and bus 1286 would be connected through transistors 1324–1332 to each of the resistors 1311–1315 and 1320–1323 and the voltage at the output of amplifier 458 would be connected back to input #2 of amplifier 434. Assuming that a 35% level is programmed, a 0.0 voltage level would be applied to program control terminals 1362, 1364, 1366 and 1367, and a +4.0 volts would be connected to all other control terminals. Then the resistor network functions as a voltage divider such that the voltage at bus 1302, which is fed back to the #2 input of the comparator amplifier 432, would be representative of the voltage at the bus 1286 of amplifier 458 plus 35% of the difference between this voltage and the voltage at the bus 1280 at the output of amplifier 454.

Typical resistor values for the percent DAC ladder are 40,000 ohms for the 1% resistors 1311 and 1312 and the 10% resistor 1320, approximately 20,000 ohms for the 2% resistors 1313 and 1315 and the 20% resistors 1321 and 1323, 10,000 ohms for the 4% resistor 1314 and the 40% resistor 1322, and 13,000 ohms for the decade transfer resistor 1304.

The output from amplifier 462 is applied to a transition detector 464. The transition detector 464 includes a counter which requires that a logic "1" level be present at the output of amplifier 462 for three successive counts of the low speed logic clock. If the output of amplifier 462 should return to "0" level before the count of three, the counter is reset and the count resumed when the output returns to a logic "1" level. The transition detector 464 also has a second counter and logic circuitry which can be programmed to indicate either the first or second transition. Positive transitions are indicated by the transition from logic "0" to logic "1." The first and second negative transitions are detected by inverting the logic signal from the amplifier 462 and using the same counters. Then when input #1 of comparator 434 changes from more positive to more negative than input #2, a transition will be detected. The transition signal is fed through conductor 468 to a dynamic sequence timetable 470 which transmits a stop count signal to the data counter control 284 as represented by the line 472 instructing the data counter control to terminate the data count by the counter 286.

The data readout system presently to be described utilizes J-K flip-flops, such as the Texas Instruments type SN 530 shown symbolically in FIG. 25, for the various binary stages. The J-K flip-flop can switch states only on a clock pulse applied to the clock line CL, and then only if the inputs J*, J, K, K* are at the proper logic levels.

The flip-flop has true and complement outputs T and C, and a logic "1" state is defined as a logic "1" level on the true output. The flip-flop can be reset immediately to a logic "0" state by a logic "1" level on reset input R. It will be noted that inputs J and K are inverted prior to application to the J' and K' AND gates.

The truth table in FIG. 26 illustrates the operation of the J-K flip-flop. The first four columns $J_n$ through $K_n^*$ indicate the state of the J, K, J* and K* inputs after clock pulse $n$, and the fifth column indicates the state of the true output T after the next clock pulse $n+1$. The letter C in column $T_{n+1}$ indicates that the flip-flop complements, while the symbol $\bar{C}$ indicates that the flip-flop does not complement.

The truth table of FIG. 27 is applicable for all conditions and shows the operation of the flip-flop in terms of the outputs of AND gates J' and K'. Thus it will be noted that when the outputs of both J' and K' are at logic "1," the flip-flop does not complement. When the outputs of both J' and K' are a logic "0," the flip-flop complements either from a logic "1" state to a logic "0," or from a logic "0" state to a logic "1" state, depending upon the state of the flip-flop prior to clock pulse $n+1$. If the output of J' is a logic "1" and the output of K' is a logic "0," the flip-flop is switched to the logic "1" state. If the output of gate J' is a logic "0" and the output of gate K' is a logic "1," the flip-flop goes to the "0" state.

The transition detector 464 is shown in detail in the logic diagram of FIG. 21 and is comprised primarily of J-K flip-flop binaries $X_1$, $X_2$, $X_3$, $T_1$ and $T_2$. The count data signal from the dynamic sequence timetable enables NAND gate 1700 when in a logic "1" state, which indicates that a transition is to be detected, so that the low speed logic clock will be gated through to binaries $X_1$-$X_3$, $T_1$ and $T_2$. When the count data signal from the sequence timetable presently to be described is at a logic "0" level, the low speed reset clock is gated through gate 1702 to reset the five binaries to a logic "0" level by the complement of the count data signal derived from inverting gate 1703.

An AND/OR gate 1704, formed by NAND gates $a$, $b$ and $c$, may be programmed by lines 1706 and 1708 so that the transition detector will detect either a positive or negative transition, respectively. Line 1710 is the output from amplifier 462, and thus it is at a logic "0" level when the #1 input of operational comparator amplifier 434 is more negative than input #2, and is at a logic "1" level when input #1 is more positive than input #2. Thus when positive transition program line 1706 is at logic "1," and negative transition program line 1708 is at logic "0," the logic "1" level on output line 1710 is gated through gates 1704a and 1704c to input line 1712. If, however, a negative transition is programmed by making program line 1708 a logic "1" and program line 1706 a logic "0," a logic "0" level at the output 1710 of amplifier 462 will be inverted by inverter 1714 and gated through gates 1704b and 1704c as a logic "1." Thus when a positive transition is programmed, line 1712 goes from a logic "0" level to a logic "1" level when input #1 of comparator 434 goes from more negative to more positive than input #2, and conversely, when a negative transition is programmed, the output line 1712 goes from a logic "0" to a logic "1" when input #1 of the comparator 434 goes from more positive to more negative than input #2. Thus it will be noted that in either case input line 1712 goes from logic "0" to logic "1," and this change is to be detected as will now be described.

Assume that at the start of the data count all five binaries $X_1$-$X_3$, $T_1$ and $T_2$ are at a logic "0" level as a result of the reset clock pulses being gated through gate 1702 to the binaries. Assume also that line 1712 is initially at a logic "1" level. It is important that the transition detector be responsive only to a change in state of input line 1712 from a logic "0" to a logic "1," and not be responsive merely to a logic "1." Thus when line 1712 is initially at a logic "1" level, binary $X_1$ is retained in the "0" state because line 1712 is connected to the J and K* inputs, while the J* and K inputs are connected to a voltage supply and ground, respectively, which supply a logic "1" level and a logic "0" level, respectively. Thus the output of binary $X_1$ is always the complement of input line 1712. Since both binaries $X_1$ and $X_2$ are then in a logic "0" state, the output from AND/OR gate 1716 is at a logic "0" level. Thus binary $X_2$ is held in the logic "0" state. The output from gate 1716b is a logic "1" so that binary $X_3$ is also switched to a logic "0" level. Thus the transition detector is inactive.

Whenever line 1712 goes to a "0" level, binary $X_1$ is switched to a logic "1" level on the next clock pulse. This still does not activate the transition detector because neither the output from gate 1716b nor gate 1716c is changed, the inputs to gate 1716a having merely been reversed. However, when binary $X_1$ is in the logic "1" state, the transition detector is then enabled so that when line 1712 goes from a logic "0" level to a logic "1" level, indicating a transition of the type to be possibly detected, $X_1$ is switched to a logic "0" level and $X_2$ is switched to a logic "1" level on the first clock pulse thereafter. It will be noted that binary $X_1$ is switched directly from line 1712, and binary $X_2$ is switched because the output from gate 1716c goes to a logic "1" level thus switching binary $X_2$ to a complement mode.

On the second clock pulse, binary $X_1$ remains in the logic "0" state since it is steered from line 1712 which has not changed, binary $X_2$ goes to a logic "0" state since the output from gate 1716a is still a logic "1" as a result of both inputs to gate 1716b being at a logic "1," and binary $X_3$ goes to a logic "1" as a result of the output of gate 1716b going to a logic "0," thus causing $X_3$ to operate in the complement mode.

On the third clock pulse, binary $X_3$ is switched back to "0" state since the output from gate 1716b went back to a logic "1" level on the second clock pulse as a result of binary $X_2$ switching to a logic "0," and binary $T_1$ switches to a logic "1" level as a result of the output of NAND gate 1718 going to a logic "0" and thereby switching binary $T_1$ into the complement mode. If the first transition is to be detected, line 1720 will be at a logic "1" level to enable gate 1722a so that the logic "1" level on binary $T_1$ will be gated through AND/OR gate 1722 to output line 1724 which goes to the dynamic sequence timeable to bring down the count data signal.

It is important to note that binary $X_2$ is not switched back to the logic "1" level on the third clock pulse because both $X_1$ and $X_2$ are in the "0" state so that the output of gate 1716c is at a "0" level thus continuing to hold $X_2$ in the "0" state. Similarly, $X_3$ is held in the "0" state on subsequent clock pulses even though line 1712 may remain at a logic "1" level because the output of gate 1716b is at a logic "1" level.

As mentioned, if a first transitioned is programmed, the count data signal goes to a logic "0" level on the third count so that the low speed reset clock is gated through and all binaries reset to "0" state. If, however, the second transition is to be detected, line 1726 is at a logic "1" level and line 1720 is at a logic "0" level so that gate 1722b is enabled rather than gate 1722a. Then when binary $T_1$ goes to a "1" state, the output from gate 1722 remains at a logic "0" level so that the count data signal stays at a logic "1" level and binary $T_1$ is not reset. However, binaries $X_1$, $X_2$ and $X_3$ do not operate even though the line 1712 remains at a logic "1" level because $X_1$ is in the "0" state, thereby disabling the count function. Thus if the second transition is to be detected, the line 1712 must again go to a logic "0" level so that binary $X_1$ will be set to the "1" state and thereby enable the transition count. Then when line 1712 again goes from a logic "0" to a logic "1" level, $X_1$ goes to a "0" state and $X_2$ to a "1" state on the first low speed clock pulse, $X_2$ goes to a "0" state and $X_3$ to a "1" state on the second pulse, and $X_3$ goes to a "0" state and $T_2$ goes to a "1" state on the third pulse as a result of gate 1728 being enabled by the true outputs of both $X_3$ and $T_1$ being at a logic "1" level and input line 1712 being at a logic "1" level. The second transition is then gate out through gates 1722b and 1722c to the dynamic sequence timetable 470 which switches the count data signal to a logic "0" level, thereby resetting all five binaries to a "0" state.

It is very important to note that if line 1712, after having once gone from a "0" level to a "1" level, goes back to a logic "0" level prior to the third clock pulse when binary $T_1$ is switched to a "1" state, binaries $X_1$, $X_2$ and $X_3$ are reset, on the next clock pulse, to the enable state, i.e., $X_1$ is set to a "1" state and $X_2$ and $X_3$ are set to the "0" state. This is because gates 1716a–1716c, 1718 and 1728 are enabled only when line 1712 is at a logic "1." When line 1712 goes back to a logic "0," the output from gate 1716c is a logic "0," which switches $X_2$ to a "0" state on the next clock pulse, the output from gate 1716b is a logic "1" which switches binary $X_3$ back to "0" state on the next clock pulse, and gates 1718 and 1728 are disabled and have an output of logic "1" so that both binaries $T_1$ and $T_2$ are in the not-complement state and cannot be switched to the "1" state on the third clock pulse. If the third clock pulse occurs, however, before input 1712 goes back to "0" level, then binaries $T_1$ and $T_2$ are not affected because they operate in the complement and not-complement modes, rather than the steering mode.

Thus it will be noted that either a positive or negative transition can be detected merely by programming either line 1706 or 1708. The first or second transition can be programmed by lines 1720 and 1726. The transition detector requires that the output from amplifier 462 remain at the logic "1" level for a minimum of three samples, i.e., three low speed clock pulses, thereby insuring that a true transition has been detected. If line 1712 goes back to a logic "0" prior to the three low speed clock pulses, even for a single clock pulse, a true transition signal is not produced until line 1712 has returned to the logic "1" level for three more low speed clock pulses. It will be appreciated that since the same three counts are made for the transition detection during both major scan I and major scan II, and since only the difference between the two measurements made during major scan I and major scan II is finally produced by the data readout, the three clock pulse delay for each measurement cancels and does not affects the accuracy of the final data reading.

Figure 11:
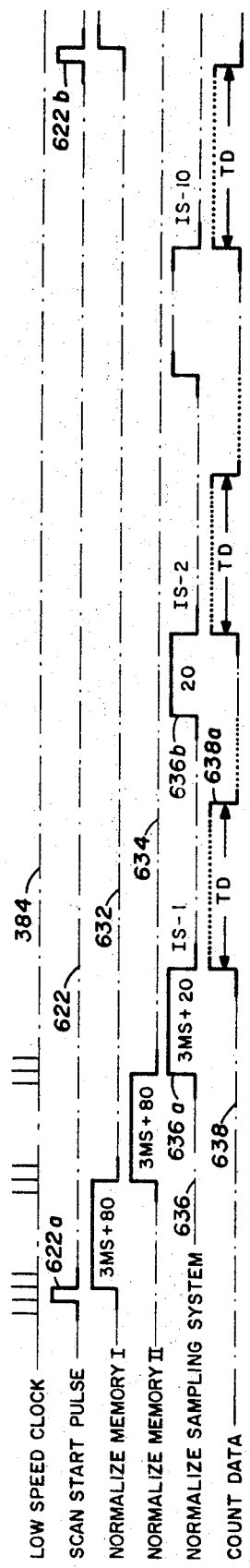
FIG. 11 is a timing diagram which illustrates the automatic sequence during major scan I with other than peak storage.
Figure 12:
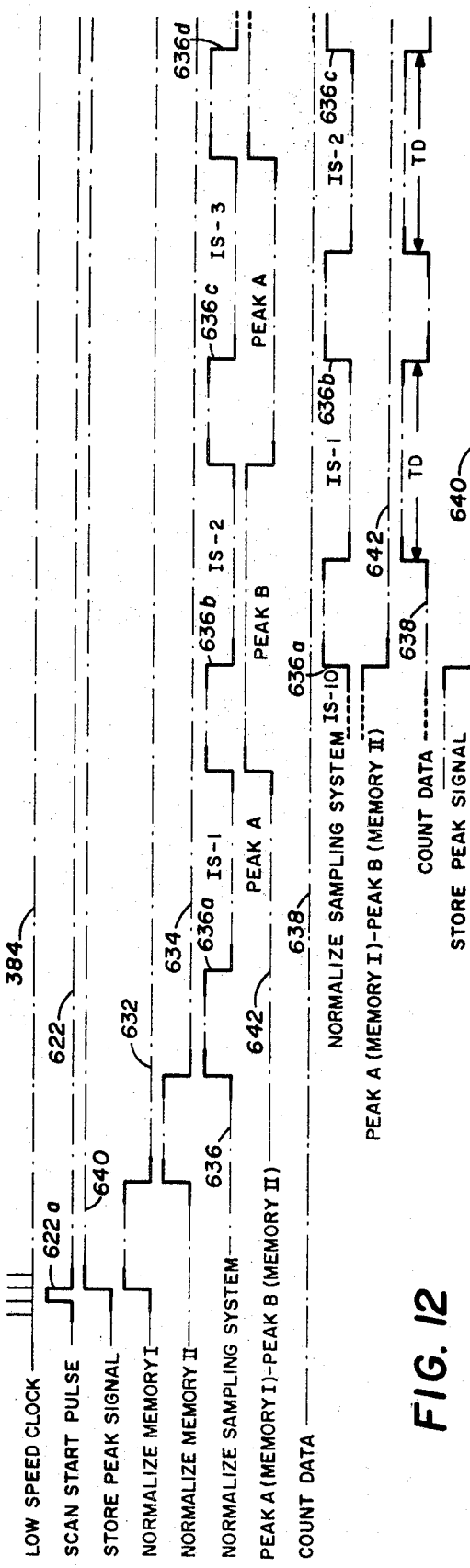
FIG. 12 is a timing diagram which illustrates the automatic sequence during major scan with peak storage.

The dynamic measurement sequence is automatically controlled by the dynamic sequence timetable 470 and the dynamic sequence interface 474. The low speed logic clock represented by the time line 384 in the timing diagrams of FIGS. 9, 11 and 12 provides, as previously mentioned, the cadence for the dynamic measuring subsystem. On the first low speed clock pulse after the start measurement signal 614 from the delay test timer 255, a dynamic start measurement signal 620 is produced. This signal initiates the rise of a start scan pulse 622a on time line 622 which lasts for one low speed clock pulse. One clock pulse after the dynamic test start signal comes up, major scan I signal 624 comes up an stays up until both major scans have been completed. At the completion of major scan I, a second scan start pulse 622b is generated and lasts for one clock pulse and causes major scan II signal 626 to come up to a logic "1" level. Major scan I signal (MS–I) and major scan II signal (MS–II) are used to gate the appropriate program information out of the various memories at the proper time as will hereafter be described. Major scan I period is indicated by major scan I signal 624 being up and major scan II signal being down, and the major scan II period is indicated by both major scan I and major scan II signals being up. After the ten interlace scans of major scan II, start measurement signal 620 falls to "0" logic level, thereby instigating the test complete signal 616 and the record test results signal 618 in FIG. 8. One clock pulse later, major scan I signal 624 an major scan II signal 626 return to "0" logic level.

FIG. 11 illustrates by time lines the sequence of events within a major scan, for example major scan I, when a peak amplitude is not to be stored. At the fall of scan start pulse 622a and the start of major scan I, a normalize memory I signal 632 comes up for three milliseconds plus eighty low speed clock pulses. During this period, which may be hereafter referred to as normalization period I, a voltage is stored on capacitor memory M–I which is derived from a source determined by programmed information as will presently be described. At the end of normalization period I, a normalize memory II signal comes up for three milliseconds plus eighty low speed clock pulses. During this period a reference voltage is stored on memory M–II. This period is hereafter referred to as normalization period II. Then a normalize sample system signal 636 comes up for three milliseconds plus twenty low speed clock pulses as indicated by pulse 636a to permit the sampling system to normalize on the voltage at $T_0$.

At the end of the first normalization period 636a for the sampling system, the tens and hundreds decades of the staircase counter, which are used to count the twenty clock pulses, are reset to zero so that interlace scan IS–1 may start on the next low speed clock pulse. At the same time, the count data signal 638 comes up and activates the data counter 286 through the data counter control 284 so that it may also begin on the next count. The count data signal 638 stays up until a transition detection signal is received at the dynamic sequence timetable from the transition detector 464 through conductor 468 at which time the count data signal 638 returns to logic "0" level and the data counter ceases counting. During major scan I the data counter 286 counts in subtract mode, unless otherwise programmed. The normalize sampling system signal 636 may come up at the transition detection 638a to start the second normalization period 636b, or may optionally, by manual control, remain down until the staircase counter reaches a count of three hundred ninety-nine in order to complete the entire interlace scan IS–1 for display purposes before starting the normalization period 636b. After the second normalization period 636b, interlace scan IS–2 starts. Normalization periods 636b, 636c, etc. are provided between the ten interlace scans to permit the sampling system to normalize at $T_0$. During the set of interlace scan periods, either a time or voltage measurement can be made. In either case, the data counter counts in subtract mode and merely continues the count during each interlace scan and the final data count at the end of interlace scan IS–10 represents the first measurement value. After the tenth interlace scan IS–10, scan start pulse 622b occurs and starts major scan II during which the same procedure is repeated, except that the data counter begins, without being reset, to count in the add mode so that the final reading of the data counter provides the differential measurement between the two measurements made during the two major scans.

When the peak amplitude occurring during a particular time interval is to be stored on either memory M–I or memory M–II, the sequence illustrated by the time lines in FIG. 12 is followed rather than the sequence illustrated in FIG. 11. The peak storage sequence is the same as the normal storage sequence except that a store peak signal represented by the time line 640 comes up at the end of scan start pulse 622a. Normalize memory I signal 632, normalize memory II signal 634 and normalize sampling system signal 636 occur as previously described except that the first ten interlace scans all proceed to the full three hundred ninety-nine count. However, the data count signal 638 remains at "0" logic level during the first ten interlace scans. A peak store signal 642 complements at the end of each of the first ten interlace scans. The peak store signal 642 is used to effect the storage of one peak, designated peak A, on memory M–I during the odd numbered interlace scans IS–1, 3, 5, 7 and 9, and the storage of a second peak, designated peak B and usually of the opposite polarity, during the even numbered interlace scans IS–2, 4, 6, 8 and 10. After interlace scan IS–10, the ten interlace scans are repeated during which the count data signal 638 is brought up to initiate the data count during each interlace scan as illustrated so as to make the desired amplitude or time measurements based on the voltage or voltages stored in memories M–I and/or M–II.

Although the automatic sequence provides for normalization periods I and II during which a voltage may be stored on memories M–I and M–II, respectively, and also provides, if desired, peak storage periods for storing a peak amplitude on either memory M–I or memory M–II during each of major scans I and II, it will be appreciated that never are more than two of these storage periods utilized, except when a memory is normalized at the opposite high voltage during peak storage, and frequently only one storage period is utilized. For example, assume that it is desired to measure the amplitude of the pulse 314a at $V_{S2}$ with respect to the voltage at $V_{S1}$. For this measurement, the staircase control 362 would be programmed, during normalization period I of major scan I, to produce a steady state voltage at the output of the staircase ladder network 358 at a level such as to produce a strobe pulse at time $V_{S1}$ within the fast ramp period $T_0$–$T_{4000}$. The sampling system automatically operates in the sampling mode unless a signal is received on cable 528 from the dynamic sequence interface to ground the probe and input to amplifier 356 by closing switches $L_nR_2$, $L_nR_3$ and 373 and connect the staircase ladder network 358 to the output 431 by opening switches 432 and 433. Nothing would be programmed for normalization period II of major scan I. For all voltage measurements, the sampling system is programmed to operate in reference mode during the interlace scan periods of both major scans I and II. By reference mode it is meant that the output voltage of the staircase ladder network 358 is applied to input #1 of the comparator amplifier 434. It will be noted that only capacitor memory M–I is being used to store a reference voltage during major scan I.

For major scan II, normalization period I, the staircase control 362 is programmed to operate in the steady state program mode and produce a constant staircase ladder network voltage selected to produce a strobe pulse at time $V_{S1}$, and the sampling system is programmed to operate in the sample mode. Nothing is programmed for normalization period II for major scan II. The sampling system is again programmed to operate in the reference mode, i.e., connect the ladder network 358 to input #1 of the comparator 434.

Then when the system is placed in automatic operation, the system will first take repeated samples of the waveform at $V_{S1}$ during normalization period I of major scan I, and the voltage at $V_{S1}$ will be stored on memory M–I. It is immaterial for an amplitude measure what voltage is stored on memory M–II because the DAC will subsquently be programmed at 0%. During each of the ten interlace scans of major scan I, the staircase control 362 will automatically operate the staircase ladder network in the count mode, and the data counter 286 will automatically be initiated to count, in the subtract mode, the total number of low speed clock pulses occurring during the ten periods defined by the start of each interlace scan and the subsequent transition detection. The total number will be representative of the voltage at $V_{S1}$ with respect to some unknown voltage level.

During normalization period I of major scan II, the sampling system takes repeated samples of the waveform at time $V_{S2}$ and this voltage is again stored on memory M–I. Again the voltage stored on memory M–II is immaterial. The sampling system again operates in reference mode during the interlace scans of major scan II, as will always be the case for amplitude measurements. The data counter 286 again is activated to count the total number of pulses occurring within the count periods of the ten interlace scans of major scan II, but this time the data counter counts in the add mode. The final reading on the data counter is then a direct measure of the difference in the voltage between point $V_{S2}$ and point $V_{S1}$.

It will be appreciated that the amplitude between any two points on the waveform 314 within the time period $T_0$ to $T_{4000}$ can be measured in the same manner by selecting the proper voltage from the staircase ladder network to produce the strobe pulse at the desired time $T_n$ during the normalization period of each major scan. It will also be appreciated that any voltage which can be stored on either memory M–I or M–II can be measured with respect to any other voltage which can be stored on one of the memories. Therefore any point on the waveform can be measured with respect to any reference voltage. In particular, any of the four thousand voltage levels from the staircase ladder network may be stored on either of the memories M–I or M–II by operating the ladder network at the programmed level and operating the sampling system in the reference mode during the appropriate normalization period. Of course, the voltage at any lead of the device identifiable by time may be measured with respect to the voltage at any other device lead which is identified by time. Further, either positive or negative peak voltages, $+V_P$ or $-V_P$ on the waveform 314 for example, may be stored and measured during a major scan period. For example, $+V_P$ could be stored, when operating in the peak store mode of FIG. 12, on memory M–I during interlace scan periods 1, 3, 5, and 9 by closing only switch 444 and operating the staircase ladder network in the count mode and the sampling system in sample mode. Then the peak voltage $+V_P$ would be measured during the second ten interlace scans by standard voltage measurement procedures. This measurement could be programmed during either major scan I or major scan II so as to provide a measurement relative to any other voltage stored and measured during the other major scan. The negative peak $-V_P$ could be measured in precisely the same manner except that it would be stored on memory M–I by closing switch 446 during the first ten interlace scans.

Time measurements can be made between amplitude percent levels or voltage levels. In order to obtain percent levels, it is first necessary to define the 0% and 100% levels, which may hereafter be referred to as normalization points, by a time $T_n$ between $T_0$ and $T_{4000}$, or by a known or selected reference level, and then to store these reference values on memories M–I and M–II, respectively, during MS–1 and MS–II, respectively. Then the percent DAC is programmed to derive the desired percent level to be detected during each major scan. For example, assume that it is desired to measure the rise time of the pulse 314b between a lower percent level $V_X$, such as 15%, and a higher percent level $V_Y$, such as 85%, based upon a 0% value at $V_{S1}$ and a 100% value at $V_{S2}$. The voltage $V_{S1}$ would be stored on memory M–I during normalization period I of major scan I, and $V_{S2}$ would be stored on memory M–II during normalization period II of major scan I. The percent DAC 456 would be programmed for 15% during the ten interlace scans of major scan I and the sampling system would be operated in the scan mode during major scan I. The data counter 286 would then count, in subtract mode, the low speed logic clock pulses, and hence the number of samples, from $T_0$ until a transition at $V_X$ for each of the ten interlace scans and thereby sum the total number of samples during the ten scans. During major scan II the voltages $V_{S1}$ and $V_{S2}$ would again be stored on memories M–I and M–II during normalization period I and normalization period II. However, the DAC 456 would be programmed for 85% during the ten interlace scans of major scan II. As a result, the data counter 286, counting in add mode, would then count the total samples taken during the ten interlace scans from $T_0$ until a transition at $V_Y$ of each scan. The reading on the data counter would then represent the time required for the pulse 314b to rise from the 15% level to the 85% level. Of course, it will be appreciated that any percent level between two reference voltages stored on memories M–I and M–II can be detected merely by programming the DAC 456, and the time period between any two such detectable percent levels can be measured as described above.

It will be appreciated that other voltage levels on the waveform can be defined as the 0% and 100% normalization points. For example, the negative peak $-V_P$ might be selected as the 0% level and the positive peak $+V_P$ selected as the 100% level. Or the voltage at $V_{S1}$ might be selected as the 0% level and the positive peak $+V_{P1}$ as the 100% level, etc.

Since the transition detector 464 can be programmed to detect either the first or second positive transition, or the first or second negative transition, time measurements can be made between any percent level on any transition and any other percent level on any other transition within the count capabilities of the transition detector. Further, since the sampling system may be connected to sample the waveform at any one lead during major scan I and any other waveform during major scan II, time measurements may be made between any identifiable transition point on a waveform occurring at one lead and any identifiable transition point on another waveform occurring at any other lead. For example, if the waveform 314 is an input waveform at one lead, and the waveform 315 is the waveform at a complementary output lead, the delay time between a percent transition point on waveform 314 and the corresponding percent transition point, or any other detectable point, on the waveform 315 can be measured. It is to be understood that the above enumerated measurements are merely exemplary. It will occur to to those skilled in the art that many other measurements can be made using the basic capabilities of the system.

The test station memory 524 stores program information for major scan I and major scan II and program information for controlling the D.C. bias supply and static measurement relays $L_nK_n$. This information is gated through a test station interface 526 to the test station relay drivers 150 by the major scan I signal (MS–I) and the major scan signal (MS–II) from the dynamic sequence timetable. The ground probe signal represented by the control line 528 from the dynamic sequence interface 474 is also fed to the test station interface to open relays $L_nR_1$ and close relays $L_nR_2$ and $L_nR_3$ when the sampling system is being operated in the reference mode.

Memories $M_1$–$M_{10}$ store program information concerning whether the respective D.C. bias supplies #1–#10 are to operate as voltage or current supplies, the magnitude and polarity, and the time at which the respective supplies are to be activated. Pulse generator memories 243 and 244 are programmed with information concerning the time of activation, rise time, fall time, amplitude, pulse width, etc. The test start memory 296 is programmed with information concerning the time at which the test start signal 608 occurs and the delay period for the delay test timer 255. The measurement, type and range memory 294 is programmed with information concerning whether a static or dynamic measurement is to be made, and whether a voltage, current, amplitude or time measurement is to be made, and the range. This program information is fed to the static test control 292 by cable 293, and to the fast ramp generator, the dynamic sequence timetable and the range and type decoder 516 by cable 519. The digital sync memory and interface 311 is programmed with information concerning the period of the reset clock, the period of the variable clock, the delay period of the delay clock, and the time position of the sample clock.

Normalization I memory 476 stores program information for controlling the operation of the sampling system during the normalization I periods of both major scan I and major can II. Normalization II memory 478 stores program information concerning the operation of the sampling system during normalization II periods of both major scan I and major scan II. A percent DAC and transition detector memory 480 has major scan I and major scan II sections. Gate logic circuit 482 gates out either the major scan I information or the major scan II information from the normalization I memory 476 in response to major scan I signal MS–I and major scan II signal MS–II from the dynamic sequence timetable. It will be recalled from FIG. 9 that when the major scan signal MS–I is up and major scan signal MS–II is down, major scan I period is indicated. Thus during major scan I, the information for normalization period I of major scan I is gated out through cable 483 to the staircase control 362 and through cable 484 to the dynamic sequence timetable 470 and to the dynamic sequence interface 474. Similarly, gate logic circuit 485 alternatively gates out either the normalization II program information for major scan I or major scan II in response to the major scan signal MS–I and major scan signal MS–II received from the dynamic sequence timetable. This information is applied through cable 486 to the staircase control 362 and through cable 487 to the dynamic sequence timetable 470 and to the dynamic sequence interface 474. Since the normalization I and normalization II program information for major scan I is simultaneously gated to the staircase control, the staircase control selectively gates either normalization I program information or normalization II program information to the staircase ladder network in response to the signals 632 and 634 (see FIG. 11) on lines N–I and N–II, respectively. The same procedure occurs during major scan II. A line designated by the reference character C feeds a signal to the staircase control 362 from the dynamic sequence interface 474 to cause the staircase latter network to be connected to the staircase counter and operate in the count mode. Lines $C_{20}$ and $C_{80}$ sense when the staircase count reaches the counts of twenty and eighty and this information is used by the dynamic sequence timetable to terminate the normalization periods I and II and the normalization period for the sampling system as previously described and reset the staircase counter by the reset line 475. The dynamic sequence timetable 470 and the dynamic sequence interface 474 also contain gate logic necessary to sequentially employ the normalization I and normalization II program information that is fed simultaneously through the cables 484 and 487 during each of the major scans. In particular, the dynamic sequence interface 474 gates the normalization I and normalization II information to the switches 435, 436, 444 and 446 through the cable 488.

The slope of the fast ramp from the fast ramp generator 322 may be selectively varied during the normalization periods I and II and the scan periods of both major scan I and major scan II. This permits the range to be expanded (i.e., the slope of the ramp decreased to increase the field of view) so that either or both of the voltage memories M–I and M–II may be normalized at a more stable point on the waveform remote from the points to be measured. For example, if a rise time between two percent levels is being measured, the 100% normalization point can be picked at a delayed point on the waveform which is more stable by increasing the field of view, and then, by again decreasing the field of view for the actual measurement, the resolution may be maximized by the narrowed field of view. The range information for the four normalization periods is stored in the normalization I and normalization II memories 476 and 478 and gated out by gate logic circuits 482 and 485 through cable 477 to the measurement type and range memory 294 during the appropriate period. The appropriate period is determined by the logic levels on the control lines MS–I, MS–II, N–I and N–II going to each of the gate logic circuits 482 and 485, as heretofore described. The information is then passed through cable 519 to the ramp generator 322.

Gate logic circuit 490 similarly gates through major scan I or major scan II information in response to the application of the major scan signals MS–I and MS–II. This information is fed through cable 493 to a percent DAC interface 494 which controls the operation of the percent DAC 456. The normalization I and normalization II signals N–I and N–II, respectively, are also applied to the percent DAC interface 494. The normalization I signal automatically switches the percent DAC to 0.0% and the normalization II signal automatically switches the percent DAC to 100%. The absence of either signal switches the percent DAC to the programmed percent. Gate logic 490 also gates out the transition detection program information for either major scan I or major scan II and this is applied to the transition detector 464 by control cable 496. Since the transition detector 464 is operative only during the interlace scan period, program information is required only for major scan I and major scan II. However, the program information to the transition detector permits the selective detection of the first or second positive or the first or second negative transitions during either major scan period to permit comparative time measurements between any two of these four transitions.

DATA READOUT

A data counter memory 500 stores program information regarding the operation of the data counter 286 and this information is fed to the data counter control 284 which in turn controls the data counter 286. The output from the data counter 286 is applied to a pair of digital comparators 502 and 504 which are programmed from minimum limit memory 506 and maximum limit memory 507, respectively, to determine whether the data count is less than, greater than or equal to the programmed minimum, or less than, greater than or equal to the programmed maximum. The output from each of the digital comparators 502 and 504 is applied to a display unit 508 and to a classification unit 509 as represented by the data lines 510 and 512, respectively. The data count from the counter 286 is also applied to a binary-to-decimal decoder 514 which decodes the data count to decimals, and the decimal information is fed to the display unit 508.

The display unit 508 displays basic measurement data such as the count, the type of measurement, and the range of measurement. The type and range information is received from the range and type decoder 516. The range and type decoder receives information from the measurement type and range memory 294 by cable 519 and from the static test control 292 by control cable 520. The range and type decoder supplies information not only to the display unit 508, but also to both digital comparators 502 and 504 and to a recorder interface 522 as illustrated. The recorder interface 522 also receives data from the display unit and converts this data together with the range and type information into a form such that it can be recorded on punched tape, punched card, magnetic tape, or other suitable means.

The logic diagram for the data counter 286 is shown in FIG. 22. The data counter is comprised of J-K flip-flop binary stages $U^0$, $U^1$, $U^2$ and $U^3$ which form a units decade, $T^0$, $T^1$, $T^2$ and $T^3$ which form a tens decade, $H^0$, $H^1$, $H^2$ and $H^3$ which form a hundreds decade, and $Th^0$ and $Th^1$ which form a thousands decade having only a three count capability. These binary stages count in a 1:2:4:8 code and provide a total count capability of 3,999. The state of binary stages $U^0$–$U^3$, which are representative of each decade, when counting in the forward direction, is illustrated in FIG. 23, and FIG. 24 illustrates the state of these binaries when counting in the reverse direction. The clock pulses being counted, either the pulses from the low speed clock pulse generator 382 or from the pulse shaper 278 at the output of the voltage-to-frequency converter, are applied through clock line 1404 and passed through an inverting NAND gate and parallel inverters to provide the necessary fan-out power to a clock bus C1. Similarly, a reset signal is applied through line 1406 and an inverting NAND gate and re-inverter to a reset bus R. Both the clock bus C1 and reset bus R are connected to each of the fourteen binaries of the data counter.

The count forward control comes in on line 1400 and is in negative or complement logic as indicated by the $\bar{F}$ symbol. Thus when not counting in the forward direction, line 1400 will be at a logic "1" level, and when counting in the forward direction, line 1400 will be at logic "0" level. The count forward control ine 1400 is connectedly directly to both the J* and K* inputs of binary $U^0$. The count in reverse control ine 1402 is true logic. Thus when counting in reverse, line 1402 is at a logic "1" level and when not counting in reverse, line 1402 is at a logic "0" level. The reverse control line 1402 is connected to both the J and K inputs of binary stage $U^0$. It will be recalled that the J–K flip-flop has the characteristic of being complemented from either the "1" state to the "0" state or from the "0" state to the "1" state when the inputs from control line 1400 and line 1402 are of the same logic level, and not being complemented when line 1400 is a logic "1" level and line 1402 is a logic "0" level. Thus when counting forward, line 1400 is at a "0" logic level because negative logic is used on line 1400, and line 1402 is also at a "0" level because true logic is used on that line. Thus binary $U^0$ complements on every clock pulse. Similarly, when counting in reverse, input line 1402 is at a logic "1" level, and input line 1400 is also at a logic "1" level, again considering the negative logic. Thus binary stage $U^0$ complements on every clock pulse when counting in reverse. When neither counting in reverse nor counting forward, line 1400 will be at logic "1" level and line 1402 will be at a logic "0" level in which case binary $U^0$ does not complement on the clock pulses.

The control circuitry for counting in the forward direction is comprised of the five NAND gates $F_1$–$F_5$ for each decade of four binaries, and the reverse count control circuitry is comprised of NAND gates $R_1$–$R_4$ for each decade plus an inverter at the output of each NAND gate to form an AND gate. When not counting in either the forward or reverse direction, line 1400 is at a logic "1" level so that the output from gate $F_1$ is at a logic "0" level and this output disables NAND gates $F_2$–$F_5$ which then have a logic "1" output level so that all J* and all K* inputs to the binaries are at a logic "1" level. When not counting in the reverse direction, control line 1402 is at "0" logic level so that the output from the inverters at the output of NAND gates $R_1$–$R_4$ are also at "0" logic level so that the J and K inputs to all binaries are at "0" logic level. Thus the binaries do not complement but remain in the last state to which they were set. In order to complement any one of the binaries merely requires that the J* and K* inputs be changed from a logic "1" to a logic "0," or in the alternative, that the J and K inputs be changed from a logic "0" to a logic "1" level. Thus it will be appreciated that unless either the count forward or count in reverse lines are at logic "0" or logic "1" level, respectively, the counter is disabled.

The operation of the units decade $U^0$–$U^3$ when counting in the forward direction can best be understood by reference to FIG. 23 which shows a time line 1408 representing successive clock pulses coming in on line 1404, and time lines each representing the logic level of one of the binary stages $U^0$–$U^3$. The count after any clock pulse may be determined by summing the values assigned the binaries that are in the "1" state, the binaries $U^0$–$U^3$ representing $2^0$, $2^1$, $2^2$ and $2^3$, respectively, and thus numerical values of 1, 2, 4 and 8. A count of zero is indicated between the zero clock pulse and the one clock pulse and the one clock pulse, a count of one between the one and two clock pulses etc. It will be noted from FIG. 23 that on the zero count all binary stages $U^0$–$U^3$ are at "0" logic level. It will also be noted that binary $U^0$ complements on every clock pulse when counting forward. This is achieved by directly connecting the forward count line 1400 to the J*–K* inputs of $U^0$. All gates $F_1$–$F_5$ are disabled by a logic "1" on line 1400 and enabled by a logic "0" on line 1400. Assuming that line 1400 is at a logic "0" level, stage $U^1$ complements on the next clock pulse after $U^0$ is in the "1" state and $U^3$ is in the "0" state, by reason of gate $F_2$. Stage $U^2$ complements on the first clock pulse after binaries $U^0$ and $U^1$ are in the "1" state, by reason of gate $F_3$. Stage $U^3$ is set to a "1" level as a result of the operation of gate $F_4$ on the first clock pulse after $U^0$, $U^1$ and $U^2$ are all at logic "1" level, and goes to a "0" level on the first clock pulse after $U^0$ and $U^3$ are in the "1" state, by reason of gate $F_5$.

The output of gate $F_5$ is also connected to the J*–K* inputs of stage $T^0$ of the tens decade $T^0$–$T^3$ so that stage $T^0$ is complemented to a "1" level on the same clock pulse that stages $U^0$ and $U^3$ complement to a "0" state so that after ten counts in the units decade, the tens decade is incremented one count. The tens decade $T^0$–$T^3$ operates in the same manner as the units decade just described, except that stage $T^0$, as well as the other binary stages, can complement only once after each ten counts of the units decade. Gate $F_5$ of the tens decade enables binary stage $H^0$ of the hundreds decade $H^0$–$H^3$ on the same clock pulse that the tens decade goes back to a count of zero by the enable signal gated from the units decade after the count of nine. The hundreds decade then operates in the same manner as the tens decade through a ten count. After the hundreds decade reaches a count of nine, gate $F_5$ of the hundreds decade is enabled so that the enable signal from the units and tens decades can enable the thousands decade.

FIG. 24, which is similar to FIG. 23, illustrates the state of binary stages $U^0$–$U^3$ when the counter is counting in reverse. Gates $R_1$–$R_4$ for each of the first three decades and gate $R_1$ for the thousands decade control the reverse operation of the counter. The gates $R_1$–$R_4$ are enabled only when the reverse count control line 1402 is at a logic "1" level. The units binary stage $U^0$ again complements on every clock pulse since the reverse input line 1408 is connected to the J and K inputs of binary $U^0$. It will be noted that the logic "1" level of $U^0$ in FIG. 24 is between clock pulses numbers one and zero, as compared to between clock pulses one and two in FIG. 23 which represents the forward count. From FIG. 24, it will be noted that stage $U^3$ complements on the first clock pulse after $U^0$, $U^1$ and $U^2$ are in the "0" state as determined by the output of gate $R_3$. Binary stage $U^2$ complements on the first clock pulse after $U^0$ and $U^1$ are in the "0" state, except on the count of zero. This is accomplished by gate $R_2$ which is satisfied from the inverted output of gate $R_1$ and the complement output of stage $U^1$. The count of zero is derived from the output of gate $R_4$ through gate $R_1$. Stage $U^1$ is complemented on the first clock pulse after $U^0$ is in the "0" state except on a count of zero by the output of gate $R_1$. A count of zero is indicated by the output of gate $R_4$ being in the "1" state. It will be noted that gates $R_2$ and $R_4$ are not connected directly to line 1402, but do receive this logic information from gates $R_1$ and $R_3$. Thus before any stage can be complemented, the reverse line 1402 must be at a logic "1" level. This insures that the counter will always be stopped on the last count when the reverse count line 1402 goes to a "0" logic level.

The output of gate $R_4$ is inverted and applied to the J–K inputs of binary $T^0$ and to gates $R_1$ and $R_3$ of the tens decade to cause the tens decade to count in reverse in the same manner, but to only increment when the units decade goes from zero to nine. Gate $R_4$ of the tens decade is in turn connected to the J–K inputs of binary stage $H^0$ and to gates $R_1$ and $R_2$ of the hundreds decade so that the hundreds decade will be incremented one count in reverse each time that the tens decade is set from zero to nine. Similarly, gate $R_4$ of the hundreds decade is connected to the J–K inputs of binary stage $Th^0$ and to gate $R_1$ of the thousands decade to increment the thousands decade one count in reverse each time that the hundreds decade is set from zero to nine and the units decade is set from zero to nine.

The true and complement sides of all binary stages of the data counter are fed out to the digital comparators 502 and 504 and to the binary-to-decimal decoder 514, and these output lines are indicated collectively by the reference numeral 1410.

To summarize, it will be noted that the data counter 286 is turned off when the count forward line 1400 is a logic "1" level indicating no forward count, and reverse control line 1402 is at a logic "0" level indicating no reverse count because the J*–K* inputs will be at a logic "1" level and the J–K inputs will be at a logic "0" level. Then to count forward, line 1400 is changed to a logic "0" level so that when it is desired to complement a particular binary stage, this "0" logic level is merely gated to the J*–K* inputs of the binary stage. When counting in the reverse direction, line 1402 is raised to a logic "1" level. Then each binary may be complemented by gating this logic level through to the J and K inputs of the binary at the appropriate time. It is important to note that when either a forward or reverse count is terminated, all binary stages are instantly placed in the noncomplementing mode so that the number count on the counter will be preserved. The next count, usually in the opposite direction may then start from the previous number. The counter may also be preset to zero merely by pulsing the reset line 1406.

The data counter 286 is controlled by the data counter control 284 shown in detail in FIG. 28. As previously described, the data counter 286 is used for both static and dynamic measurements. When making a static measurement, the static input line 1500 is at a logic "1" level and the dynamic input line 1502 is at logic "0." When making a dynamic measurement, these logic levels are reversed. Thus when a dynamic measurement is being made, AND–OR gate 1504 gates through the low speed logic clock from line 1506, and when a static measurement is being made, gate 1504 gates the pulse train from line 1508, which is derived from the pulse shaper 278, through to line 1404. Line 1404 is the clock input line to the data counter so that either the low speed logic clock or the pulse train from the static measurement subsystem is continuously applied to the binary stages and gates of the data counter as heretofore described.

An important function of the data counter control 284 is to cause the counter to count in the direction necessary to accomplish the desired addition or subtraction and thereby produce differential measurements. This is accomplished by AND–OR gates 1512, 1514 and 1516. An AND–OR gate requires that all inputs to a particular input NAND gate, for example gate 1512a, be at a logic "1" level to produce a logic "1" level at the output 1512e. During dynamic measurements, major scan I line 1518 (MS–I) will be at logic "1" during major scan I and major scan II line 1520 (MS–II) will be at logic "0." and line MS–II at logic "1." Unless programmed to the contrary, the subtract program line SUB will be at a "0" logic level, and add program line ADD will be at a logic "1" level. During a dynamic test, gates 1512a and 1512b are enabled by the logic "1" level on dynamic test line 1502, and gates 1512c and 1512d are disabled by the logic "0" level on static test line 1500.

Then during major scan I, gate 1512a is disabled by the "0" level on line 1520 and gate 1512b is enabled by the logic "1" level on major scan I line 1518. However, since subtract program line SUB is at "0" logic level, the output from gate 1512e will be at "0" logic level during major scan I. The subtract control line 1526 is derived from the output of gate 1512e by an inverter 1528, so that subtract control line 1526 is at a logic "1" level, thus indicating the subtract mode. The add control line 1530 comes directly off the input of gate 1512e and is therefore at a "0" logic level. During major scan II, gate 1512b is disabled by the "0" logic level on line 1518 and gate 1512e is enabled by the "1" logic level on line 1520 so that the logic "1" level on add program line ADD is gated through to the output of gate 1512e, thereby changing the subtract control line 1526 to logic "0" and the add control line 1530 to a logic "1."

If addition is programmed during major scan I and subtraction is programmed during major scan II, subtract program line SUB will be at a logic "1" level and addition program line ADD will be at a logic "0" level. In this case it will be evident that add control line 1530 will be at "1" logic level during major scan I and subtract control line 1526 will be at "0" logic level, and that add control line 1530 will be at "0" logic level during major scan II and subtract control line 1526 will be at a logic "1" level, indicating addition during major scan I and subtraction during the major scan II.

A zero control line 1532 is at logic "1" level when the data counter is at a count of zero, and is at "0" logic level for all other counts. This logic is derived by NAND gate 1534 and the inverter 1536 from lines 1538 which extend from the binary-to-decimal decoder 514, and which are all at a logic "1" level when the data count is zero.

The algebraic sign of the data in the data counter at any time is determined by the state of the J-K flip-flop binary AS, the true output 1540 being representative of a positive value and the complement output 1542 being representative of a negative value. These lines extend to the digital comparators 502 and 504 which are hereafter described in greater detail to provide the necessary sign data information as will hereafter be described in greater detail.

The add control line 1530, subtract control line 1526, zero control line 1532, positive control line 1540 and negative control line 1542 are used to determine the direction in which the data counter 286 is operated at any point in time and also the state of the algebraic sign binary AS. First consider the operation of the binary AS. Binary AS complements whenever the line 1544 from the output of AND-OR gate 1514 goes to a logic "1" level and remains in the same state, i.e., does not complement, whenever line 1544 is at a logic "0" level because the J* and K* inputs are connected to a voltage supply $V_{cc}$ which provides a logic "1" level. The reset is connected to ground and thereby disabled. The only time that binary AS changes states is on the first clock pulse after the data counter has reached a count of zero. Thus the zero control line 1532 enables both gates 1514a and 1514b. It is necessary to change the sign of the data when the data count is zero, when the sign is positive, i.e., when line 1540 is at logic "1" level, and when the counter is subtracting. When these conditions are satisfied, gates 1514b and 1514c produce an output which complements binary AS. Binary AS is also complemented on the first clock pulse after a count of zero when the sign of the data is negative, that is line 1542 is at a logic "1" level, and the counter is adding. When these conditions are satisfied, gates 1514a and 1514c produce an output which complements binary AS. Thus when either of these conditions is satisfied, line 1544 goes to a logic "1" level and complements the sign binary AS to insure that the sign of the data identified by the count in the data counter will always be correct.

The data counter counts forward when the data count is zero, counts forward when the sign of the data is negative and the counter is subtracting, and counts forward when the data is positive and the counter is adding, and counts in reverse under the complement conditions. The AND-OR gate 1516 performs these logic functions, and the output of gate 1516c is the true forward signal.

Thus the positive line 1540 and the add control line 1530 form the inputs for gate 1516a, and the negative line 1542 and the subtract control line 1526 are the inputs to gate 1516b. The outputs of gates 1516a and 1516b are ORed with the inverted output from gate 1514 which is representative of the zero count condition, the other inputs to AND-OR gate 1514 being redundant to this logic requirement. The output of gate 1516 is applied to a NAND gate 1545 the output of which is line 1400 of the data counter. The output from gate 1545 is also connected to an input to gate 1546. Both gates 1545 and 1546 are enabled by a logic "1" level on line 1548 for purposes which will presently be described. Thus when gates 1545 and 1546 are enabled, the output of gate 1545 is at a logic "0" level when the counter is to count forward and is at a logic "1" level when the counter is not to count forward. The output of gate 1546 is connected through an inverter 1550 to the reverse count control line 1402 of the data counter, and therefore will be the complement to line 1400 when both are enabled. In summary, when the enable line 1548 is a logic "0" level, both gates 1545 and 1546 are disabled so that the not forward line 1400 is at a logic "1" level and the reverse line 1402 is at logic "0" level, in which condition the data counter is stopped. When the enable line 1548 is at a logic "1" level and the output from gate 1516 is at a logic "1" level indicating a forward count, not forward line 1400 is at a logic "0" level and reverse line 1402 is at a logic "0" level thus causing a forward count. On the other hand, when the output of gate 1516 is at a "0" logic level, indicating a not forward, i.e., reverse count, condition, and the enable line 1548 is at a logic "1" level, not forward control line 1400 will be at a logic "1" level and reverse control line 1402 will also be at a logic "1" level causing a reverse count.

During a static measurement, dynamic control line 1502 is at a logic "0" level thereby disabling gates 1512a and 1512b, and static control line 1500 is at a logic "1" level thereby enabling gates 1512c and 1512d. A positive line 1552 and a negative line 1554 are received from the static measurement subsystem 230 indicating the sign of the measurement made by that subsystem. This information, together with the add and subtract information from program lines ADD and SUB, is gated through gates 1512c and 1512d. Thus when addition is programmed and the voltage or current measured is positive, the output of gate 1512 is a logic "1," indicating addition to whatever value is stored in the data counter. On the other hand, if the negative line 1554 is at a logic "1" level and the positive line 1552 is at a logic "0," the output from gate 1512 will be logic "0," indicating that the negative value should be subtracted from that stored in the data counter.

When a test start signal is received from the delay test timer 255 on line 1560, binary $S_4$ is set from a "0" state to a "1" state on the next low speed clock pulse which comes in on line 1562. Binary $S_4$ is set to the logic "0" state when line 1560 is at "0" logic level. Binary $S_5$ is normally set at a logic "0" level because the complement output of binary $S_4$ is connected to input J of binary $S_5$ and the true output of $S_4$ is connected to input K. Thus on the next clock pulse after binary $S_4$ changes to logic "1" state, binary $S_5$ changes to a logic "1" state. The purpose of binaries $S_4$ and $S_5$ is to generate a reset pulse for the data counter prior to the start of a test. The true output of binary $S_4$ is connected to gates 1564, 1566 and 1568, and the complement output of binary $S_5$ is also connected to an input of each of these three gates. Gate 1564 always produces a negative going pulse having a period equal to the period between successive low speed clock pulses on line 1562 because the output of gate 1564 goes to "0" logic level when $S_4$ changes to a logic "1" state, and goes back to a logic "1" level when $S_5$ changes to logic "1" state. This negative pulse is converted to a positive pulse by gate 1569 and this pulse resets binaries $S_6$, $S_7$, $S_8$ and DR to the "0" state which will presently be described in connection with static measurements. Also, if the data counter is to be preset before each test, preset program line 1567 will be at logic "1" level, and gate 1566 will produce a negative reset pulse which is inverted by gate 1570 to a positive pulse which is applied to reset line 1406 of the data counter and the data counter preset to zero. Similarly, if autoranging is programmed during a static test, program line 1571 will be at logic "1" so that a negative pulse will be produced by gate 1568 which is also converted to a positive pulse on the reset line 1406 by gate 1570 to preset the data counter to zero. The data counter may also be manually preset to zero by bringing line 1572 up to a logic "1." This logic level is inverted by gate 1574 and applied to the output of gate 1570 which then goes to a logic "1" level. The output of inverter gate 1574 is also applied to gate 1569 so that binaries $S_6$, $S_7$, $S_8$ and DR will be preset to "0" state. Thus it will be noted that for a dynamic test, the data counter may or may not be preset to zero, depending on whether averaging is to be obtained as hereafter described. Binaries $S_6$, $S_7$, $S_8$ and DR are always preset to "0" state at the beginning of a test. When a static measurement is being made and automatic ranging is programmed, the data counter is always preset to zero.

The true output of binary $S_5$ is connected by a test enable line 1580 to the input gates 1582$a$ and 1582$b$ or an AND–OR gate 1582. Gate 1582$a$ is enabled during a dynamic test, and gate 1582$b$ is enabled during a static test by lines 1502 and 1500, respectively. The output of gate 1582$a$ therefore goes to a logic "1" level during a dynamic measurement when count data line 1583 from the dynamic sequence timetable 470 goes to a logic "1," and goes to a logic "1" level during a static measurement when line 1585 from binary $S_8$ of the 2 millisecond gate pulse generator, which will hereafter be described, goes to a logic "1" level. The output from gate 1582$c$ goes to a divide-by-one control gate 1584, to gate 1586 and to control gates $a$, $b$, $c$ and $d$ of a ring counter 1599 having binaries $D_2$–$D_5$ which provides a division capability as will presently be described.

The ring counter 1599 is comprised of binaries $D_2$–$D_5$ and control gates $a$–$g$ and has the capability to count up to five successive clock pulses. On the first clock pulse, binary $D_2$ switches from "0" state to "1" state. On the second clock pulse, binary $D_2$ switches to "0" state and binary $D_3$ switches to "1" state. On the third pulse, binary $D_3$ switches to "0" state and binary $D_4$ switches to "1" state. On the fourth clock pulse, binary $D_4$ switches to "0" state and binary $D_5$ switches to the "1" state, and on the fifth pulse, binary $D_5$ switches to the "0" state. This is accomplished by reason of the fact that binaries $D_2$–$D_5$ are each controlled by the J* and K* inputs because the J and K inputs, and the reset inputs, are all connected to a logic "0" source, i.e., ground. Thus when the J* and K* inputs are at logic "0," the binaries complement. When inputs J* and K* are at a logic "1," the binaries do not complement. The complement output of binary $D_2$, when $D_2$ is in the "0" state, causes the output of gate 1600 to be a logic "1" and the output of gate $d$ to be a logic "0," thereby always complementing binary $D_2$ back to the "0" state on the first clock pulse after going to the "1" state. The complement outputs of binaries $D_2$ and $D_3$ are connected through gate $e$ and gate $a$ to the J* and K* inputs of binary $D_3$. Thus when either binary $D_2$ or $D_3$ is in the "1" state, the J* and K* inputs are at "0" logic level so that binary $D_3$ complements. If both binaries $D_2$ and $D_3$ are in the "0" state, binary $D_3$ does not complement. Or if the output of gate 1582$c$ is at "0" logic level, gate $a$ is disabled so that binary $D_3$ does not complement. Binary $D_4$ is similarly controlled from the complement outputs of binaries $D_3$ and $D_4$ through gates $f$ and $b$, and binary $D_5$ from the complement outputs of binaries $D_4$ and $D_5$ through gates $g$ and $c$. It is important to note that all binaries are inhibited from complementing if the count data line goes to logic "0" level and the output of gate 1582$c$ goes to logic "0." This stops the ring counter at whatever count it is on when the count data signal goes down and thus preserves any remainder to be added to the next measurement to obtain a more accurate average, as will present become more evident.

A set of division program lines indicated collectively by the reference numeral 1587 enable one, and only one, of gates 1584, 1588, 1590, 1592 and 1594. When gate 1584 is enabled by the program lines, the output of gate 1582 goes to a logic "1," line 1596 goes to a logic "0" and the output of gate 1598 goes to a logic "1" thus enabling gates 1545 and 1546 so that the data counter will be instructed to count in either the forward or reverse directions depending upon the output of gate 1516. The data counter is continuously enabled so long as the count data line 1583 is at logic "1" and every clock pulse on line 1404 is counted. When a divide by two, three, four or five is programmed on lines 1587, the data counter is enabled only on every second, third, fourth or fifth clock pulse by changing the output of gate 1598 to a logic "1" level for one clock pulse period by operation of the ring counter 1599 as will now be described.

When a divide by two is programmed, the output from gate 1588 is logic "0" so that a logic "1" is applied to gate 1602 by reason of the inverter. Assuming that binary $D_2$ is in the "0" state, the feedback to the other input of gate 1602 is also at a logic "1" level. As a result, the output of gate 1602 is a logic "0" which is applied to one input of gate 1600. The other four inputs to gate 1600 are at a logic "1" level because at least one input to each of the gates 1603, 1604 and 1605 is at a "0" level. As a result of one input to gate 1600 being at "0" logic level, the output of gate 1600 is at a logic "1" level and the output of control gate $d$ is at a "0" logic level. Therefore on the first clock pulse, binary $D_2$ complements to a "1" state. The feedback from the complement output of binary $D_2$ goes to a logic "0" which changes the output of gate 1602 to a logic "1." However, binary $D_2$ is always complemented back to "0" state on the next clock pulse because the complement output is also connected to another input to gate 1600, and this input is now at logic "0" so that the output of gate 1600 remains at a logic "1" level and the output of gate $d$ remains at a logic "0" level, thus complementing binary $D_2$ back to the "0" state. However, since the logic "1" at the complement output of binary $D_2$ is again fed back to an input of gate 1602, the output of gates 1600 and $d$ remains unchanged so that binary $D_2$ complements on every clock pulse.

When binary $D_2$ is in the "1" state, gate 1586 has a logic "0" output and gate 1598 has a logic "1" output, thus, enabling gates 1545 and 1546 so that the data counter will increment, either forward or backward, on the next clock pulse, i.e., on the clock pulse that binary $D_2$ complements back to the "0" state, disabling gates 1586, 1598, 1545 and 1546. Therefore the data counter counts every other clock pulse to provide a division by two.

The complement output of binary $D_2$ is connected to an input of gates 1602, 1603, 1604 and 1605, while the complement output of binary $D_3$ is connected only to an input of gates 1603, 1604 and 1605, and the complement output of binary $D_4$ is connected only to an input of gates 1604 and 1605, and the complement output of binary $D_5$ is connected only to an input of gate 1605. These connections are used to selectively reset the ring counter after the second, third, fourth or fifth clock pulses to provide a divide by three, four or five capability. For example, assume that a divide by three has been programmed. The output from gate 1584 is at a logic "1" due to one or more of the program lines being at a logic "0" level, thus enabling gate 1598. The outputs from gates 1588, 1592 and 1594 are also at a logic "1" level due to "0" logic levels on one or more of the program input lines to these gates, but this output is inverted so that a logic "0" level is applied to the program inputs of gates 1602, 1604 and 1605. Thus the outputs of gates 1602, 1604 and 1605 must always be at a logic "1" level. The output of gate 1590 is at a logic "0" level because a divide by three has been programmed by bringing all input lines to gate 1590 up to a logic "1" level. This logic "0" output is inverted and applied as a logic "1" to the program input of gate 1603. Assume now that binaries $D_2$–$D_5$ are all in the "0" state. As a result, all inputs to gate 1603 are at a logic "1" state and the output of gate 1603 is a logic "0," the output of gate 1600 is a logic "1" and the output of gate $d$ is a logic "0" so that binary $D_2$ complements. After binary $D_2$ has complemented, the complement output of $D_2$ goes to a logic "0" level thereby changing the output of gate 1603 back to a logic "1" level. However, the output of gate 1600 is maintained at a logic "1" level as a result of the feedback from the complement output of binary $D_2$ and binary $D_2$ complements back to "0" state on the next clock pulse. As binary $D_2$ complements back to the "0" state, binary $D_3$ complements to the "1" state by the operation of gates $e$ and $a$ as heretofore described. Thus although the complement output of binary $D_2$ has returned to the logic "1," the output of gate 1603 remains at a logic "1" level because the feedback from the complement output of binary $D_3$ is now at a "0" level. Also, the feedback from the complement output of binary $D_2$ has returned to a "1" level, so that the output of gate 1600 returns to a "0" level and the output of gate $d$ returns to a "1" level so that binary $D_2$ does not again complement. Binary $D_3$ then complements back to "0" state on the third clock pulse as a result of gates $e$ and $a$. Then all three inputs to gate 1603 are again at a logic "1" level so that its output is a logic "0," the output of gate 1600 is a logic "1" and the output of gate $d$ is a logic "0." Therefore binary $D_2$ once again complements to repeat the cycle. Thus it will be noted that binary $D_2$ complements on every third clock pulse and that either the forward or reverse signal to the data counter is gated through to the data counter during every third clock pulse by the operation of gates 1586 and 1598 and either gate 1545 or gate 1546. It will also be noted that binaries $D_4$ and $D_5$ complement to the "1" state on successive clock pulses but this is of no consequence when dividing by three. To divide by four, the program inputs to gate 1592 are at a logic "1" level. Then when binaries $D_2$, $D_3$ and $D_4$ are all in the "0" state, the output of gate 1604 will go to "0" level and binary $D_2$ will be reset on every fourth clock pulse. Similarly, when the output of gate 1594 is logic "0," binary $D_2$ will be reset to the "1" state on every fifth clock pulse.

From the preceding description, it will be noted that the data counter may be operated so as to add or subtract during either major scan I or major scan II. Further, if the data counter is not reset between successive tests, the ring counter 1599 may be used to divide the total counts from a number of successive tests, either static or dynamic, to provide a direct indication of the average of the successive tests. For example, if the data counter is reset to zero and then four successive tests run without resetting the counter while dividing by four with the ring counter, the final count on the data counter will be a direct reading of the average value of the four tests.

When making a static test, the sample clock of the digital synchronization system 300 is programmed at 1,000 counts per second in order to provide a precise 2 millisecond count period during which the pulses from the pulse shaper 278 are counted as will now be described. After a test start signal on line 1560, binaries $S_4$ and $S_5$ generate a data counter preset pulse from either gate 1566 if a preset is programmed on line 1567, or gate 1568 if autorange is programmed on line 1571 and the preset pulse passed through gate 1570 to the data counter as heretofore described. A preset pulse is also generated by gate 1564 which presets binaries $S_6$, $S_7$, $S_8$ and DR to the "0" state.

Binaries $S_6$, $S_7$ and $S_8$ will remain in the preset state because binary $S_1$ is set to logic "0" when line 1620 from the static measuring system 230 is at a "0" logic level. The J* and K* inputs of binary $S_6$ are connected to a logic "1" level voltage source, and the J and K inputs of binary $S_7$ are connected to a logic "0" level, i.e., ground. The true output of binary $S_6$ and the complement output of binary $S_7$ are connected to the inputs of a gate 1622. The output of gate 1622 and the true output of binary $S_1$ are connected to the inputs of gate 1624. The output of gate 1624 is connected through an inverter 1626 to the J and K inputs of binary $S_6$ and to one input of gate 1628. The complement output of binary $S_6$ is connected to the other input of gate 1628, and the output of gate 1628 is connected to the J* and K* inputs of binary $S_7$. Thus when binaries $S_1$, $S_6$ and $S_7$ are all in the "0" state, the output of gate 1622 is a logic "1," the output of gate 1624 is a logic "1," and the output of inverter 1626 is a logis "0." Thus inputs J and K of binary $S_6$ are at logic "0" and binary $S_6$ will not complement on the clock pulses. Since both inputs to gate 1628 are at logic "0" level, the output is at logic "1" so that binary $S_7$ will not complement.

The true output of binary $S_7$ is connected to the J* and K inputs of binary $S_8$ so that the logic "0" level steers binary $S_8$ to a "0" state. As a result, gate 1582$b$ is disabled and the output from gate 1582$c$ is at a logic "0" level so that the data counter is disabled.

When line 1620 goes to a logic "1" state, indicating that the frequency from the voltage-to-frequency converter 274 is representative of the voltage or current to be measured, binary $S_1$ goes to a logic "1" level on the first low speed clock pulse on line 1562. On the second low speed clock pulse, both binaries $S_6$ and $S_7$ are complemented to the logic "1" level because the output of gate 1624 has gone to a logic "0," the output of inverter 1626 has gone to logic "1" to complement binary $S_6$, and the output of gate 1628 has gone to logic "0" to complement binary $S_7$.

On the third clock pulse, binary $S_8$ switches to a "1" state as a result of the logic "1" at the true output of binary $S_7$. It will be noted that binary $S_8$ is operated by the clock pulse from the pulse shaper 278 which is derived from the voltage-to-frequency converter of the static measuring subsystem through gate 1504. Thus on the first clock pulse derived from the voltage-to-frequency converter after binary $S_7$ has changed to a logic "1" state, the data counter is enabled through gate 1582 to commence counting the pulses derived from the voltage-to-frequency converter. Thus the function of binary $S_8$ is to synchronize the count enable signal from gate 1582 with the pulses from the voltage-to-frequency converter to insure proper operation of the data counter which is also clocked by the pulses from the voltage-to-frequency converter.

Also on the third low speed logic clock to line 1562, binary $S_6$ complements back to a "0" state because after the preceding clock pulse, the output from gate 1622 will still be a logic "1" and the output from inverter 1626 will still be a logic "1." However, binary $S_7$ does not complement because the output of gate 1628 reverted to a logic "1" level when binary $S_6$ complemented. On the fourth clock pulse, the output of gate 1628 again goes to a logic "1" level and binary $S_7$ complements back to the "0" state. Synchronizing binary $S_8$ then reverts to a "0" state on the next clock pulse from the voltage-to-frequency converter to stop the data count. Thus the period during which binary $S_8$ is in the "1" state and the data counter is counting is two low speed clock pulses, and is therefore 2 milliseconds.

It should be noted that binary $S_6$ also complements back to the logic "1" state on the fourth clock pulse because when binary $S_7$ is in the "1" state and binary $S_6$ is in the "0" state, the output of gate 1622 is still logic "1." After the fourth clock pulse when binary $S_7$ goes to the "0" state and binary $S_6$ goes to the "1" state, the output of gate 1622 goes to logic "0" level thus insuring that neither binary $S_6$ nor $S_7$ can again complement and thereby insuring that a second gate pulse is not transmitted to binary $S_8$ until binaries $S_6$ and $S_7$ have again both been reset to "0" state.

When line 1620 went to a logic "1" level, binary $S_1$ went to the "1" state on the next clock pulse, binary $S_2$ went to the "1" state on the second clock pulse, and binary $S_3$ went to "1" state on the third clock pulse. However, the output of gate 1652 never went to logic "0" because either the complement output of binary $S_2$ or the true output of binary $S_3$ is always at "0" logic level. When line 1620 goes to "0" logic level after 5 milliseconds, however, binary $S_1$ goes back to "0" state on the first clock pulse thereafter and binary $S_2$ goes back to the "0" state on the second clock pulse. Therefore, unless line 1650 has gone to a logic "1" level to indicate that the test is complete within two milliseconds after line 1620 goes to "0" level, the output of gate 1652 will go to logic "0" causing gate 1569 to reset binaries $S_6$, $S_7$, $S_8$ and DR and gate 1570 to preset the data counter to zero. If the down range binary DR has not complemented prior to the time that line 1620 goes to "0" level after 5 milliseconds, no test complete signal will be produced on line 1650 and the static measuring subsystem will automatically down range, provided automatic ranging has been programmed. The down range binary DR is controlled by the output from gate 1654 which derives inputs from both the data counter 286 and the binary-to-decimal decoder 514 on lines 1656, 1657 and 1658. Unless the data counter reaches a count of one hundred ninety-nine, which is arbitrarily selected as 20% of an arbitrarily selected full range, one or more of these lines will remain at a logic "0" level and the output of gate 1654 will remain at a logic "1" level so that binary DR will not complement. However, as soon as all of lines 1656–1658 go to a logic "1" level, indicating that the count of one hundred ninety-nine has been reached, the output of gate 1654 will go to a logic "0" level and the down range binary DR will complement, thus instructing the static measuring subsystem 230 that the proper range is being used. The static measuring subsystem 230 also receives a signal from the data counter 286 indicating when a count corresponding to 200% of full range has been reached, which in the present case is a count of one thousand nine hundred ninety-nine, and automatically up-ranges one range after having down ranged.

In the event the counter reaches a count of 3,999, all inputs 1680 from the binary-to-decimal decoder go to a logic "1" level so that the output of gate 1682 goes to a logic "0." This disables the gate 1582 and thereby disables the data counter until such time as the data counter is reset.

DIGITAL COMPARATOR

Each of the digital comparators 502 and 504 is comprised of the logic circuit shown in FIG. 29. The digital comparator is comprised of five decades #1, #2, #3, #4 and #5. Each decade has four comparator bits and each bit is comprised of a pair of NAND gates A and A', B and B', C and C', and D and D'. At each bit a binary data number is compared with a binary limit number. For example, at bit AA' of decade #1, a true data line D goes to gate A and a complement data line $\overline{D}$ goes to gate A'. A true limit line L also goes to gate A' and a complement limit line $\overline{L}$ goes to gate A. The logic of the comparator is such that the greatest order bit is considered first, and if this bit reaches either a "less than" or a "greater than" decision, a final decision is made. If the data number and logic number are equal at the greatest order bit, then the next order bit is considered, etc. In each decade, the AA' bit is the first order bit, the BB' bit is the second order bit, the CC' bit is the third order bit, and the DD' bit is the last order bit. Similarly, decade #1 is the first order decade and decade #5 is the last order decade.

It is to be understood that the comparator may be used to compare any information which may be expressed in a binary code in which the bits may be assigned an order. In the present application the sign is the greatest order bit and therefore the sign of the data is compared with the sign of the limit in bit AA' of decade #1, with positive being assigned the greater value. The system has a sufficient number of different ranges as to require five binary bits. The ranges are numbered in reverse order such that a particular number in the first range is the greatest and the corresponding number in each successively numbered range is less. Thus bit BB' of decade #1 is designated as the $R^0$ bit, bit CC' is the $R^1$ bit, and DD' is the $R^2$ bit. Bit AA' of decade #2 is the $R^3$ bit and bit BB' is the $R^4$ bit. The range data information is supplied by the range and type decoder. Then bit CC' of decade #2 is the $Th^0$ bit and the true data line D is the true output of binary $TH^0$ of the data counter and the complement data line $\overline{D}$ is the complement output of binary $TH^0$. Similarly, the true and complement outputs of binary $TH^1$ of the data counter are connected to the inputs of gates D and D', respectively. In the third decade, bit AA', although not illustrated, is connected to binary $H^3$ of the hundreds decade, bit BB' to binary $H^2$, bit CC' to binary $H^1$ and bit DD' to binary $H^0$. Similarly, the four bits of decade #4 are connected to the corresponding binaries of the tens decade of the data counter, and the bits of decade #5 are connected to the corresponding binaries of the units decade of the data counter. All limit data comes from the minimum and maximum memories 506 and 507.

The truth table for each bit is shown in FIG. 30, a bit AA' being illustrated. It will be noted from the table that when the data number is equal to the limit number, a logic "1" and a logic "0" will be applied to each of gates A and A', so that the output of each gate will be a logic "1." If the data number is greater than the limit number, both inputs to gate A will be logic "1" and both inputs to gate A' will be logic "0." Conversely, if the data number is less than the limit number, both inputs to gate A will be logic "0" and both inputs to gate A' will be logic "1." Thus when the data number is equal to the limit number, either when both are logic "1" or both are logic "0," the outputs of gates A and A' are both at logic "1." When the data number is logic "1" and the limit number is logic "0," i.e., when the data number is greater than the limit number, the output of gate A is logic "0" and the output of gate A' is logic "1." When the data number is logic "0" and the limit number is logic "1," i.e., when the data is less than the limit number, the output of gate A is a logic "1" and the output of gate A' is a logic "0." Thus it will be noted that the output from gate A' is a logic "0" only when the data number is less than the limit number, and conversely, that the output of gate A is at "0" logic level only when the data number is greater than the limit number at that bit. Thus a "greater than," "less than" or "equal to" decision can be reached at each bit position. The digital comparator first compares the data number at the highest order bit. If either a "greater than" or "less than" decision is reached, the decision is of necessity valid for the entire data number and all subsequent bits of all subsequent decades are disabled and not considered. If an "equal to" decision is reached at the highest order bit, the next order bit is considered and the process repeated. If all bits of a decade are equal, then the highest order bit in the next lower order decade is enabled and the procedure repeated.

Now referring to bit AA' of decade #1, assume that the data number is less than the limit number so that the output of gate A' is a logic "0." NAND gate $e$ then can only have an output of logic "1," thus indicating that the data number, at the highest order bit AA' of decade

1, is less than the limit number, and hence that the entire data number applied to all of the bits of all of the decades is less than the limit number. Thus when the output of gate e is a logic "1," the entire data number must be less than the entire limit number as will hereafter be further described.

The output of gate e is fed through gate f, which acts merely as an inverter, to the input of gate g. The output of gate g can then only be a logic "1" level regardless of the other inputs from gates A, B, C and D, so that the outputs from these gates are disregarded and gate g is in effect disabled. The output from gate g is inverted by gate h, inverted again by gate i and inverted again by gate j, so that the output of gate j will be at a logic "0." Thus when the data number is less than the limit number at bit AA' so that the output of gate e goes to a logic "1" level, the output of gate j will then be at a logic "0" level. This causes the output of gate k to go to a logic "1" which is applied to gate $l_1$. Also, the logic "0" output from gate j causes the output of gate i of decade #2 to go to a logic "1" which is inverted by gate j to a logic "0" which in turn causes gate k of decade #2 to go to a logic "1." The logic "1" on the "less than" line at the output of gate e of decade #1 is then inverted and applied together with the outputs of gate k from decades #1 and #2 to the input of gate $l_1$, so that the output of gate $l_1$ is a logic "1," the output of gate $l_3$ is a logic "0" and the output of gate $l_5$ is a logic "1," thus indicating a "less than" decision. This logic "1" is gated through gate o and through gate p, the other outputs of which are at a logic "1" level for reasons which will presently be described, so that the "less than" output line 1800 will be at a logic "1" level to indicate that the data number is less than the limit number. The output from gate p is inverted and applied to gate q so that the output of gate q is also at a logic "1" level, which is inverted to a logic "0" level on the "greater than" output line 1802.

If on the other hand, the data number is greater than the limit number, the output of gate A' will be a logic "1" and the output of gate A will be a logic "0" which causes the output of gate g to go to a logic "1" level regardless of the outputs of gates B, C and D, and the logic "0" at the output of gate g results in a logic "0" level at the output of gate j. Thus the output of gate j is a logic "0" when the data number is less than the limit number due to the feedback through gate f, and is logic "0" if the data number is greater than the limit number due to the output of gate A. When the output of gate A is a logic "0," indicating that the data number is greater than the limit number, gates B' C' and D' are disabled by the "0" output from gate A so that the output of gate e will be disabled and cannot be logic "1" and therfore cannot indicate a "less than" decision even if a "less than" condition is present at a lower order bit.

Assume now that the data number is equal to the limit number such that the output from both gates A and A' will be at a logic "1" level. Neither the output of gate e nor of gate g will be affected by the equals decision at bit AA'. Since the output from gate A is a logic "1," gate B' is enabled.

The data number and the limit number are then compared at bit BB'. If the data number is "less than" or "greater than" the limit number, a decision is reached in the same manner heretofore described with regard to bit AA' and the output of gate j is a logic "0" and the output of gate e is either a logic "1" if a "less than" decision is reached, or a logic "0" if a "greater than" decision is reached. If bit BB' reaches an "equals" decision, then bit CC' is enabled by the logic "1" output of gates A and B and the data number at bit CC' compared with the limit number. Again, if the data number is "greater than" or "less than" the limit number at bit CC', a decision is reached. If not, the logic "1" output of gates A, B and C enable gate D' which may make either the "less than" or "greater than" decision which will be conclusive.

If all four bits AA' through DD' are equal, then the output of gate e will be a logic "0" and the output of gate j will be a logic "1" as a result of the logic "0" at the output of gate g. Thus it will be noted that a "less than," "equal to" or "greater than" decision is made in decade #1, the "less than" decision being a logic "1" at the output of gate e, and "equal to" decision being a logic "1" at the output of gate j, and a "greater than" decision being a logic "0" output at gates e and j.

The method in which a "less than" decision by decade #1 is gated out on line 1800 has been described. When a "greater than" decision is reached in decade #1, the outputs of both gates e and j are a logic "0." A logic "1" is then applied by inverter gate 1804 to an output of gate $l_1$. The logic "0" output of gate j causes gate k of decade #1 to be a logic "1" which is also applied to an input of gate $l_1$. The logic "0" output of gate j also causes the gates k of decades #2, #3, #4 and #5 to be at a logic "1" level because the gates j of each decade are connected to one input of gate k of that decade and to an input of gate i of the next succeeding decade. Thus all inputs to gates $l_1$ and $l_2$ are at a logic "1" level so that the output of gate $l_5$ is a logic "1." As a result, line 1800 is at a logic "0" level, and line 1802 is at a logic "1" level by reason of inverter 1806, the gate q and inverter 1808. Gate k of decade #5 is at a logic "1" level so that output line 1810 is at a logic "0" level by reason of the inverter 1812.

If an "equal to" decision is reached in decade #1, the output from gate e is a logic "0" and the output from gate j is a logic "1." Then both the outputs of gates e and g of decade #2 are enabled by enabling gate k of decade #1 and gate i of decade #2, respectively. A "less than" decision reached in decade #2 can then be gated through gate k of decade #1 to gate $l_1$ and thence to output line 1800 in the same manner heretofore described. Similarly, if a "greater than" decision is reached, the output of gate j of decade #2 will be a logic "0" and this will disable gates k of decades #2, #3, #4 and #5 so that a "less than" decision cannot be reached in any of these succeeding decades, thus producing a "greater than" decision on line 1802 by reason of the inverted "less than" decision. If an "equal to" decision is reached in decade #2, the logic "1" output from gate j then enables the output of gate e of decade #3 by enabling gate k of decade #2, and enables the output of gate g of decade #3 by enabling gate i of decade #3.

If decade #3 reaches a "less than" decision, this decision is gated out through gate $l_1$ by causing gate k of decade #2 to go to a logic "0." If a "greater than" decision is reached, the outputs of gates i of all succeeding decades will go to a logic "1" so that the outputs of gates k of these decades will be at a logic "1." As a result, the output of gate $l_5$ is a logic "0" which results in a logic "1" on the "greater than" line 1802 and a logic "0" on the "less line" 1800, as heretofore described. A "less than" or "greater than" decision at either decade #4 or decade #5 produces the same results.

If all of the decades reach an "equal to" decision, the output of gate l will be a logic "0" because the outputs of all gates e will be at logic "0" thus making the outputs of all gates k, except gate k of decade #5, a logic "1." However, gate k of decade #5 will be at a logic "0" level because both inputs are at a logic "1." This logic "0" is inverted by inverter 1812 and appears as a logic "1" on the "equal to" output line 1810. Since the output of gate l is a logic "0" because the outputs of all gates e are logic "0," the "less than" output line 1800 will be at logic "0." The "greater than" output line 1802 would normally be at logic "1" since it is merely the complement of the "equal to" line 1800, but the logic "0" from gate k of the decade #5 disables gate q so that the output of inverter 1808 and hence the level on line 1802 is a logic "0."

It will be recalled that the highest order bit when comparing two algebraic numbers is the sign, and that the sign data is applied to bit AA′ of decade #1. When the data sign and the limit sign are both positive, or if either one is positive, then the "greater than" and "less than" decisions of the remaining bits of the comparator may be based upon the signs of the two numbers or upon the relative absolute values of the binary numbers. However, if both the data number and the limit number have a negative sign, then the lesser absolute numeric value is in actually the greater algebraic value so that the "less than" or "greater than" decision at the output of gate $p$ must be inverted. This is accomplished by gate $r$ the inputs of which are connected to the $\overline{D}$ and $\overline{L}$ lines of bit AA′. Thus when the sign of the data number and the sign of the limit number are both negative, both inputs to gate $r$ will be at a logic "1" level and the output of gate $r$ will be a logic "0." This disables gate $o$ and enables gate $n$ through inverter 1814. The output from gate $l_5$, which is the true "less than" output, is then inverted as it passes through gates $m$, $n$ and $p$ so that the outputs of the "less than" and "greater than" lines 1800 and 1802 will be complemented. It will be noted that the output from gate $k$ of decade #5 is also connected to an input of gate $n$ so that gate $n$ will be disabled when the output of gate $k$ of decade #5 goes to a logic "0" when an "equal to" decision has been reached for the reasons heretofore mentioned in connection with gate $q$.

In carrying out a series of tests on a particular electronic device, the special socket 22 and socket board 24 are connected to the relay test station 25 by the connectors 30. The code programmed on the printed circuit board 24 is fed through the contacts 34 to the control unit 250 for identification purposes to insure that the proper socket is used. The printed circuit performance board 28 is wired so that the proper leads of the test device will be connectable to the necessary D.C. bias supplies #1–#10 and to the proper pulse generator I or II by closing one of the relays $L_nR_n$. Various loads, represented by the resistor 144 in FIG. 3, may also be connected between the appropriate terminals on the performance board 28 as required.

The drawer 98 is pulled out and the performance board 28 laid in place on the tray 90 and the connectors 120 engaged so that the pulse generators I and II will be connected to the buses $DP_1$ and $DP_2$. The connectors 142 are forced over the edges of the board, the drawer pushed in, and the camming means 96 activated to lift the performance board until the button contacts 86 engage the respective spring contacts 68.

The programming media, such as punched paper, is programmed with information indicating the start of test No. 1 and each memory is successively programmed. The information for each memory is preceded by the address for the memory. For the first test, all memories must be full because the memories are of the shift register type. A stop signal is placed on the pragram tape after all of the program information for the first test. Then each successive test is programmed in order on the tape followed by a stop signal. Since the memories are shift registers and are randomly addressable through the control unit 250, only those registers wherein the test criteria are to be changed need to be reprogrammed for subsequent tests. The program tape is then inserted in the programming unit 252.

The measuring system may be operated in either the automatic or manual mode. In the manual mode, each test is first programmed on a manual signal, then the test performed in response to a manual signal. After the test is performed, operation of the system ceases until the second test program is manually instigated. If desired, however, all tests on the program may be automatically performed once the system is set in operation to program test No. 1. After the final test is completed and the tape reaches the starting point for the first test, operation of the system is automatically terminated. Another device may then be inserted in the socket and the series of tests repeated.

Although portions of the control circuits, such as the dynamic sequence timetable and the dynamic sequence interface, have not been described in detail, the logic function of these various control circuits have been described in sufficient detail to permit one skilled in the art to design a suitable logic circuit. The staircase counter 364 may be substantially identical to the data counter 286, differing in that the reverse count logic is not required and in the manner in which the decades overflow as heretofore described. The staircase ladder network 358 may be of the same configuration as the percent DAC 456, except that a greater number of decades are provided. The staircase control 362 may merely comprise three sets of AND gates, each including a gate for each input of the staircase ladder, which correspond in number to the outputs of the counter 364. Any one of the three sets of gates may be selectively enabled by the lines N–I, N–II or C to effect the operation of the staircase ladder 358 as heretofore described.

From the above description it will be apparent to those familiar with the art that a novel and highly useful measurement system has been described. The system may be used to perform substantially any measurement on substantially any electronic component or circuit. The system is capable of performing a wide variety of static measurements and a wide variety of dynamic measurements, and is fully automatic.

Although a preferred embodiment of the invention has been described in detail, it is to be understood that various changes, substitutions and alterations could be made in the various components and subsystems, and in the arrangement and combination thereof, without departing from the spirit and scope of the invention as defined by the appended claims.

What is claimed is:

1. In a system for defining a true transition from a voltage level below to a voltage level above a reference voltage, the combination of:
   first logic means for producing one (1) logic level when the voltage level is below and the other (0) logic level when the voltage is above a reference voltage,
   a source of clock pulses, and
   counter means for counting the clock pulses and producing a true transition signal only after said other (0) logic level has persisted for a predetermined number of consecutive clock pulses, the counter means automatically resetting in the event said other (0) logic level does not persist for the predetermined number of counts and then commencing the count from the reset count when said other (0) logic level is once again produced.

2. The combination defined in claim 1 wherein:
   the first logic means further includes means for selectively producing said other (0) logic level when the voltage level is below the reference voltage level and said one logic level when the voltage level is above the reference voltage level whereby a true transition of the opposite direction may be selectively detected.

3. The combination defined in claim 1 wherein the counter means is further characterized by:
   means for selectively producing the true transition signal only after the other (0) logic level has persisted for a predetermined number of consecutive clock pulses, then reverted back to said one (1) logic level a predetermined number of times whereby a predetermined number of true transitions may be detected.

4. In a system for detecting when a first voltage transcends a second voltage, the combination of:
   first logic means for producing a logic "0" level when the first voltage is less than the second voltage and a logic "1" level when the first voltage is greater than the second voltage, a counter comprised of a plurality of synchronous binary stages each having a clock input and a preset input for presetting the binaries to a logic "0" state, second logic means for switching the first binary stage of the counter to the logic state opposite from that of the first logic means on the first clock pulse after a change of level of the output of the first logic means, third logic means for causing the second binary stage of the counter to complement on the next clock pulse when the output from the first logic means and the output of the first binary stage are both a logic "1" level or the output of the second binary stage and the output of the first logic means are both a logic "1" level, and for making any subsequent binary stages complement when the output of the preceding binary stage and the output of the first logic means are both a logic "1" level, a second counter comprised of at least one binary stage, fourth logic means for complementing the first binary stage of the second counter on the first clock pulse after both the output from the first logic means and the output from the last binary of the first counter are a logic "1" level, and fifth logic means for selectively applying, in the alternative, either a train of clock pulses or a preset pulse to the binaries of the first and second counters.

5. The combination in claim 4 wherein:

the first logic means includes means for selectively producing a logic "1" level when the first voltage is less than the second voltage and a logic "0" level when the first voltage is greater than the second voltage whereby negative transitions rather than positive transitions may be detected.

6. The combination defined in claim 4 wherein:

the second counter is comprised of at least two binary stages and each successive stage is complemented to a logic "1" state when the output from the first logic means is a logic "1" level, the output from the last binary of the first counter is a logic "1" level, and the output from the preceding binary stage of the second counter is a logic "1" level, and further characterized by sixth logic means for selectively producing, an output logic level indicative of a transition when a selected one of the binaries of the second counter switches to a logic "1" state.

7. The method for measuring the difference in amplitude between first and second points on at least one waveform having repetitive periods in constant phase relationship which comprises:

measuring the amplitude of the first point with respect to an unknown reference amplitude by one measurement system during one set of the repetitive periods, measuring the amplitude of the second point with respect to the unknown reference amplitude by the same measurement system during a subsequent set of the repetitive periods, and taking the difference between the two measurements as the difference in amplitude between the first and second points.

8. The method for measuring the amplitude of a point on a repetitive waveform with respect to a reference level which comprises:

storing a first voltage representative of the amplitude of the point on the waveform, comparing the first voltage with a stair step reference voltage, counting the stair steps required to exceed the first voltage, storing a second voltage representative of the reference level, comparing the second voltage with the stair step reference voltage, counting the stair steps required to exceed the second voltage, and taking the difference between the two counts as representative of the amplitude to be measured.

9. The method defined in claim 8 wherein the reference level is a point on a repetitive waveform.

10. The method for measuring the amplitude of a repetitive waveform with respect to a reference level which comprises:

producing a sample pulse at the same point in time during each of a plurality of periods of the repetitive waveform, deriving a ramp voltage from each sample pulse, comparing each ramp voltage with a reference voltage to produce a strobe pulse when the ramp voltage exceeds the reference voltage, sampling the repetitive waveform at the point in time determined by each strobe pulse and storing a voltage representative of the amplitude of the waveform at that point in time, and comparing the stored voltage with a stair step reference voltage and counting the stair steps required to exceed the stored voltage during one measurement period, storing a voltage representative of the reference level, and comparing the stored voltage representative of the reference level and the stair step reference voltage and counting the stair steps required to exceed the stored voltage during another measurement period, and taking the difference in the two counts as representative of the amplitude to be measured.

11. The method for measuring the peak amplitude occurring during a selected time window of the repetitive periods of a waveform with respect to a reference level which comprises:

producing a sample pulse at the same point in time during each of a plurality of the repetitive periods of the waveform, deriving a ramp voltage from each sample pulse, comparing each ramp voltage with a step of a stair step reference voltage to produce a strobe pulse when the ramp voltage exceeds the stair step reference voltage, the stair step reference voltage increasing one step after each strobe pulse whereby the strobe pulses will be progressively delayed from the respective sample pulses, sampling the waveform at the point in time defined by each strobe pulse such that the waveform will be reproduced in stair step form at a lower frequency, storing a first voltage representative of the peak amplitude of the reproduced waveform, and comparing the first voltage with a stair step reference voltage and counting the steps required to exceed the first voltage during one measurement period, storing a second voltage representative of the reference level, and comparing the second voltage with the stair step reference voltage and counting the steps required to exceed the second voltage during another measurement period, and taking the difference in the two counts as representative of the amplitude.

12. The method defined in claim 11 wherein the reference level is also a peak occurring during the selected portion of the repetitive period of a repetitive waveform.

13. The method for measuring a voltage representative of the peak amplitude occurring during a selected portion of each repetitive period of a repetitive waveform which comprises:

producing a sample pulse at the same point in time during each of a plurality of periods of the repetitive waveform, deriving a ramp voltage from each sample pulse, comparing each ramp voltage with a step of a stair step reference voltage to produce a strobe pulse when the ramp voltage exceeds the stair step reference voltage, the stair step reference voltage increasing one step after each strobe pulse whereby the strobe pulses will be progressively delayed from the respective sample pulses, sampling the repetitive waveform at the point in time defined each strobe pulse such that the waveform will be approximately reproduced at a lower frequency, and storing a voltage representative of the peak amplitude of the reproduced waveform during the repetitive period on a voltage memory by applying the reproduced waveform to charge a voltage memory through a rectifier, and then measuring the stored voltage with a reference voltage having uniformly incremented steps.

14. The method defined in claim 13 wherein:

each step of the stair step reference voltage is equal to a predetermined number of voltage increments, and the waveform is sampled during a number of successive stair step reference voltages equal to the predetermined number of voltage increments, the voltage steps of each successive stair step reference voltage differing from the corresponding voltage steps of the preceding stair step reference voltage by one voltage increment, whereby a predetermined number of interlaced scans will be made of the repetitive waveform.

15. The method defined in claim 13 wherein the repetitive waveform is sampled during a predetermined number of successive stair step reference voltages and the steps of each successive stair step reference voltage exceed the corresponding steps of the preceding stair step reference voltage by a voltage increment less than that of the individual steps of the stair step voltages.

16. The method defined in claim 15 wherein there are X stair step reference voltages and each step exceeds the preceding corresponding step by a voltage increment equal to 1/X the voltage increase of each step.

17. In a method for testing an electronic device, the steps of:

defining a series of periods by a series of reference pulses, producing the same multiple pulse waveform within each period in response to each reference pulse to produce a continuous first waveform having a frequency substantially greater than the frequency of the reference pulses, stimulating the electronic device with the first waveform to produce a second waveform, producing a sample pulse at the same point in time during a plurality of the periods in response to the reference pulse defining the beginning of the respective periods, and successively sampling the second waveform a predetermined time interval after each sample pulse, the predetermined time intervals progressively increasing from a minimum period to a maximum period in equal increments to produce a first scan, and then repeating from the minimum period to the maximum period in an equal number of equal increments to produce a second scan, each interval of the second scan being delayed from the corresponding interval of the first scan by a period of time less than said equal increments.

18. The method defined in claim 17 wherein:

there are X number of scans and each period of each succeeding scan exceeds the corresponding period of the preceding scan by 1/X the period of the equal increments.

19. The method for measuring the amplitude of a repetitive waveform which comprises:

storing a first voltage representative of a first amplitude, comparing the first voltage to a reference voltage which increases in equal increments, and counting the increments of the reference voltage required for the reference voltage to exceed the first voltage to provide a first count during one measurement period, storing a second voltage representative of a second amplitude, comparing the second voltage to the reference voltage which increases in equal increments, and counting the increments of the reference voltage required for the reference voltage to exceed the first voltage to provide a second count during another measurement period, and taking the difference of the counts as indicative of the amplitude.

20. The method defined in claim 19 wherein at least one of the voltages representative of an amplitude is derived by storing one voltage representative of the amplitude of the waveform at one point, storing another voltage representative of the amplitude of the waveform at another point and taking a level between the two stored voltages as the voltage representative of the amplitude.

21. The method for measuring for the time interval between first and second points on one or more repetitive waveforms which comprises:

measuring the time interval between an unknown reference point in time and the first point during one measurement period, measuring the time interval between the unknown reference point in time and the second point during another measurement period using the same measurement system, and then taking the difference between the two measurements as representative of the time interval between the first and second points.

22. The method for measuring the real time interval between first and second points on one or more repetitive waveforms, each point being identifiable by a change in amplitude which comprises:

storing a first voltage level representative of the first point, comparing the waveform on which the first point is located with the first voltage level, detecting a predetermined change in the relationship between the waveform and the first voltage indicative of the first point, measuring the time interval between an unknown reference point in time on the waveform and the point in time on the waveform where the change in relationship is detected during one measurement period, and then storing a second voltage level representative of the second point, comparing the waveform on which the second point is located with the second voltage, detecting a predetermined change in the relationship between the waveform and the second voltage indicative of the second point, measuring the time interval between the unknown reference point in time on the waveform and the point in time on the waveform where the change in relationship is detected during another measurement period, and taking taking the difference in the two time measurements as indicative of the time interval between the two points.

23. The method defined in claim 22 wherein the first point is defined as a percent level between a zero percent amplitude level and a one hundred percent amplitude level and the first voltage level is derived by storing a third voltage representative of the zero percent amplitude and storing a fourth voltage representative of the one hundred percent amplitude level, and taking said given percent of the difference between the third and fourth stored voltages as the first voltage level.

24. The method defined in claim 23 wherein the third voltage is derived by sampling the waveform on which the first point is located at points in time representative of the zero percent amplitude and the one hundred percent amplitude.

25. The method defined in claim 23 wherein at least one of the third and fourth voltages is representative of a peak amplitude on the waveform during a selected portion of the waveform.

26. The method defined in claim 25 wherein both the third and fourth voltages are representative of a peak amplitude on the waveform during a selected repeating portion of the waveform, and the third and fourth voltages are each derived by repeatedly and alternately applying a waveform representative of the selected portion of the waveform to charge first and second voltage storage means through first and second rectifier means, whereby the voltage stored on the respective voltage storage means will be representative of the average peak voltage during the respective alternate scans.

27. The method for measuring the time interval between first and second points on one or more waveforms having repetitive periods, each point being identifiable by a change in amplitude, which comprises:
  storing a first voltage level representative of the amplitude at the first point,
  sampling the waveform on which the first point is located once during each of a plurality of the repetitive periods, the samples being taken at points on the repetitive waveform which are progressively delayed from the same reference point within the repetitive periods such that the samples will essentially reproduce the sampled portion of the waveform as a first stair step waveform,
  comparing the reproduced stair step waveform and the first voltage level and detecting a change in the relationship indicative of the first point while counting the steps of the stair step waveform prior to the change,
  storing a second voltage level representative of the amplitude at the second point,
  sampling the waveform on which the second point is located once during each of a plurality of the repetitive periods, the samples being taken at points on the repetitive waveform which are progressively delayed from the same reference point within the repetitive periods by the same amount as the corresponding samples taken to form the first stair step waveform period such that the samples will essentially reproduce the sampled portion of the waveform as a second stair step waveform identical to the first,
  comparing the second stair step waveform to the second voltage level and detecting a change in the relationship indicative of the first point while counting the steps of the stair step waveform prior to the change, and
  taking the difference of the two counts as indicative of the time interval between the first and second points.

28. The method defined in claim 27 wherein the stair step waveforms are produced by:
  initiating a ramp voltage at the same reference point in time within the succeeding repetitive periods,
  comparing each ramp voltage with the voltage of a stair step reference voltage to produce a strobe pulse when the ramp voltage exceeds the stair step voltage while incrementing the stair step voltage one step after each strobe pulse, and
  sampling the repetitive waveform at each point in time identified by a strobe pulse and producing a voltage representative of the amplitude of the waveform at that point in time until the next successive sample.

29. In a method for making time and/or amplitude measurements on a waveform, the steps of:
  storing a first voltage plus an unknown error voltage produced by a measurement channel, and then
  comparing a second voltage plus said unknown error voltage of the measurement channel with said first voltage whereby the error voltage will be present in both voltages and will not affect the absolute measurement.

30. The method defined in claim 29 wherein the first and second voltages are both derived through the same measurement channel to automatically add in the unknown error voltage.

References Cited

UNITED STATES PATENTS

| | | |
|---|---|---|
| 2,791,746 | 5/1957 | Bowersox et al. |
| 2,836,356 | 5/1958 | Forrest et al. |
| 2,951,181 | 8/1960 | Sugarman. |
| 3,122,732 | 2/1964 | Lewinstein et al. |
| 3,303,493 | 2/1967 | Charbonnier _____ 328—146 X |
| 3,312,894 | 4/1967 | Blake et al. |
| 3,317,832 | 5/1967 | Webb. |

FOREIGN PATENTS

| | | |
|---|---|---|
| 989,740 | 4/1965 | Great Britain. |

OTHER REFERENCES

Electronics, February 1964, pp. 33–35, article by R. C. Weinberg.

EDWARD F. KUBASIEWICZ, Primary Examiner

U.S. Cl. X.R.

328—135, 146